United States Patent
Aksu et al.

(10) Patent No.: US 11,595,670 B2
(45) Date of Patent: Feb. 28, 2023

(54) METHOD AND APPARATUS FOR STORAGE AND SIGNALING OF SUB-SAMPLE ENTRY DESCRIPTIONS

(71) Applicant: Nokia Technologies Oy, Espoo (FI)

(72) Inventors: Emre Baris Aksu, Tampere (FI); Miska Matias Hannuksela, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days.

(21) Appl. No.: 17/061,610

(22) Filed: Oct. 2, 2020

(65) Prior Publication Data

US 2021/0105492 A1 Apr. 8, 2021

Related U.S. Application Data

(60) Provisional application No. 62/909,259, filed on Oct. 2, 2019.

(51) Int. Cl.
*H04N 19/20* (2014.01)
*H04N 19/136* (2014.01)
(Continued)

(52) U.S. Cl.
CPC .......... *H04N 19/20* (2014.11); *H04N 19/115* (2014.11); *H04N 19/136* (2014.11); *H04N 19/184* (2014.11)

(58) Field of Classification Search
CPC ..................................................... H04N 19/20
(Continued)

(56) References Cited

U.S. PATENT DOCUMENTS

2003/0163781 A1* 8/2003 Visharam ........... H04N 21/4621
715/201
2004/0167925 A1* 8/2004 Visharam ......... H04N 21/85406
(Continued)

FOREIGN PATENT DOCUMENTS

WO WO 03098475 A1 11/2003

OTHER PUBLICATIONS

International Search Report and Written Opinion for Patent Cooperation Treaty Application No. PCT/FI2020/050648 dated Mar. 17, 2021, 19 pages.
(Continued)

*Primary Examiner* — Yulin Sun
(74) *Attorney, Agent, or Firm* — Alston & Bird LLP

(57) ABSTRACT

Described are methods, apparatuses and computer program products for signaling and storing compressed point clouds. Sub-sample entries associated with sequences of sub-samples within sequences of samples may indicate whether sequences of sub-samples were encapsulated alone in a track, without other sub-samples or additional header data. Sub-sample entry types can be indexed at track-level sub-sample description boxes. Point cloud compression coded bitstream component types may be signaled by including respective point cloud unit header information in a codec-specific parameters-related field of track level sub-sample description boxes. Sub-sample information boxes may indicate sub-sample entry indices for respective sub-samples. A flag in such information boxes may indicate the presence of sub-sample description entry indexes. Description index boxes can contain sub-sample description entry indexes in the same container as sub-sample information boxes. Track fragment header boxes can include sub-sample description entry indices that apply to samples of a track fragment.

20 Claims, 8 Drawing Sheets

(51) Int. Cl.
*H04N 19/115* (2014.01)
*H04N 19/184* (2014.01)

(58) Field of Classification Search
USPC .................................................. 375/240.08
See application file for complete search history.

(56) References Cited

U.S. PATENT DOCUMENTS

2019/0080483 A1* 3/2019 Mammou .............. H04N 19/90
2019/0081638 A1* 3/2019 Mammou ........... H03M 7/6064

OTHER PUBLICATIONS

Aksu, E., "Technologies Under Consideration for Carriage of Point Cloud Data", ISO/IEC JTC 1/SC 29/WG11 MPEG2018/N18607, Aug. 26, 2019, 66 pages.
"Information Technology—Coding of Audio-Visual Objects—Part 12: ISO Base Media File Format", ISO/IEC 14496-12:2015(E), Fifth Edition, Feb. 20, 2015, 254 pages.
"Information Technology—Coding of Audio-Visual Objects—Part 12: ISO Base Media File Format", ISO/IEC 14496-12:2015(E), Fifth Edition, Dec. 15, 2015, 248 pages.
"Information Technology—Coded Representation of Immersive Media—Part 5: Video-Based Point Cloud Compression", ISO/IEC Committee Draft 23090-5:2018(E), 2018, 159 pages.
"Information Technology—Coded Representation of Immersive Media—Part 10: Carriage of Point Cloud Data", ISO Committee Draft 23090-10:2019(E), Aug. 23, 2019, 21 pages.

\* cited by examiner

METHOD AND APPARATUS FOR STORAGE AND SIGNALING OF SUB-SAMPLE ENTRY DESCRIPTIONS

CROSS REFERENCE TO RELATED APPLICATIONS

This application claims priority to and the benefit of U.S. Provisional Patent Application No. 62/909,259, filed Oct. 2, 2019, entitled "Method and Apparatus for Storage and Signaling of Sub-Sample Entry Descriptions in ISOBMFF," the entire disclosures of which are hereby incorporated herein by reference in their entireties for all purposes.

TECHNICAL FIELD

An example embodiment relates generally to volumetric video encoding and decoding.

BACKGROUND

Volumetric video data represents a three-dimensional scene or object and can be used as input for augmented reality (AR), virtual reality (VR) and mixed reality (MR) applications. Such data describes geometry (shape, size, position in three dimensional (3D) space) and respective attributes (e.g. color, opacity, reflectance, etc.), plus temporal changes of the geometry and attributes at given time instances (like frames in two dimensional (2D) video). Volumetric video is either generated from 3D models, e.g., computer-generated imagery (CGI), or captured from real-world scenes using a variety of capture solutions, e.g., multiple cameras, a laser scan, a combination of video and dedicated depth sensors, and more. One example representation format for such volumetric data is point clouds. Temporal information about the scene can be included in the form of individual capture instances, e.g., "frames" in two dimensional (2D) video, or other mechanisms, e.g. the position of an object as a function of time.

Point clouds are often well suited for applications such as capturing real world 3D scenes where the topology is not necessarily a 2D manifold. However, standard point clouds suffer from poor temporal compression performance when a reconstructed 3D scene contains tens of millions or even hundreds of millions of points. Identifying correspondences for motion-compensation in 3D-space is an ill-defined problem because geometry and other respective attributes may change. For example, temporal successive frames do not necessarily have the same number of point clouds. As a result, compression of dynamic 3D scenes is inefficient. The number of points, their positions, and their attributes may vary from one frame to another. Such representations require a large amount of data, which can be costly in terms of storage and transmission. 2D-video based approaches for compressing volumetric data, e.g., multiview and depth, have much better compression efficiency, but rarely cover the full scene. These 2D based approaches provide only limited six degree of freedom (6DOF) capabilities. Therefore, an approach that has good compression efficiency and high degree of freedom is desirable.

One approach that has both good compression efficiency and a high degree of freedom is to project volumetric models represented in compressed point clouds onto 2D planes. This approach allows for using 2D video coding tools with highly efficient temporal compression while maintaining a degree of freedom better than a purely 2D based approach. A compressed point cloud includes an encoded video bitstream corresponding to the texture of the 3D object, an encoded video bitstream corresponding to the geometry of the 3D object, and an encoded metadata bitstream corresponding to all other auxiliary information which is necessary during the composition of a 3D object. However, there is no well-defined, efficient and standardized storage and signaling mechanism for these streams.

BRIEF SUMMARY

A method, apparatus and computer program product are provided in accordance with an example embodiment to signal and store compressed point clouds in video encoding. The method, apparatus and computer program product may be utilized in conjunction with a variety of video formats.

In various embodiments, a sub-sample entry is associated with a sequence of sub-samples within a sequence of samples. The semantics of a sub-sample entry may imply that if the sequence of sub-samples were encapsulated in its own track, without the other sub-samples or other additional header data (such as V-PCC unit headers) being present in the track, the sequence of samples in the track would conform to the sample entry that is identical to the sub-sample entry. Sub-sample entry types can be indexed at a track-level sub-sample description box, and the sub-sample information box can be extended to indicate the sub-sample entry index for each sub-sample. The sub-sample information box can be extended to include a version or flag identifying the presence of sub-sample description entry indexes. A sub-sample description index box can be formed for containing sub-sample description entry indexes in the same container as the sub-sample information box. A track fragment header box for a movie fragment track can be extended to include a set of sub-sample description entry indices that applies to each sample of the track fragment. The sample entries at track level may alternatively be extended to index the sub-samples in the sample description boxes and the sub-sample information box may refer to indexes of sample entries at the track-level sample description box.

In some embodiments, a method can comprise: accessing a point cloud compression coded bitstream, said point cloud compression coded bitstream configured to be stored as one or more media tracks; forming a track level sub-sample description box comprising a plurality of sub-sample entry types for a respective plurality of sub-samples; and extending a sub-sample information box to indicate the sub-sample entry index by indicating the order of presence of a sub-sample entry in the related sub-sample description box and further indicating its presence via a version value or setting a flag within said sub-sample information box. In some embodiments, said at least one media track has a packing type that is signaled via said sub-sample entry index. In some embodiments, causing storage of the point cloud compression coded bitstream comprises: accessing the attribute information bitstreams, the geometry information bitstreams, the occupancy information bitstream and the patch information bitstream; detecting that the attribute information bitstreams, the geometry information bitstreams, the occupancy information bitstream and the patch information bitstream follow a compatible coding and timing structure; and causing construction and storage of a video media track based at least upon the compatible coding and timing structure. In some embodiments, said point cloud compression coded bitstream comprises at least one attribute information bitstream, at least one geometry information bitstream, at least one occupancy information bitstream, and at least one patch information bitstream. In some embodiments, the method can further comprise: accessing the attribute information bitstreams, the geometry information bitstreams, the occupancy information bitstream and the patch information bitstream; storing the attribute information bitstreams in an attribute video media track; storing the geometry information bitstream in a geometry video media track; storing the occupancy information bitstream in an occupancy video media track; storing the patch information bitstream in another coded media or metadata track; and causing construction and storage of metadata in the file indicating a pattern for one or more components of the attribute video media track, the geometry video media track, the occupancy video media track, and the separate coded media or metadata track. In some embodiments, the metadata is interleaved indicator metadata indicating an interleaving pattern for said one or more components of the attribute video media track, the geometry video media track, the occupancy video media track, and the separate coded media or metadata track. In some embodiments, each of said one or more components for which the pattern is indicated are accessible using the sub-sample information box, said sub-sample-information box defining said presentation order and configuration information for said one or more components, said sub-sample information box configured to indicate said pattern. In some embodiments, storing comprises storing of different video-based point cloud compression-structures in an International Standards Organization base media file format (ISOBMFF).

In some embodiments, an apparatus is provided that comprises at least one processor and at least one memory including computer program code for one or more programs, the at least one memory and the computer program code configured to, with the at least one processor, cause the apparatus at least to: access a point cloud compression coded bitstream, said point cloud compression coded bitstream configured to be stored as one or more media tracks; form a track level sub-sample description box comprising a plurality of sub-sample entry types for a respective plurality of sub-samples; and extend a sub-sample information box to indicate the sub-sample entry index by indicating the order of presence of a sub-sample entry in the related sub-sample description box and further indicating its presence via a version value or setting a flag within said sub-sample information box. In some embodiments, said at least one media track has a packing type that is signaled via said sub-sample entry index. In some embodiments, the at least one memory and the computer program code are further configured to, with the at least one processor, cause the apparatus at least to: access the attribute information bitstreams, the geometry information bitstreams, the occupancy information bitstream and the patch information bitstream; detect that the attribute information bitstreams, the geometry information bitstreams, the occupancy information bitstream and the patch information bitstream follow a compatible coding and timing structure; and cause construction and storage of a video media track based at least upon the compatible coding and timing structure. In some embodiments, said point cloud compression coded bitstream comprises at least one attribute information bitstream, at least one geometry information bitstream, at least one occupancy information bitstream, and at least one patch information bitstream. In some embodiments, the at least one memory and the computer program code are further configured to, with the at least one processor, cause the apparatus at least to: access the attribute information bitstreams, the geometry information bitstreams, the occupancy information bitstream and the patch information bitstream; store the attribute information bitstreams in an attribute video media track; store the geometry information bitstream in a geometry video media track; store the occupancy information bitstream in an occupancy video media track; store the patch information bitstream in another coded media or metadata track; and cause construction and storage of metadata in the file indicating a pattern for one or more components of the attribute video media track, the geometry video media track, the occupancy video media track, and the separate coded media or metadata track. In some embodiments, the metadata is interleaved indicator metadata indicating an interleaving pattern for said one or more components of the attribute video media track, the geometry video media track, the occupancy video media track, and the separate coded media or metadata track. In some embodiments, each of said one or more components for which the pattern is indicated are accessible using the sub-sample information box, said sub-sample-information box defining said presentation order and configuration information for said one or more components, said sub-sample information box configured to indicate said pattern. In some embodiments, storing comprises storing of different video-based point cloud compression-structures in an International Standards Organization base media file format (ISOBMFF).

In some embodiments, an apparatus is provided that comprises means, such as at least one processor and at least one memory including computer program code for one or more programs, for carrying out a method such as described herein. In some embodiments, the apparatus can comprise means for accessing a point cloud compression coded bitstream, said point cloud compression coded bitstream configured to be stored as one or more media tracks; means for forming a track level sub-sample description box comprising a plurality of sub-sample entry types for a respective plurality of sub-samples; and means for extending a sub-sample information box to indicate the sub-sample entry index by indicating the order of presence of a sub-sample entry in the related sub-sample description box and further indicating its presence via a version value or setting a flag within said sub-sample information box. In some embodiments, said at least one media track has a packing type that is signaled via said sub-sample entry index. In some embodiments, the apparatus can further comprise means for accessing the attribute information bitstreams, the geometry information bitstreams, the occupancy information bitstream and the patch information bitstream; means for detecting that the attribute information bitstreams, the geometry information bitstreams, the occupancy information bitstream and the patch information bitstream follow a compatible coding and timing structure; and means for causing construction and storage of a video media track based at least upon the compatible coding and timing structure. In some embodiments, said point cloud compression coded bitstream comprises at least one attribute information bitstream, at least one geometry information bitstream, at least one occupancy information bitstream, and at least one patch information bitstream. In some embodiments, the apparatus can further comprise means for accessing the attribute information bitstreams, the geometry information bitstreams, the occupancy information bitstream and the patch information bitstream; means for storing the attribute information bitstreams in an attribute video media track; means for storing the geometry information bitstream in a geometry video media track; means for storing the occupancy information bitstream in an occupancy video media track; means for storing the patch information bitstream in another coded media or metadata track; and means for causing construction and storage of metadata in the file indicating a pattern for one or more components of the attribute video media track, the geometry video media track, the occupancy video media track, and the separate coded media or metadata track. In some embodiments, the metadata is interleaved indicator metadata indicating an interleaving pattern for said one or more components of the attribute video media track, the geometry video media track, the occupancy video media track, and the separate coded media or metadata track. In some embodiments, each of said one or more components for which the pattern is indicated are accessible using the sub-sample information box, said sub-sample-information box defining said presentation order and configuration information for said one or more components, said sub-sample information box configured to indicate said pattern. In some embodiments, storing comprises storing of different video-based point cloud compression-structures in an International Standards Organization base media file format (ISOBMFF).

In some embodiments, a computer program product is provided that comprises at least one non-transitory computer-readable storage medium having computer executable program code instructions stored therein, the computer executable program code instructions comprising program code instructions configured, upon execution, to: access a point cloud compression coded bitstream, said point cloud compression coded bitstream configured to be stored as one or more media tracks; form a track level sub-sample description box comprising a plurality of sub-sample entry types for a respective plurality of sub-samples; and extend a sub-sample information box to indicate the sub-sample entry index by indicating the order of presence of a sub-sample entry in the related sub-sample description box and further indicating its presence via a version value or setting a flag within said sub-sample information box. In some embodiments, said at least one media track has a packing type that is signaled via said sub-sample entry index. In some embodiments, the computer executable program code instructions can further comprise program code instructions configured, upon execution, to: access the attribute information bitstreams, the geometry information bitstreams, the occupancy information bitstream and the patch information bitstream; detect that the attribute information bitstreams, the geometry information bitstreams, the occupancy information bitstream and the patch information bitstream follow a compatible coding and timing structure; and cause construction and storage of a video media track based at least upon the compatible coding and timing structure. In some embodiments, said point cloud compression coded bitstream comprises at least one attribute information bitstream, at least one geometry information bitstream, at least one occupancy information bitstream, and at least one patch information bitstream. In some embodiments, the computer executable program code instructions can further comprise program code instructions configured, upon execution, to: access the attribute information bitstreams, the geometry information bitstreams, the occupancy information bitstream and the patch information bitstream; store the attribute information bitstreams in an attribute video media track; store the geometry information bitstream in a geometry video media track; store the occupancy information bitstream in an occupancy video media track; store the patch information bitstream in another coded media or metadata track; and cause construction and storage of metadata in the file indicating a pattern for one or more components of the attribute video media track, the geometry video media track, the occupancy video media track, and the separate coded media or metadata track. In some embodiments, the metadata is interleaved indicator metadata indicating an interleaving pattern for said one or more components of the attribute video media track, the geometry video media track, the occupancy video media track, and the separate coded media or metadata track. In some embodiments, each of said one or more components for which the pattern is indicated are accessible using the sub-sample information box, said sub-sample-information box defining said presentation order and configuration information for said one or more components, said sub-sample information box configured to indicate said pattern. In some embodiments, storing comprises storing of different video-based point cloud compression-structures in an International Standards Organization base media file format (ISOBMFF).In some embodiments, a method can comprise accessing a point cloud compression coded bitstream, said point cloud compression coded bitstream configured to be stored as one or more media tracks; defining a plurality of sub-sample description index boxes, sub-sample description index boxes comprising sub-sample description entry indexes, said sub-sample description index boxes being stored in a same container as a respective plurality of sub-sample information boxes associated with said plurality of sub-sample description index boxes; and adding unique identifiers to respective sub-sample description index boxes of said plurality of sub-sample description index boxes and respective sub-sample information boxes of said plurality of sub-sample information boxes, said unique identifiers operable to identify a first sub-sample description index box associated with a first sub-sample information box.

In some embodiments, a method can comprise accessing a point cloud compression coded bitstream, said point cloud compression coded bitstream configured to be stored as one or more media tracks associated with samples of a movie fragment; defining a plurality of sub-sample description index boxes, sub-sample description index boxes comprising sub-sample description entry indexes, said sub-sample description index boxes being stored in a same container as a respective plurality of sub-sample information boxes associated with said plurality of sub-sample description index boxes; and extending a track fragment header box to include a set of said sub-sample description entry indices that applies to sample of the movie fragment.

In some embodiments, a method can comprise accessing a point cloud compression coded bitstream, said point cloud compression coded bitstream configured to be stored as one or more media tracks associated with samples of a movie fragment; and indexing a plurality of sample entities within a sample description box of said one or more media tracks.

According to other embodiments, a method, apparatus, and/or computer program product are provided for decoding any of the point cloud video encoded according to any of the embodiments described herein.

BRIEF DESCRIPTION OF THE DRAWINGS

Figure 1:
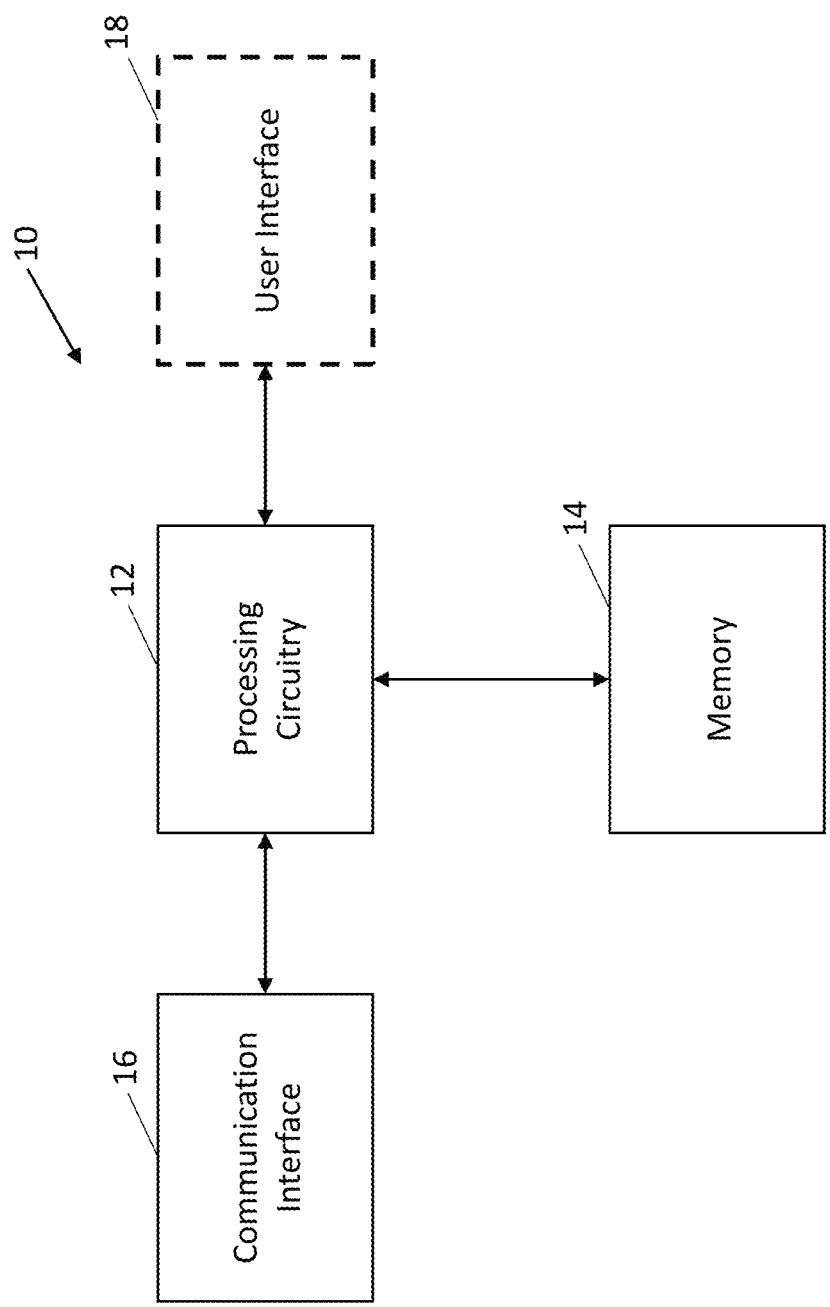
Figure 2A:
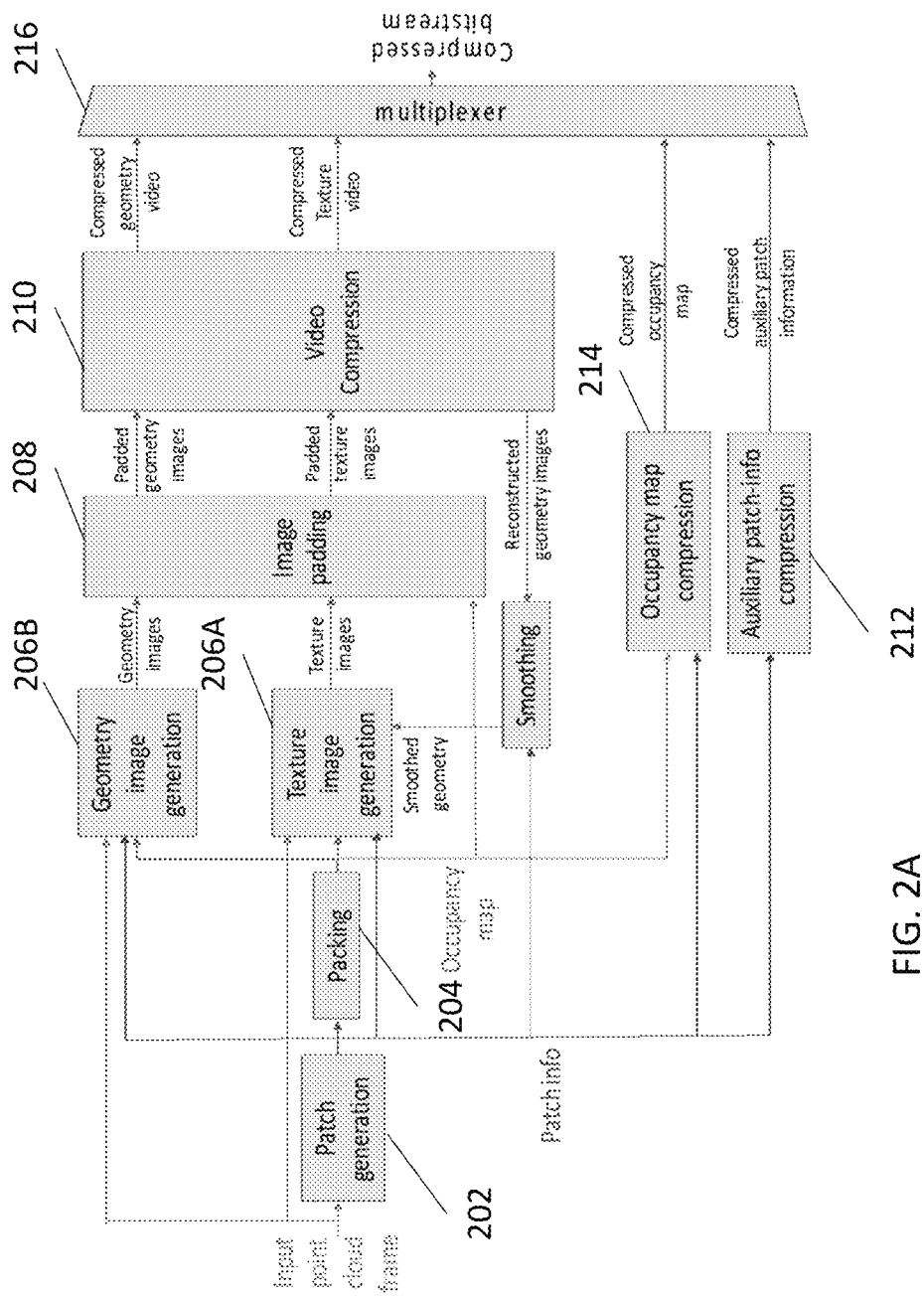
Figure 2B:
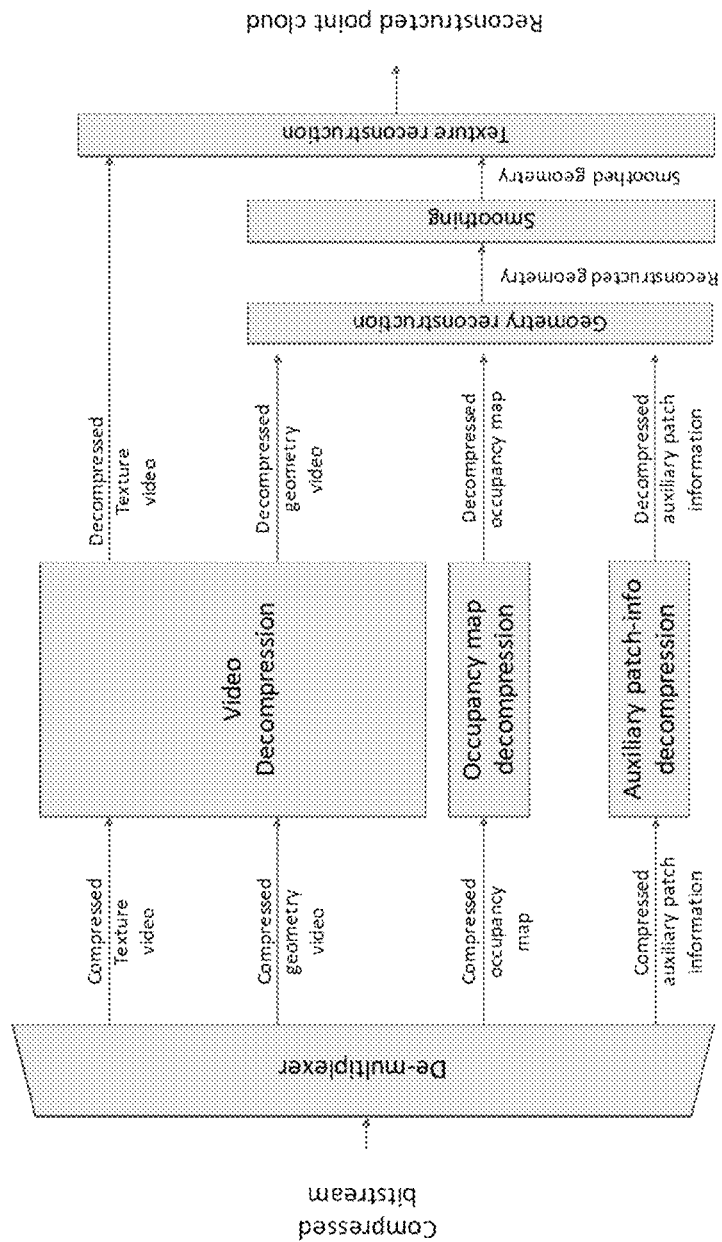
Figure 3:
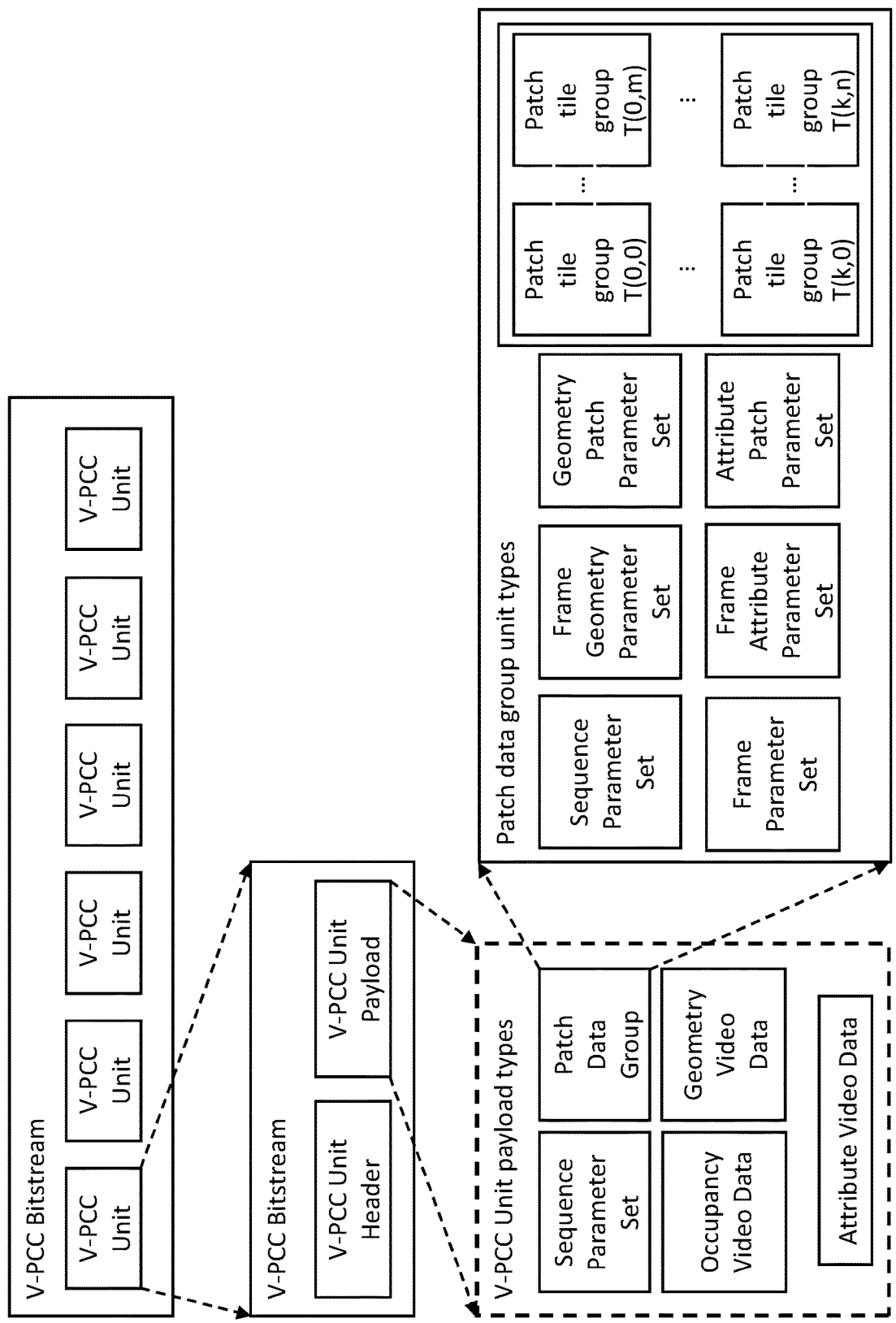
Figure 4:
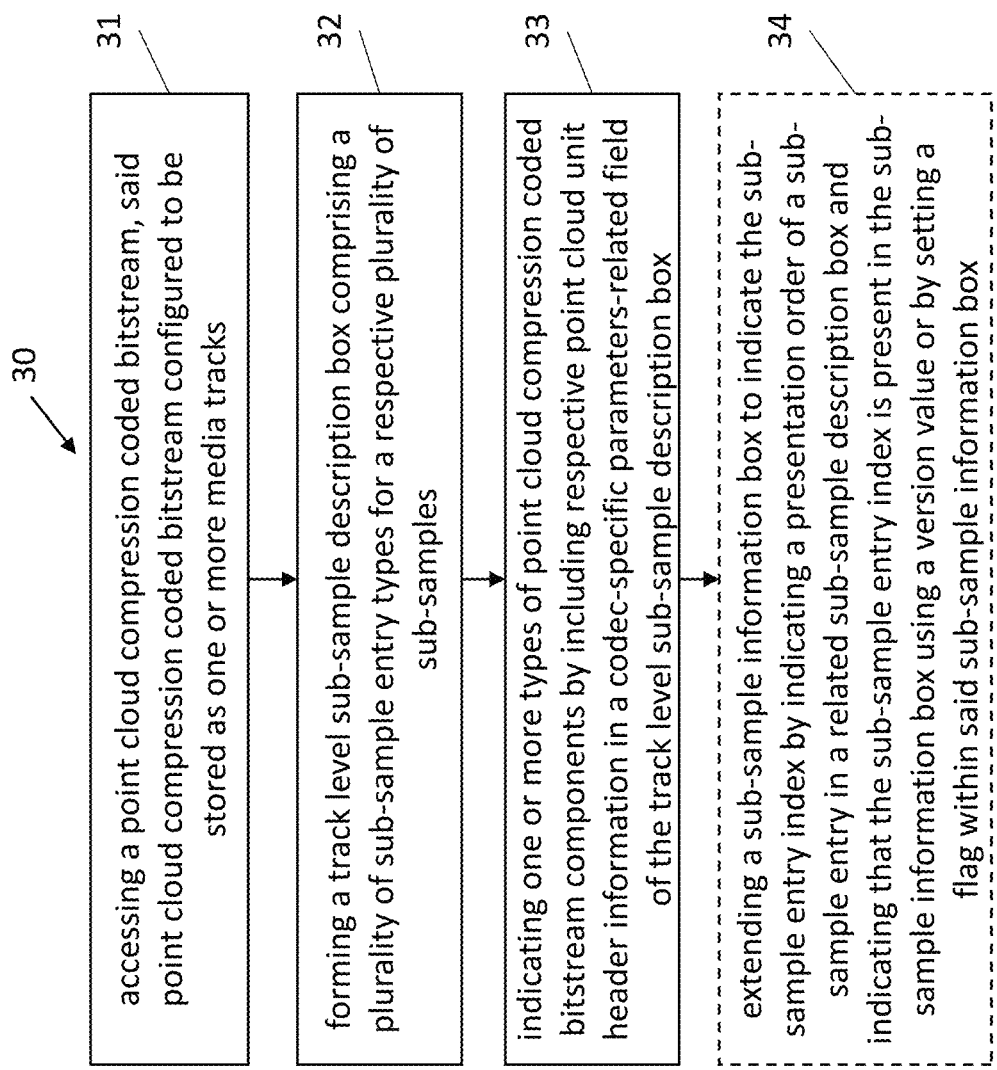
Figure 5:
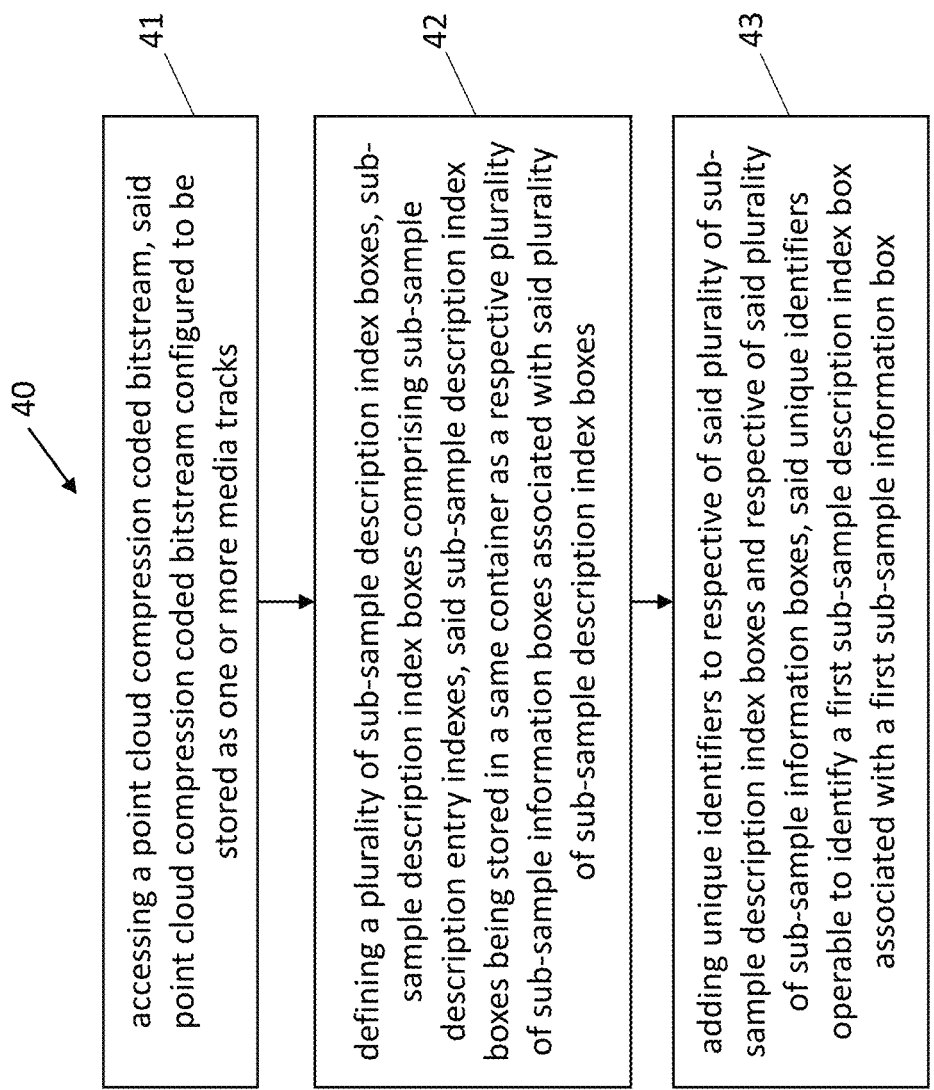
Figure 6:
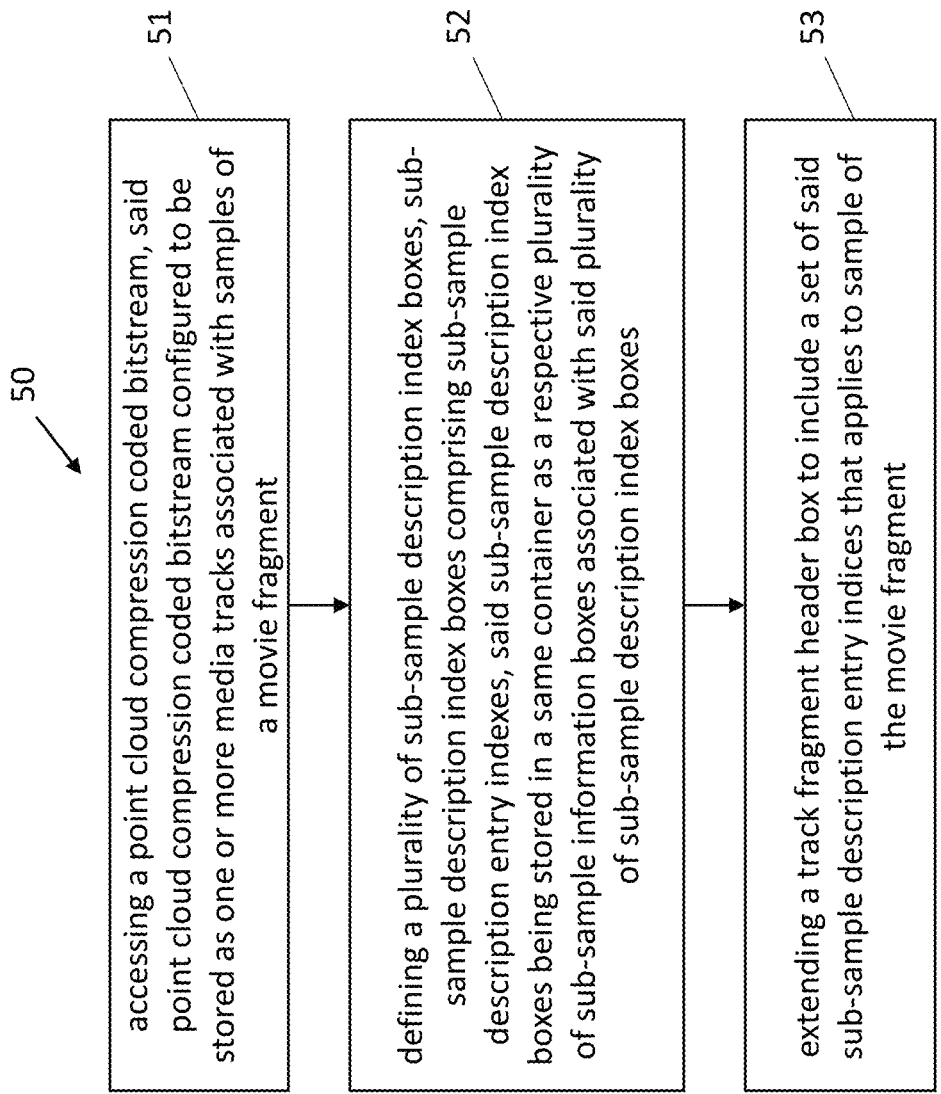
Figure 7:
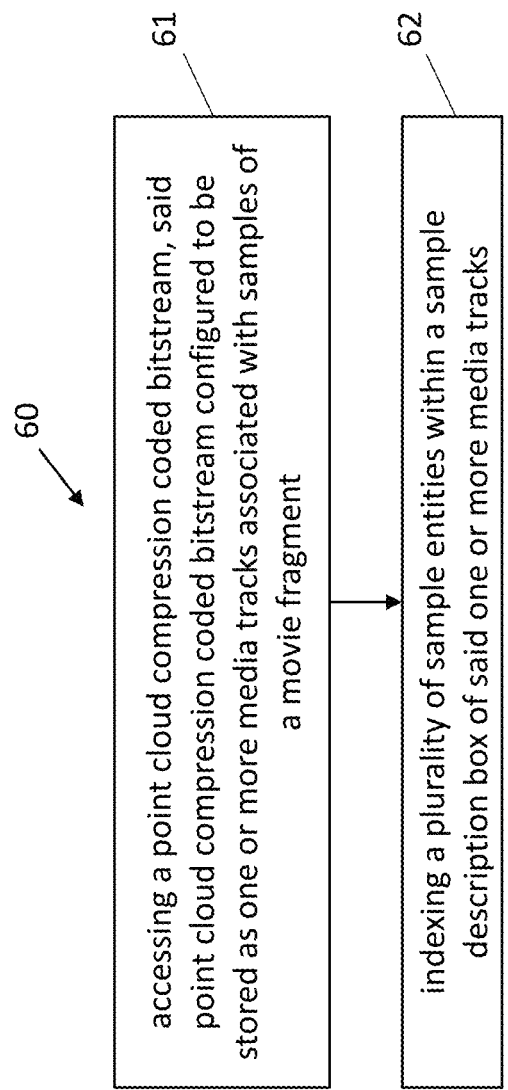

Having thus described certain example embodiments of the present disclosure in general terms, reference will hereinafter be made to the accompanying drawings, which are not necessarily drawn to scale, and wherein:

FIG. 1 is a block diagram of an apparatus that may be specifically configured in accordance with an example embodiment of the present disclosure;

FIGS. 2A and 2B are graphical representations illustrating a set of operations performed, such as by the apparatus of FIG. 1, in accordance with an example embodiment of the present disclosure;

FIG. 3 illustrates an example of a video data storage structure for V-PCC, according to an example embodiment of the present disclosure;

FIG. 4 is a flowchart illustrating a set of operations performed, such as by the apparatus of FIG. 1, in accordance with an example embodiment of the present disclosure;

FIG. 5 is a flowchart illustrating a set of operations performed, such as by the apparatus of FIG. 1, in accordance with an example embodiment of the present disclosure;

FIG. 6 is a flowchart illustrating a set of operations performed, such as by the apparatus of FIG. 1, in accordance with an example embodiment of the present disclosure; and FIG. 7 is a flowchart illustrating a set of operations performed, such as by the apparatus of FIG. 1, in accordance with an example embodiment of the present disclosure.

DETAILED DESCRIPTION

Some embodiments will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout. As used herein, the terms "data," "content," "information," and similar terms may be used interchangeably to refer to data capable of being transmitted, received and/or stored in accordance with embodiments of the present invention. Thus, use of any such terms should not be taken to limit the spirit and scope of embodiments of the present invention.

Additionally, as used herein, the term 'circuitry' refers to (a) hardware-only circuit implementations (e.g., implementations in analog circuitry and/or digital circuitry); (b) combinations of circuits and computer program product(s) comprising software and/or firmware instructions stored on one or more computer readable memories that work together to cause an apparatus to perform one or more functions described herein; and (c) circuits, such as, for example, a microprocessor(s) or a portion of a microprocessor(s), that require software or firmware for operation even if the software or firmware is not physically present. This definition of 'circuitry' applies to all uses of this term herein, including in any claims. As a further example, as used herein, the term 'circuitry' also includes an implementation comprising one or more processors and/or portion(s) thereof and accompanying software and/or firmware. As another example, the term 'circuitry' as used herein also includes, for example, a baseband integrated circuit or applications processor integrated circuit for a mobile phone or a similar integrated circuit in a server, a cellular network device, other network device, and/or other computing device.

As defined herein, a "computer-readable storage medium," which refers to a non-transitory physical storage medium (e.g., volatile or non-volatile memory device), can be differentiated from a "computer-readable transmission medium," which refers to an electromagnetic signal.

A method, apparatus and computer program product are provided in accordance with an example embodiment to signal and store compressed point clouds in video encoding. The method, apparatus and computer program product may be utilized in conjunction with a variety of video formats including High Efficiency Video Coding standard (HEVC or H.265/HEVC), Advanced Video Coding standard (AVC or H.264/AVC), the upcoming Versatile Video Coding standard (VVC or H.266/VVC), and/or with a variety of video and multimedia file formats including International Standards Organization (ISO) base media file format (ISO/IEC 14496-12, which may be abbreviated as ISOBMFF), Moving Picture Experts Group (MPEG)-4 file format (ISO/IEC 14496-14, also known as the MP4 format), file formats for NAL (Network Abstraction Layer) unit structured video (ISO/IEC 14496-15) and $3r^d$ Generation Partnership Project (3GPP file format) (3GPP Technical Specification 26.244, also known as the 3GP format). ISOBMFF is the base for derivation of all the above-mentioned file formats. An example embodiment is described in conjunction with the HEVC, however, the present disclosure is not limited to HEVC, but rather the description is given for one possible basis on top of which an example embodiment of the present disclosure may be partly or fully realized.

Some aspects of the disclosure relate to container file formats, such as International Standards Organization (ISO) base media file format (ISO/IEC 14496-12, which may be abbreviated as ISOBMFF), Moving Picture Experts Group (MPEG)-4 file format (ISO/IEC 14496-14, also known as the MP4 format), file formats for NAL (Network Abstraction Layer) unit structured video (ISO/IEC 14496-15) and $3^{rd}$ Generation Partnership Project (3GPP file format) (3GPP Technical Specification 26.244, also known as the 3GP format). Example embodiments are described in conjunction with the ISOBMFF or its derivatives, however, the present disclosure is not limited to ISOBMFF, but rather the description is given for one possible basis on top of which an example embodiment of the present disclosure may be partly or fully realized.

An elementary unit for the output of an H.264/advanced video coding (AVC) or HEVC encoder and the input of an H.264/AVC or HEVC decoder, respectively, is a Network Abstraction Layer (NAL) unit. For transport over packet-oriented networks or storage into structured files, NAL units may be encapsulated into packets or similar structures. In ISO base media file format (ISOBMFF), NAL units of an access unit form a sample, the size of which is provided within file format metadata. An ISOBMFF can encapsulate, for instance, V-PCC data. For instance, in some embodiments described herein, an ISOBMFF based data encapsulation and signalling mechanisms can be used for the encapsulation of V-PCC data for MPEG V-PCC encoded content.

A bytestream format has been specified in H.264/AVC and HEVC for transmission or storage environments that do not provide framing structures. The bytestream format separates NAL units from each other by attaching a start code in front of each NAL unit. To avoid false detection of NAL unit boundaries, encoders run a byte-oriented start code emulation prevention algorithm, which adds an emulation prevention byte to the NAL unit payload if a start code would have occurred otherwise. In order to enable straightforward gateway operation between packet- and stream-oriented systems, start code emulation prevention may always be performed regardless of whether the bytestream format is in use or not. A NAL unit may be defined as a syntax structure containing an indication of the type of data to follow and bytes containing that data in the form of a raw byte sequence payload (RBSP) interspersed as necessary with emulation prevention bytes. A RBSP may be defined as a syntax structure containing an integer number of bytes that is encapsulated in a NAL unit. An RBSP is either empty or has the form of a string of data bits containing syntax elements followed by an RBSP stop bit and followed by zero or more subsequent bits equal to 0.

NAL units can be categorized into Video Coding Layer (VCL) NAL units and non-VCL NAL units. VCL NAL units are typically coded slice NAL units.

A non-VCL NAL unit may be, for example, one of the following types: a sequence parameter set, a picture parameter set, a supplemental enhancement information (SEI) NAL unit, an access unit delimiter, an end of sequence NAL unit, an end of bitstream NAL unit, or a filler data NAL unit. Parameter sets may be needed for the reconstruction of decoded pictures, whereas many of the other non-VCL NAL units are not necessary for the reconstruction of decoded sample values.

An SEI NAL unit may contain one or more SEI messages, which are not required for the decoding of output pictures but may assist in related processes, such as picture output timing, rendering, error detection, error concealment, and resource reservation. Several SEI messages are specified in H.264/AVC and HEVC, and the user data SEI messages enable organizations and companies to specify SEI messages for their own use. H.264/AVC and HEVC contain the syntax and semantics for the specified SEI messages but no process for handling the messages in the recipient is defined. Consequently, encoders are required to follow the H.264/AVC standard or the HEVC standard when they create SEI messages, and decoders conforming to the H.264/AVC standard or the HEVC standard, respectively, are not required to process SEI messages for output order conformance. One of the reasons to include the syntax and semantics of SEI messages in H.264/AVC and HEVC is to allow different system specifications to interpret the supplemental information identically and hence interoperate. It is intended that system specifications can require the use of particular SEI messages both in the encoding end and in the decoding end, and additionally the process for handling particular SEI messages in the recipient can be specified.

In HEVC, there are two types of SEI NAL units, namely the suffix SEI NAL unit and the prefix SEI NAL unit, having a different nal_unit_type value from each other. The SEI message(s) contained in a suffix SEI NAL unit are associated with the VCL NAL unit preceding, in decoding order, the suffix SEI NAL unit. The SEI message(s) contained in a prefix SEI NAL unit are associated with the VCL NAL unit following, in decoding order, the prefix SEI NAL unit.

Video coding specifications may contain a set of constraints for associating data units (e.g., NAL units in H.264/AVC or HEVC) into access units. These constraints may be used to conclude access unit boundaries from a sequence of NAL units. For example, the following is specified in the HEVC standard:

An access unit consists of one coded picture with nuh_layer_id equal to 0, zero or more video coding layer (VCL) NAL units with nuh_layer_id greater than 0 and zero or more non-VCL NAL units.

Let firstBlPicNalUnit be the first VCL NAL unit of a coded picture with nuh_layer_id equal to 0. The first of any of the following NAL units preceding firstBlPicNalUnit and succeeding the last VCL NAL unit preceding firstBlPicNalUnit, if any, specifies the start of a new access unit:
access unit delimiter NAL unit with nuh_layer_id equal to 0 (when present),
video parameter set (VPS) NAL unit with nuh_layer_id equal to 0 (when present),
sequence parameter set (SPS) NAL unit with nuh_layer_id equal to 0 (when present),
picture parameter set (PPS) NAL unit with nuh_layer_id equal to 0 (when present),
Prefix supplemental enhancement information (SEI) NAL unit with nuh_layer_id equal to 0 (when present),
NAL units with nal_unit_type in the range of RSV_NVCL41 . . . RSV_NVCL44 (which represent reserved NAL units) with nuh_layer_id equal to 0 (when present),
NAL units with nal_unit_type in the range of UNSPEC48 . . . UNSPEC55 (which represent unspecified NAL units) with nuh_layer_id equal to 0 (when present).

The first NAL unit preceding firstBlPicNalUnit and succeeding the last VCL NAL unit preceding firstBlPicNalUnit, if any, can only be one of the above-listed NAL units.

When there is none of the above NAL units preceding firstBlPicNalUnit and succeeding the last VCL NAL preceding firstBlPicNalUnit, if any, firstBlPicNalUnit starts a new access unit.

Frame packing may be defined to comprise arranging more than one input picture, which may be referred to as (input) constituent frames, into an output picture. In general, frame packing is not limited to any particular type of constituent frames or the constituent frames need not have a particular relation with each other. In many cases, frame packing is used for arranging constituent frames of a stereoscopic video clip into a single picture sequence. The arranging may include placing the input pictures in spatially non-overlapping areas within the output picture. For example, in a side-by-side arrangement, two input pictures are placed within an output picture horizontally adjacently to each other. The arranging may also include partitioning of one or more input pictures into two or more constituent frame partitions and placing the constituent frame partitions in spatially non-overlapping areas within the output picture. The output picture or a sequence of frame-packed output pictures may be encoded into a bitstream e.g., by a video encoder. The bitstream may be decoded e.g., by a video decoder. The decoder or a post-processing operation after decoding may extract the decoded constituent frames from the decoded picture(s), e.g., for displaying.

A basic building block in the ISO base media file format is called a box. Each box has a header and a payload. The box header indicates the type of the box and the size of the box in terms of bytes. A box may enclose other boxes, and the ISO file format specifies which box types are allowed within a box of a certain type. Furthermore, the presence of some boxes may be mandatory in each file, while the presence of other boxes may be optional. Additionally, for some box types, it may be allowable to have more than one box present in a file. Thus, the ISO base media file format may be considered to specify a hierarchical structure of boxes.

According to the ISO base media file format, a file includes media data and metadata that are encapsulated into boxes. Each box is identified by a four-character code (4CC) and starts with a header which informs about the type and size of the box.

Many files formatted according to the ISO base media file format start with a file type box, also referred to as FileTypeBox or the ftyp box. The ftyp box contains information of the brands labeling the file. The ftyp box includes one major brand indication and a list of compatible brands. The major brand identifies the most suitable file format specification to be used for parsing the file. The compatible brands indicate to which file format specifications and/or conformance points the file conforms. It is possible that a file is conformant to multiple specifications. All brands indicating compatibility to these specifications should be listed, so that a reader only understanding a subset of the compatible brands can get an indication that the file can be parsed. Compatible brands also give a permission for a file parser of a particular file format specification to process a file containing the same particular file format brand in the ftyp box. A file player may check if the ftyp box of a file comprises brands it supports and may parse and play the file only if any file format specification supported by the file player is listed among the compatible brands.

In files conforming to the ISO base media file format, the media data may be provided in one or more instances of MediaDataBox ('mdat') and the MovieBox ('moov') may be used to enclose the metadata for timed media. In some cases, for a file to be operable, both of the 'mdat' and 'moov' boxes may be required to be present. The 'moov' box may include one or more tracks, and each track may reside in one corresponding TrackBox ('trak'). Each track is associated with a handler, identified by a four-character code, specifying the track type. Video, audio, and image sequence tracks can be collectively called media tracks, and they contain an elementary media stream. Other track types comprise hint tracks and timed metadata tracks.

Tracks comprise samples, such as audio or video frames. For video tracks, a media sample may correspond to a coded picture or an access unit. A media track refers to samples (which may also be referred to as media samples) formatted according to a media compression format (and its encapsulation to the ISO base media file format). A hint track refers to hint samples, containing cookbook instructions for constructing packets for transmission over an indicated communication protocol. A timed metadata track may refer to samples describing referred media and/or hint samples.

The 'trak' box includes in its hierarchy of boxes the SampleTableBox (also known as the sample table or the sample table box). The SampleTableBox contains the SampleDescriptionBox, which gives detailed information about the coding type used, and any initialization information needed for that coding. The SampleDescriptionBox contains an entry-count and as many sample entries as the entry-count indicates. The format of sample entries is track-type specific but derived from generic classes (e.g., VisualSampleEntry, AudioSampleEntry). The type of sample entry form used for derivation the track-type specific sample entry format is determined by the media handler of the track.

A TrackTypeBox may be contained in a TrackBox. The payload of TrackTypeBox has the same syntax as the payload of FileTypeBox. The content of an instance of TrackTypeBox may be such that it would apply as the content of FileTypeBox, if all other tracks of the file were removed and only the track containing this box remained in the file.

Movie fragments may be used, for example, when recording content to ISO files, for example, in order to avoid losing data if a recording application crashes, runs out of memory space, or some other incident occurs. Without movie fragments, data loss may occur because the file format may require that all metadata, for example, a movie box, be written in one contiguous area of the file. Furthermore, when recording a file, there may not be sufficient amount of memory space to buffer a movie box for the size of the storage available, and re-computing the contents of a movie box when the movie is closed may be too slow. Moreover, movie fragments may enable simultaneous recording and playback of a file using a regular ISO file parser. Furthermore, a smaller duration of initial buffering may be required for progressive downloading, e.g., simultaneous reception and playback of a file when movie fragments are used, and the initial movie box is smaller compared to a file with the same media content but structured without movie fragments.

The movie fragment feature may enable splitting the metadata that otherwise might reside in the movie box into multiple pieces. Each piece may correspond to a certain period of time of a track. In other words, the movie fragment feature may enable interleaving file metadata and media data. Consequently, the size of the movie box may be limited, and the use cases mentioned above be realized.

In some examples, the media samples for the movie fragments may reside in an mdat box. For the metadata of the movie fragments, however, a moof box may be provided. The moof box may include the information for a certain duration of playback time that would previously have been in the moov box. The moov box may still represent a valid movie on its own, but in addition, it may include an mvex box indicating that movie fragments will follow in the same file. The movie fragments may extend the presentation that is associated to the moov box in time.

Within the movie fragment there may be a set of track fragments, including anywhere from zero to a plurality of track fragments per track. The track fragments may in turn include anywhere from zero to a plurality of track runs, each of which document a contiguous run of samples for that track (and hence are similar to chunks). Within these structures, many fields are optional and can be defaulted. The metadata that may be included in the moof box may be limited to a subset of the metadata that may be included in a moov box and may be coded differently in some cases. Details regarding the boxes that can be included in a moof box may be found in the ISOBMFF specification.

A self-contained movie fragment may be defined to consist of a moof box and an mdat box that are consecutive in the file order with the mdat box containing the samples of the movie fragment (for which the moof box provides the metadata) and does not contain samples of any other movie fragment, that is, any other moof box. A media segment may comprise one or more self-contained movie fragments. A media segment may be used for delivery, such as streaming, e.g., in MPEG-Dynamic Adaptive Streaming over Hypertext Transfer Protocol (HTTP) (MPEG-DASH).

The track reference mechanism can be used to associate tracks with each other. The TrackReferenceBox includes box(es), each of which provides a reference from the containing track to a set of other tracks. These references are labelled through the box type (e.g., the four-character code of the box) of the contained box(es). The ISO Base Media File Format contains three mechanisms for timed metadata that can be associated with particular samples: sample groups, timed metadata tracks, and sample auxiliary information. A derived specification may provide similar functionality with one or more of these three mechanisms.

TrackGroupBox, which is contained in TrackBox, enables indication of groups of tracks where each group shares a particular characteristic or the tracks within a group have a particular relationship. The box contains zero or more boxes, and the particular characteristic or the relationship is indicated by the box type of the contained boxes. The contained boxes include an identifier, which can be used to conclude the tracks belonging to the same track group. The tracks that contain the same type of a contained box within the TrackGroupBox and have the same identifier value within these contained boxes belong to the same track group. The syntax of the contained boxes may be defined through TrackGroup-TypeBox is follows:

```
aligned(8) class TrackGroupTypeBox(unsigned int(32) track_group_type)
extends
FullBox(track_group_type, version = 0, flags = 0)
{
    unsigned int(32) track_group_id;
    // the remaining data may be specified
    //for a particular track_group_type
}
```

The ISO Base Media File Format (ISOBMFF) contains three mechanisms for timed metadata that can be associated with particular samples: sample groups, timed metadata tracks, and sample auxiliary information. A derived specification may provide similar functionality with one or more of these three mechanisms.

A sample grouping in the ISO base media file format and its derivatives, such as the AVC file format and the scalable video coding (SVC) file format, may be defined as an assignment of each sample in a track to be a member of one sample group, based on a grouping criterion. A sample group in a sample grouping is not limited to being contiguous samples and may contain non-adjacent samples. As there may be more than one sample grouping for the samples in a track, each sample grouping may have a type field to indicate the type of grouping. Sample groupings may be represented by two linked data structures: (1) a SampleToGroupBox (sbgp box) represents the assignment of samples to sample groups; and (2) a SampleGroupDescriptionBox (sgpd box) contains a sample group entry for each sample group describing the properties of the group. There may be multiple instances of the SampleToGroupBox and SampleGroupDescriptionBox based on different grouping criteria. These may be distinguished by a type field used to indicate the type of grouping. SampleToGroupBox may comprise a grouping_type_parameter field that can be used e.g., to indicate a sub-type of the grouping.

Per-sample auxiliary information may be stored anywhere in the same file as the sample data itself. For self-contained media files, this is typically in a MediaDataBox or a box from a derived specification. It is stored either (a) in multiple chunks, with the number of samples per chunk, as well as the number of chunks, matching the chunking of the primary sample data or (b) in a single chunk for all the samples in a movie sample table (or a movie fragment). The Sample Auxiliary Information for all samples contained within a single chunk (or track run) is stored contiguously (similarly to sample data).

Sample Auxiliary Information, when present, is stored in the same file as the samples to which it relates as they share the same data reference ('dref') structure. However, this data may be located anywhere within this file, using auxiliary information offsets ('saio') to indicate the location of the data.

The restricted video ('resv') sample entry and mechanism has been specified for the ISOBMFF in order to handle situations where the file author requires certain actions on the player or renderer after decoding of a visual track. Players not recognizing or not capable of processing the required actions are stopped from decoding or rendering the restricted video tracks. The 'resv' sample entry mechanism applies to any type of video codec. A RestrictedSchemeInfoBox is present in the sample entry of 'resv' tracks and comprises an OriginalFormatBox, SchemeTypeBox, and SchemeInformationBox. The original sample entry type that would have been unless the 'resv' sample entry type were used is contained in the OriginalFormatBox. The SchemeTypeBox provides an indication which type of processing is required in the player to process the video. The SchemeInformationBox comprises further information of the required processing. The scheme type may impose requirements on the contents of the SchemeInformationBox. For example, the stereo video scheme indicated in the SchemeTypeBox indicates that when decoded frames either contain a representation of two spatially packed constituent frames that form a stereo pair (frame packing) or only one view of a stereo pair (left and right views in different tracks). StereoVideoBox may be contained in a SchemeInformationBox to provide further information, e.g., on which type of frame packing arrangement has been used (e.g., side-by-side or top-bottom).

Several types of stream access points (SAPs) have been specified. SAP Type 1 corresponds to what is known in some coding schemes as a "Closed group of pictures (GOP) random access point" (in which all pictures, in decoding order, can be correctly decoded, resulting in a continuous time sequence of correctly decoded pictures with no gaps) and in addition the first picture in decoding order is also the first picture in presentation order. SAP Type 2 corresponds to what is known in some coding schemes as a "Closed GOP random access point" (in which all pictures, in decoding order, can be correctly decoded, resulting in a continuous time sequence of correctly decoded pictures with no gaps), for which the first picture in decoding order may not be the first picture in presentation order. SAP Type 3 corresponds to what is known in some coding schemes as an "Open GOP random access point", in which there may be some pictures in decoding order that cannot be correctly decoded and have presentation times less than intra-coded picture associated with the SAP.

A stream access point (SAP) sample group as specified in ISOBMFF identifies samples as being of the indicated SAP type.

A sync sample may be defined as a sample corresponding to SAP type 1 or 2. A sync sample can be regarded as a media sample that starts a new independent sequence of samples; if decoding starts at the sync sample, it and succeeding samples in decoding order can all be correctly decoded, and the resulting set of decoded samples forms the correct presentation of the media starting at the decoded sample that has the earliest composition time. Sync samples can be indicated with the SyncSampleBox (for those samples whose metadata is present in a TrackBox) or within sample flags indicated or inferred for track fragment runs.

Files conforming to the ISOBMFF may contain any non-timed objects, referred to as items, meta items, or metadata items, in a meta box (fourCC: 'meta'), which may also be called MetaBox. While the name of the meta box refers to metadata, items can generally contain metadata or media data. The meta box may reside at the top level of the file, within a movie box (fourCC: 'moov'), and within a track box (fourCC: 'trak'), but at most one meta box may occur at each of the file level, movie level, or track level. The meta box may be required to contain a 'hdlr' box indicating the structure or format of the 'meta' box contents. The meta box may list and characterize any number of items that can be referred and each one of them can be associated with a file name and can be uniquely identified with the file by item identifier (item_id) which is an integer value. The metadata items may be for example stored in the 'idat' box of the meta box or in an 'mdat' box or reside in a separate file. If the metadata is located external to the file, then its location may be declared by the DataInformationBox (fourCC: 'dinf'). In the specific case that the metadata is formatted using eXtensible Markup Language (XML) syntax and is required to be stored directly in the MetaBox, the metadata may be encapsulated into either the XMLBox (fourCC: 'xml') or the BinaryXMLBox (fourcc: 'bxml'). An item may be stored as a contiguous byte range, or it may be stored in several extents, each being a contiguous byte range. In other words, items may be stored fragmented into extents, e.g., to enable interleaving. An extent is a contiguous subset of the bytes of the resource, and the resource can be formed by concatenating the extents.

High Efficiency Image File Format (HEIF) is a standard developed by the Moving Picture Experts Group (MPEG) for storage of images and image sequences. Among other things, the standard facilitates file encapsulation of data coded according to the High Efficiency Video Coding (HEVC) standard. HEIF includes features building on top of the used ISO Base Media File Format (ISOBMFF).

The ISOBMFF structures and features are used to a large extent in the design of HEIF. The basic design for HEIF comprises that still images are stored as items and image sequences are stored as tracks.

In the context of HEIF, the following boxes may be contained within the root-level 'meta' box and may be used as described hereinafter. In HEIF, the handler value of the Handler box of the 'meta' box is 'pict'. The resource (whether within the same file, or in an external file identified by a uniform resource identifier) containing the coded media data is resolved through the Data Information ('dinf') box, whereas the Item Location ('iloc') box stores the position and sizes of every item within the referenced file. The Item Reference ('iref') box documents relationships between items using typed referencing. If there is an item among a collection of items that is in some way to be considered the most important compared to others, then this item is signaled by the Primary Item ('pitm') box. Apart from the boxes mentioned here, the 'meta' box is also flexible to include other boxes that may be necessary to describe items.

Any number of image items can be included in the same file. Given a collection of images stored by using the 'meta' box approach, certain relationships may be qualified between images. Examples of such relationships include indicating a cover image for a collection, providing thumbnail images for some or all of the images in the collection, and associating some or all of the images in a collection with an auxiliary image such as an alpha plane. A cover image among the collection of images is indicated using the 'pitm' box. A thumbnail image or an auxiliary image is linked to the primary image item using an item reference of type 'thmb' or 'auxl', respectively.

The ItemPropertiesBox enables the association of any item with an ordered set of item properties. Item properties are small data records. The ItemPropertiesBox consists of two parts: an ItemPropertyContainerBox that contains an implicitly indexed list of item properties, and one or more ItemPropertyAssociationBox(es) that associate items with item properties. An item property is formatted as a box.

A descriptive item property may be defined as an item property that describes rather than transforms the associated item. A transformative item property may be defined as an item property that transforms the reconstructed representation of the image item content.

An entity may be defined as a collective term of a track or an item. An entity group is a grouping of items, which may also group tracks. An entity group can be used instead of item references, when the grouped entities do not have clear dependency or a directional reference relation. The entities in an entity group share a particular characteristic or have a particular relationship, as indicated by the grouping type.

An entity group is a grouping of items, which may also group tracks. The entities in an entity group share a particular characteristic or have a particular relationship, as indicated by the grouping type.

Entity groups are indicated in GroupsListBox. Entity groups specified in a GroupsListBox of a file-level MetaBox refer to tracks or file-level items. Entity groups specified in a GroupsListBox of a movie-level MetaBox refer to movie-level items. Entity groups specified in a GroupsListBox of a track-level MetaBox refer to track-level items of that track.

A GroupsListBox contains EntityToGroupBoxes, each specifying one entity group. The syntax of EntityToGroupBox may be specified as follows:

```
aligned(8) class EntityToGroupBox(grouping_type, version, flags)
extends FullBox(grouping_type, version, flags) {
    unsigned int(32) group_id;
    unsigned int(32) num_entities_in_group;
    for(i=0; i<num_entities_in_group; i++)
        unsigned int(32) entity_id;
    // the remaining data may be specified
    // for a particular grouping_type
}
``` wherein entity_id is resolved to an item, when an item with item_ID equal to entity_id is present in the hierarchy level (file, movie or track) that contains the GroupsListBox, or to a track, when a track with track_ID equal to entity_id is present and the GroupsListBox is contained in the file level.

Region-wise packing information may be encoded as metadata in or along the video bitstream, e.g., in a RegionWisePackingBox of OMAF and/or in a region-wise packing SEI message of HEVC or H.264/AVC. For example, the packing information may comprise a region-wise mapping from a pre-defined or indicated source format to the packed frame format, e.g., from a projected picture to a packed picture, as described earlier.

Region-wise packing may for example be rectangular region-wise packing. An example rectangular region-wise packing metadata is described next in the context of associating regions of an omnidirectional projected picture (e.g., of equirectangular or cubemap projection) with regions of a packed picture (e.g., being subject to encoding or decoding): For each region, the metadata defines a rectangle in a projected picture, the respective rectangle in the packed picture, and an optional transformation of rotation by 90, 180, or 270 degrees and/or horizontal and/or vertical mirroring. Rectangles may for example be indicated by the locations of the top-left corner and the bottom-right corner. The mapping may comprise resampling. As the sizes of the respective rectangles can differ in the projected and packed pictures, the mechanism infers region-wise resampling.

A Multipurpose Internet Mail Extension (MIME) is an extension to an email protocol which makes it possible to transmit and receive different kinds of data files on the Internet, for example video and audio, images, software, etc. An internet media type is an identifier used on the Internet to indicate the type of data that a file contains. Such internet media types may also be called content types. Several MIME type/subtype combinations exist that can contain different media formats. Content type information may be included by a transmitting entity in a MIME header at the beginning of a media transmission. A receiving entity thus may need to examine the details of such media content to determine if the specific elements can be rendered given an available set of codecs. Especially when the end system has limited resources, or the connection to the end system has limited bandwidth, it may be helpful to know from the content type alone if the content can be rendered.

Internet Engineering Tasking Force (IETF) Request for Comments (RFC) 6381 specifies two parameters, namely, 'codecs' and 'profiles', that are used with various MIME types or type/subtype combinations to allow for unambiguous specification of the codecs employed by the media formats contained within, or the profile(s) of the overall container format.

By labelling, in the codecs MIME parameter, content with the specific codecs indicated to render the contained media, receiving systems can determine if the codecs are supported by the end system, and if not, can take appropriate action (such as rejecting the content, sending notification of the situation, transcoding the content to a supported type, fetching and installing the required codecs, further inspection to determine if it will be sufficient to support a subset of the indicated codecs, etc.).

For file formats derived from the ISOBMFF, the codecs parameter specified in RFC 6381 is derived from the sample entry type(s) of the track(s) of the file described by the MIME type.

Similarly, the profiles parameter specified in RFC 6381 can provide an overall indication, to the receiver, of the specifications with which the content complies. This is an indication of the compatibility of the container format and its contents to some specification. The receiver may be able to work out the extent to which it can handle and render the content by examining to see which of the declared profiles it supports, and what they mean. For file formats derived from the ISOBMFF, the profiles MIME parameter contains a list of four-character codes that are indicated as compatible brands in the FileTypeBox of the file described by the MIME type.

Regardless of the file format of the video bitstream, the apparatus of an example embodiment may be provided by any of a wide variety of computing devices including, for example, a video encoder, a video decoder, a computer workstation, a server or the like, or by any of various mobile computing devices, such as a mobile terminal, e.g., a smartphone, a tablet computer, a video game player, or the like.

Regardless of the computing device that embodies the apparatus, the apparatus 10 of an example embodiment includes, is associated with or is otherwise in communication with processing circuitry 12, a memory 14, a communication interface 16 and optionally, a user interface 18 as shown in FIG. 1.

The processing circuitry 12 may be in communication with the memory device 14 via a bus for passing information among components of the apparatus 10. The memory device may be non-transitory and may include, for example, one or more volatile and/or non-volatile memories. In other words, for example, the memory device may be an electronic storage device (e.g., a computer readable storage medium) comprising gates configured to store data (e.g., bits) that may be retrievable by a machine (e.g., a computing device like the processing circuitry). The memory device may be configured to store information, data, content, applications, instructions, or the like for enabling the apparatus to carry out various functions in accordance with an example embodiment of the present disclosure. For example, the memory device could be configured to buffer input data for processing by the processing circuitry. Additionally or alternatively, the memory device could be configured to store instructions for execution by the processing circuitry.

The apparatus 10 may, in some embodiments, be embodied in various computing devices as described above. However, in some embodiments, the apparatus may be embodied as a chip or chip set. In other words, the apparatus may comprise one or more physical packages (e.g., chips) including materials, components and/or wires on a structural assembly (e.g., a baseboard). The structural assembly may provide physical strength, conservation of size, and/or limitation of electrical interaction for component circuitry included thereon. The apparatus may therefore, in some cases, be configured to implement an embodiment of the present disclosure on a single chip or as a single "system on a chip." As such, in some cases, a chip or chipset may constitute means for performing one or more operations for providing the functionalities described herein.

The processing circuitry 12 may be embodied in a number of different ways. For example, the processing circuitry may be embodied as one or more of various hardware processing means such as a coprocessor, a microprocessor, a controller, a digital signal processor (DSP), a processing element with or without an accompanying DSP, or various other circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processing circuitry may include one or more processing cores configured to perform independently. A multi-core processing circuitry may enable multiprocessing within a single physical package. Additionally or alternatively, the processing circuitry may include one or more processors configured in tandem via the bus to enable independent execution of instructions, pipelining and/or multithreading.

In an example embodiment, the processing circuitry 12 may be configured to execute instructions stored in the memory device 14 or otherwise accessible to the processing circuitry. Alternatively or additionally, the processing circuitry may be configured to execute hard coded functionality. As such, whether configured by hardware or software methods, or by a combination thereof, the processing circuitry may represent an entity (e.g., physically embodied in circuitry) capable of performing operations according to an embodiment of the present disclosure while configured accordingly. Thus, for example, when the processing circuitry is embodied as an ASIC, FPGA or the like, the processing circuitry may be specifically configured hardware for conducting the operations described herein. Alternatively, as another example, when the processing circuitry is embodied as an executor of instructions, the instructions may specifically configure the processor to perform the algorithms and/or operations described herein when the instructions are executed. However, in some cases, the processing circuitry may be a processor of a specific device (e.g., an image or video processing system) configured to employ an embodiment of the present invention by further configuration of the processing circuitry by instructions for performing the algorithms and/or operations described herein. The processing circuitry may include, among other things, a clock, an arithmetic logic unit (ALU) and logic gates configured to support operation of the processing circuitry.

The communication interface 16 may be any means such as a device or circuitry embodied in either hardware or a combination of hardware and software that is configured to receive and/or transmit data, including video bitstreams. In this regard, the communication interface may include, for example, an antenna (or multiple antennas) and supporting hardware and/or software for enabling communications with a wireless communication network. Additionally or alternatively, the communication interface may include the circuitry for interacting with the antenna(s) to cause transmission of signals via the antenna(s) or to handle receipt of signals received via the antenna(s). In some environments, the communication interface may alternatively or also support wired communication. As such, for example, the communication interface may include a communication modem and/or other hardware/software for supporting communication via cable, digital subscriber line (DSL), universal serial bus (USB) or other mechanisms.

In some embodiments, such as in instances in which the apparatus 10 is configured to encode the video bitstream, the apparatus 10 may optionally include a user interface 18 that may, in turn, be in communication with the processing circuitry 12 to provide output to a user, such as by outputting an encoded video bitstream and, in some embodiments, to receive an indication of a user input. As such, the user interface may include a display and, in some embodiments, may also include a keyboard, a mouse, a joystick, a touch screen, touch areas, soft keys, a microphone, a speaker, or other input/output mechanisms. Alternatively or additionally, the processing circuitry may comprise user interface circuitry configured to control at least some functions of one or more user interface elements such as a display and, in some embodiments, a speaker, ringer, microphone and/or the like. The processing circuitry and/or user interface circuitry comprising the processing circuitry may be configured to control one or more functions of one or more user interface elements through computer program instructions (e.g., software and/or firmware) stored on a memory accessible to the processing circuitry (e.g., memory device 14, and/or the like).

When describing HEVC and in certain example embodiments, common notation for arithmetic operators, logical operators, relation operators, bit-wise operators, assignment operators, and range notation e.g., as specified in HEVC may be used. Furthermore, common mathematical functions e.g., as specified in HEVC may be used and a common order or precedence and execution order (from left to right or from right to left) of operators e.g., as specified in HEVC may be used.

When describing example embodiments that utilize HEVC, only the relevant parts of syntax structures are included in the description of the syntax and semantics. However, other embodiments could be realized similarly with a different order and names of syntax elements.

When describing example embodiments, the term file is sometimes used as a synonym of syntax structure or an instance of a syntax structure. In other contexts, the term file may be used to mean a computer file, that is a resource forming a standalone unit in storage.

When describing HEVC and in certain example embodiments, a syntax structure may be specified as described herein. A group of statements enclosed in curly brackets is a compound statement and is treated functionally as a single statement. A "while" structure specifies a test of whether a condition is true, and if true, specifies evaluation of a statement (or compound statement) repeatedly until the condition is no longer true. A "do . . . while" structure specifies evaluation of a statement once, followed by a test of whether a condition is true, and if true, specifies repeated evaluation of the statement until the condition is no longer true. An "if . . . else" structure specifies a test of whether a condition is true, and if the condition is true, specifies evaluation of a primary statement, otherwise, specifies evaluation of an alternative statement. The "else" part of the structure and the associated alternative statement is omitted if no alternative statement evaluation is needed. A "for" structure specifies evaluation of an initial statement, followed by a test of a condition, and if the condition is true, specifies repeated evaluation of a primary statement followed by a subsequent statement until the condition is no longer true.

Volumetric video data represents a three-dimensional scene or object and can be used as input for AR, VR and MR applications. Such data describes geometry (shape, size and position in 3D-space) and respective attributes (e.g. color, opacity, reflectance, etc.), plus any possible temporal changes of the geometry and attributes at given time instances (like frames in 2D video). Volumetric video is either generated from 3D models, i.e. CGI, or captured from real-world scenes using a variety of capture solutions, e.g., multi-camera, laser scan, a combination of video and dedicated depth sensors, and more. Also, a combination of CGI and real-world data is possible. Typical representation formats for such volumetric data are triangle meshes, point clouds, or voxels. Temporal information about the scene can be included in the form of individual capture instances, e.g., "frames" in 2D video, or other mechanisms, e.g., position of an object as a function of time.

Point clouds are a form of volumetric content that is known for its poor compression performance. MPEG has been working on video-based point cloud compression, where point clouds are projected onto 2D surfaces and compressed using traditional video coding tools. With associated metadata 3D point cloud can be reconstructed from the 2D video.

A compressed point cloud includes one or more encoded video bitstream(s) corresponding to the attributes of the 3D object (like spatial attributes, texture, color, reflectance, surface normals), one or more encoded video bitstream corresponding to the geometry of the 3D object, an encoded video bitstream describing the occupancy of 2d surfaces, and an encoded metadata bitstream corresponding to all other auxiliary information which is necessary during the composition of a 3D object. However, there is no well-defined, efficient and standardized storage and signaling mechanism for these streams.

Because volumetric video represents a 3D scene (or object), such data can be viewed from any viewpoint. Therefore, volumetric video is an important format for any AR, VR, or MR applications, especially for providing 6DOF viewing capabilities.

Increasing computational resources and advances in 3D data acquisition devices has enabled reconstruction of highly detailed volumetric video representations of natural scenes. Infrared, lasers, time-of-flight and structured light are all examples of devices that can be used to construct 3D video data. Representation of the 3D data depends on how the 3D data is used. Dense Voxel arrays have been used to represent volumetric medical data. In 3D graphics, polygonal meshes are extensively used. Point clouds on the other hand are well suited for applications such as capturing real world 3D scenes where the topology is not necessarily a 2D manifold. Another way to represent 3D data is coding the 3D data as set of texture and depth map as is the case in the multi-view plus depth. Closely related to the techniques used in multi-view plus depth is the use of elevation maps, and multi-level surface maps.

In dense point clouds or voxel arrays, the reconstructed 3D scene may contain tens or even hundreds of millions of points. If such representations need to be stored or interchanged between computing entities, efficient compression becomes essential. Standard volumetric video representation formats, such as point clouds, meshes and voxels, suffer from poor temporal compression performance. Identifying correspondences for motion-compensation in 3D-space is an ill-defined problem, as both geometry and respective attributes may change. For example, temporal successive "frames" do not necessarily have the same number of meshes, points or voxels. Therefore, compression of dynamic 3D scenes is inefficient. 2D-video based approaches for compressing volumetric data, e.g., multiview and depth, have much better compression efficiency, but rarely cover the full scene. Therefore, they provide only limited 6DOF capabilities.

Because of the limitations of the two approaches mentioned above, a third approach is developed. A 3D scene, represented as meshes, points, and/or voxels, can be projected onto one, or more, geometries. These geometries are "unfolded" onto 2D planes (two planes per geometry: one for texture, one for depth), which are then encoded using standard 2D video compression technologies. Relevant projection geometry information is transmitted alongside the encoded video files to the decoder. The decoder decodes the video and performs the inverse projection to regenerate the 3D scene in any desired representation format (not necessarily the encoding format).

Projecting volumetric models onto 2D planes allows for using 2D video coding tools with highly efficient temporal compression. Thus, coding efficiency is increased greatly. Using geometry-projections instead of 2D-video based approaches, e.g., multiview and depth, provide a better coverage of the scene (and/or object). Thus, 6DOF capabilities are improved. Using several geometries for individual objects improves the coverage of the scene further. Furthermore, standard video encoding hardware can be utilized for real-time compression/decompression of the projected planes. The projection and reverse projection steps are of relatively low complexity.

FIGS. 2A and 2B provide an overview of the compression and decompression processes, respectively, of point clouds. As illustrated in block 202, an apparatus, such as apparatus 10 of FIG. 1, includes means, such as the processing circuitry 12, for patch generation after receiving input point cloud frames. The patch generation process aims at decomposing the point cloud into a minimum number of patches with smooth boundaries, while also minimizing the reconstruction error. One example way of patch generation is specified in MPEG document Point Cloud Coding Test Model Category 2 version 0.0 (TMC2V0). The approach is described as follows.

First, the normal at every point is estimated. An initial clustering of the point cloud is then obtained by associating each point with one of the following six oriented planes, defined by their normal:
 (1.0, 0.0, 0.0),
 (0.0, 1.0, 0.0),
 (0.0, 0.0, 1.0),
 (−1.0, 0.0, 0.0),
 (0.0, −1.0, 0.0), and
 (0.0, 0.0, −1.0).

Each point is associated with the plane that has the closest normal (e.g., maximizes the dot product of the point normal and the plane normal). The initial clustering is then refined by iteratively updating the cluster index associated with each point based on its normal and the cluster indices of its nearest neighbours. The final step consists of extracting patches by applying a connected component extraction procedure.

As illustrated in block 204, the apparatus includes means, such as the processing circuitry 12, for packing. The packing process aims at mapping the extracted patches onto a 2D grid while trying to minimize the unused space and guaranteeing that every T×T (e.g., 16×16) block of the grid is associated with a unique patch. T is a user-defined parameter that is encoded in a bitstream and sent to a decoder. One example packing strategy is specified in TMC2v0.

The packing strategy specified in TMC2v0 is a simple packing strategy that iteratively tries to insert patches into a W×H grid. W and H are user defined parameters, which correspond to the resolution of the geometry/texture images that will be encoded. The patch location is determined through an exhaustive search that is performed in raster scan order. The first location that can guarantee an overlapping-free insertion of the patch is selected and the grid cells covered by the patch are marked as used. If no empty space in the current resolution image can fit a patch, then the height H of the grid is temporarily doubled and the search is conducted again. At the end of the process, H is clipped so as to fit the used grid cells.

As illustrated in blocks 206A and 206B, the apparatus includes means, such as the processing circuitry 12, for image generation. The image generation process utilizes the 3D to 2D mapping computed during the packing process to store the geometry and texture of the point cloud as images. In order to better handle the case of multiple points being projected to the same pixel, each patch is projected onto two images, referred to as layers. More precisely, let H(u,v) be the set of points of the current patch that get projected to the same pixel (u, v). The first layer, also called the near layer, stores the point of H(u,v) with the lowest depth D0. The second layer, referred to as the far layer, captures the point of H(u,v) with the highest depth within the interval [D0, D0+$\Delta$], where $\Delta$ is a user-defined parameter that describes the surface thickness. In some embodiments, the generated videos may have a geometry video of W×H YUV420-8 bit and texture of W×H YUV420-8 bit. YUV is a color encoding system where Y stand for luminance component and UV stand for two chrominance components.

As illustrated in block 208, the apparatus includes means, such as the processing circuitry 12, for image padding. The apparatus is configured to pad the geometry and texture images. The padding process aims at filling the empty space between patches in order to generate a piecewise smooth image suited for video compression. One example way of padding is provided in TMC2v0. The padding strategy in TMC2v0 is specified as follows:
 Each block of T×T (e.g., 16×16) pixels is processed independently.
 If the block is empty (that is, all its pixels belong to empty space), then the pixels of the block are filled by copying either the last row or column of the previous T×T block in raster order.
 If the block is full (that is, no empty pixels), nothing is done.
 If the block has both empty and filled pixels, then the empty pixels are iteratively filled with the average value of their non-empty neighbors.

As illustrated in block 210, the apparatus further includes means, such as the processing circuitry 12, for video compression. The apparatus is configured to compress the padded texture images and padded geometry images into geometry video and texture video. The generated images/layers are stored as video frames and compressed using a video codec. One example video codec used is the HEVC Test Model 16 (HM16) video codec according to the HM16 configurations provided as parameters. As illustrated in block 212, the apparatus includes means, such as the processing circuitry 12, for auxiliary patch-info compression. The following metadata may be encoded for every patch:

Index of the projection plane
   Index 0 for the planes (1.0, 0.0, 0.0) and (−1.0, 0.0, 0.0)
   Index 1 for the planes (0.0, 1.0, 0.0) and (0.0, −1.0, 0.0)
   Index 2 for the planes (0.0, 0.0, 1.0) and (0.0, 0.0, −1.0).
2D bounding box (u0, v0, u1, v1)
3D location (x0, y0, z0) of the patch represented in terms of depth δ0, tangential shift s0 and bi-tangential shift r0. According to the chosen projection planes, (δ0, s0, r0) are computed as follows:
   Index 0, δ0=x0, s0=z0 and r0=y0
   Index 1, δ0=y0, s0=z0 and r0=x0
   Index 2, δ0=z0, s0=x0 and r0=y0
Mapping information providing for each T×T block its associated patch index may be encoded as follows:
   For each T×T block, let L be the ordered list of the indexes of the patches such that their 2D bounding box contains that block. The order in the list is the same as the order used to encode the 2D bounding boxes. L is called the list of candidate patches.
   The empty space between patches is considered as a patch and is assigned the special index 0, which is added to the candidate patches list of all the blocks.
   Let I be index of the patch to which belongs the current T×T block and let J be the position of I in L. Instead of explicitly encoding the index I, its position J is arithmetically encoded instead, which leads to better compression efficiency.

As illustrated in block 214, the apparatus may further include means, such as the processing circuitry 12, for compressing occupancy map. As illustrated in block 216, the apparatus further includes means, such as the processing circuitry 12, for multiplexing the compressed geometry video, compressed texture video, compressed auxiliary patch information, and compressed occupancy map into a point cloud compression (PCC) coded bitstream. A compressed point cloud is comprised of: an encoded video bitstream corresponding to the texture of the 3D object; an encoded video bitstream corresponding to the geometry of the 3D object; and an encoded metadata bitstream corresponding to all other auxiliary information which is necessary during the composition of 3D object. These three information streams are multiplexed together and later utilized together in order to decode 3D object point cloud data at a given instance in time. FIG. 3 provides a graphical example of the information.

The multiplexing representation is at bitstream level and some features need to be implemented, such as: 1) time-wise random access and calculation of exact byte location for such random access; 2) compact representation of metadata when it is repeated for group of frames; 3) file storage mechanism and delivery via mechanisms such as ISOBMFF and MPEG-DASH; and 4) Alternative representations of video and auxiliary data streams for delivery channel adaptation (quality, resolution, frame-rate, bitrate, etc.).

In embodiments related to ISOBMFF, a brand may be defined to indicate that the file contains PCC encoded bitstreams. A possible four-character code for the brand could be or include, but is not limited to, 'pccf'. The brand may be included in a FileTypeBox and/or may be used in signalling, such as within the value for the optional profiles MIME parameter. The brand may be present in a major, minor or compatible brands list. In an embodiment, the brand may be present in the track level, e.g., in a TrackTypeBox, if a track level brand storage mechanism is present. In an embodiment, the brand may be present in the group level, e.g., in the EntityToGroupBox that groups the texture, geometry, and PCC metadata tracks, if a group level brand storage mechanism is present. A new media handler type for the PCC metadata track may be defined as "pcch" and stored in the handler_type field of the HandlerBox ("hdlr") in the MediaBox of the PCC metadata track. The structure as defined in ISOBMFF could be as follows

```
aligned(8) class HandlerBox extends FullBox('hdlr', version = 0, 0) {
    unsigned int(32) pre_defined = 0;
    unsigned int(32) handler_type;
    const unsigned int(32)[3] reserved = 0;
    string name;
}
``` wherein handler_type defines the media handler type for PCC metadata track. This field may contain the 4-character code "pcch". In the syntax structure above as well as in other example syntax structures, syntax elements may be assigned to have a pre-defined value that the file author is required to obey. For example, in the syntax structure above, a file writer is required to set the value of the syntax element pre_defined to 0. Similarly, variables or input parameters for functions, such as version in the syntax above, may have predefined values. For example, the value of the version parameter is required to be equal to 0 in the syntax above. However, such assignments to predefined values may not be necessary for other embodiments, and certain embodiments can be similarly realized with other predefined values or without the syntax elements, variables, or input parameters assigned to predefined values. In one embodiment, PCC global bitstream information, such as but not limited to global scaling, translation and rotation, could be stored in a separate box/full box. Such a box may be called a PCCInfoBox with a 4-character code "pcci". An example is provided as follows:

```
aligned(8) class PCCInfoBox extends FullBox('pcci', version = 0, 0) {
    unsigned int(32)[3] global_scaling;
    unsigned int(32)[3] global_translation;
    unsigned int(32)[4] global_rotation;
    unsigned int(8) number_of_layers;
}
``` global_scaling and global_translation are defined as independent values matching each global axis x, y, and z. global_rotation is represented as a quaternion (w,x,y,z). The benefit of using quaternions instead of Euler angles is that quaternions are more univocal as they do not depend on the order of Euler rotations. Also, quaternions are not vulnerable to "gimbal locking". With global_scaling, global_translation and global_rotation, a transformation matrix can be generated to arbitrarily transform point cloud data in space. The benefit of providing these values separately instead of a holistic transformation matrix is developer convenience and the possibility to ignore certain components of transformation. The number_of_layers indicates the total number of layers.

A syntax element PCCIInfoBox may be present in the Handler Box of the PCC metadata track or the Media Header Box of the PCC metadata track. These boxes may be extended as a new box or extended with a new full box version or extended with a flag definition. In order to include the PCCIInfoBox, example implementations of this new data structure could be as follows:

```
aligned(8) class HandlerBox extends FullBox('hdlr', version = 0, 0) {
    unsigned int(32) pre_defined = 0;
    unsigned int(32) handler_type;
    const unsigned int(32)[3] reserved = 0;
    string name;
    if (handler_type == "pcch")
        PCCInfoBox( );
}
aligned(8) class HandlerBox extends FullBox('hdlr', version, 0) {
    unsigned int(32) pre_defined = 0;
    unsigned int(32) handler_type;
    const unsigned int(32)[3] reserved = 0;
    string name;
    if (version == 1)
        PCCInfoBox( );
}
or
aligned(8) class HandlerBox extends FullBox('hdlr', version = 0, flags) {
    unsigned int(32) pre_defined = 0;
    unsigned int(32) handler_type;
    const unsigned int(32)[3] reserved = 0;
    string name;
    if (flags & 1)
            PCCInfoBox( );
    }
```

In the first syntax structure above, the presence of PCCInfoBox is conditioned by the handler_type being "pcch". In the second syntax structure above, the presence of PCCInfoBox is conditioned by the version field of the box header being equal to 1. In the third syntax structure above, the presence of PCCInfoBox is conditioned by the flags field of the box header having a particular bit equal to 1.

In the syntax structure above and in other example syntax structures, "&" may be defined as a bit-wise "and" operation. When operating on (signed) integer arguments, the bit-wise "and" operation operates on a two's complement representation of the integer value. When operating on a binary argument that contains fewer bits than another argument, the shorter argument is extended by adding more significant bits equal to 0.

In another embodiment, the PCCInfoBox contents may be stored in the PCC metadata sample entry. A new sample entry type of "pcse" may be defined. An example could be as follows:

```
class PCCMetadataSampleEntry( ) extends MetaDataSampleEntry('pcse')
{
    PCCInfoBox( );
    Box[ ] other_boxes; // optional
}
```

In another embodiment, the PCC bitstream global information may be stored in the file/movie/track level MetaBox, utilizing the ItemInfoBox. The item which contains the PCC global bitstream information may utilize its own MIME type such as but not limited to 'pcci' which is stored in the item_type field of the ItemInfoEntry( ) box. Additionally, a new entity grouping may be defined in EntityToGroupBox( ) contained in a MetaBox. A new Entity grouping may be defined such as 'pcgr'. PCC metadata tracks, video and texture media tracks and related metadata items may be grouped together inside the defined 'pcgr' grouping. An example can be represented as follows: Texture video track id=1; Geometry video track id=2; PCC metadata track id=3; and PCC bitstream global information stored as a metadata item with item_id=101.

A new Entity Grouping may be defined with the following syntax:

```
aligned(8) class EntityToGroupBox(grouping_type, version, flags)
extends FullBox(grouping_type, version, flags) {
    unsigned int(32) group_id;
    unsigned int(32) num_entities_in_group;
    for(i=0; i<num_entities_in_group; i++)
        unsigned int(32) entity_id;
// the remaining data may be specified for a particular grouping_type
}
``` grouping_type identifies the new entity grouping type. A new grouping_type four-character code such as but not limited to 'pcgr' may be defined for the entity grouping. group_id represents an identifier for the group in the form of a numerical value. num_entities_in_group represents the number of entities in group, which is set to 4 in this example (texture track, geometry video track, PCC metadata track, and PCC bitstream global information stored as a metadata item). listed entity_ids is a list of the entity_ids for the entities which in this example is [1, 2, 3, 101].

In one embodiment, the order of these entities may be predefined such as {texture, geometry, pcc metadata, pcc global information}. The order may be any defined order. In case there is no order definition, the handler types of the tracks and item types may be used to identify the types of the grouped entities.

In another embodiment, an EntitytoGroupBox box may be extended to store the PCCInfoBox. The syntax may be as follows:

```
aligned(8) class EntityToGroupBox(grouping_type, version, flags)
extends FullBox(grouping_type, version, flags) {
    unsigned int(32) group_id;
    unsigned int(32) num_entities_in_group;
    for(i=0; i<num_entities_in_group; i++)
        unsigned int(32) entity_id;
// the remaining data may be specified for a particular grouping_type
    if (grouping_type == 'pcgr')
        PCCInfoBox( )
}
```

In such a case, there may be no need to define an item type of 'pcci' in order to store the PCC global information.

In order to indicate the grouping relationship of PCC tracks, a track grouping may be defined. Such a track grouping information may be stored in each related media and timed metadata track or a subset of such tracks. Track Grouping may be defined using track grouping mechanism as follows:

```
aligned(8) class TrackGroupBox extends Box('trgr') {
}
aligned(8) class TrackGroupTypeBox(unsigned int(32) track_group_type)
extends
FullBox(track_group_type, version = 0, flags = 0)
{
    unsigned int(32) track_group_id;
    // the remaining data may be specified for a particular
    track_group_type
}
```

A new track_group_type such as but not limited to 'pctg' may be defined for the PCC track grouping. In another embodiment, PCC global information may be embedded inside the TrackGroupTypeBox as follows:

```
aligned(8) class TrackGroupTypeBox(unsigned int(32) track_group_type)
extends
FullBox(track_group_type, version = 0, flags = 0)
{
    unsigned int(32) track_group_id;
    // the remaining data may be specified for a particular
    track_group_type
    if (track_group_type == 'pctg')
        PCCInfoBox( )
}
```

Media and time metadata tracks which have the same {track_group_type, track_group_id} pair could belong to the same PCC 3D representation.

In some embodiments, in addition to or instead of the track grouping mechanism and/or the entity grouping mechanism described above, as shown in block 59, a track referencing mechanism may be utilized to indicate the PCC track relationships. As shown in block 59, the apparatus includes means, such as the processing circuitry 12, for associating the auxiliary timed metadata track with the track group defined before by using track referencing. TrackReferenceBox with the following ISOBMFF-defined syntax may be utilized as follows:

```
aligned(8) class TrackReferenceBox extends Box('tref') {
    TrackReferenceTypeBox [ ];
}
aligned(8) class TrackReferenceTypeBox (unsigned int(32)
reference_type) extends
Box(reference_type) {
    unsigned int(32) track_IDs[ ];
}
```

The 4-character codes described herein are listed as examples. Any set of the listed track references or alike may be present in a file storing PCC tracks.
  A PCC texture track may reference the PCC metadata track with a reference_type of 'pcct'.
  A PCC geometry track may reference the PCC metadata track or a PCC texture track with a reference_type of 'pccg'.
  A PCC metadata track may reference the PCC texture and geometry tracks with a reference_type of 'pccm'. In such a case, both the texture and the geometry track ids could be listed in the TrackReferenceBox with type 'pccm' of the PCC metadata track.

In some alternative embodiments, a texture or geometry track may reference multiple metadata tracks if such tracks are represented by the same PCC metadata track but differ in certain characteristics such as bitrate, resolution, video quality, etc. Track alternatives may also be derived using the ISOBMFF-provided alternative track mechanisms. For example, the same alternate_group value of TrackHeaderBox could be used for tracks that represent the same data with different characteristics.

In some alternative embodiments, a PCC metadata track may have two different track references pointing to the texture and geometry video tracks, such as a TrackReferenceTypeBox with 'pcct' reference_type to point to the texture video track and a TrackReferenceTypeBox with 'pccg' reference_type to point to the geometry video track. In another embodiment, video and geometry tracks may be packed to a single video frame. In such a case, the packed video frames which are stored in a video track may have a TrackReferenceTypeBox with 'pccp" reference_type to point to the PCC metadata track or vice-versa (e.g., a PCC metadata track containing a TrackReferemceTypeBox with 'pccp' reference_type and pointing to the PCC packed video track.)

In another embodiment, the texture and geometry tracks may be grouped using track grouping type of (but not limited to) "pctg" with a particular track_group_id. The auxiliary metadata of PCC may be stored as a timed metadata track with a dedicated handler type such as (but not limited to) "pccm" and reference to the track_group_id by utilizing the "cdtg" track reference type. This may indicate the PCC auxiliary timed metadata describes the texture and geometry tracks collectively.

In some embodiments, a PCC metadata track may contain PCC auxiliary information samples in the following methods. In one embodiment, the first sample of each PCC Group of Frames (GOF) may contain the GOF header information and the auxiliary metadata bitstream corresponding to the texture and geometry samples of the same composition time. In another embodiment, such samples may be marked as "sync" samples, e.g., by utilizing the sync sample box (a.k.a. SyncSampleBox). In such a case, random access could be possible at each GOF boundary. All other PCC metadata samples may contain the corresponding PCC auxiliary metadata of a texture of geometry sample in their corresponding texture and geometry tracks. In another embodiment, each PCC metadata sample may have a corresponding sample auxiliary information in the sample table box which may store the GOF header bitstream. This auxiliary sample information may be defined only for the sync samples of PCC metadata track or every sample of the PCC metadata track. In another embodiment, GOF Header information may be stored in the PCC metadata track sample entries. Each GOF may then refer to the sample entry index which contains the related GOF Header bitstream information. A possible data structure could be as follows:

```
class PCCMetaDataSampleEntry( ) extends MetaDataSampleEntry('pcse')
{
    PCCInfoBox( ); //may be present optionally
        GOFHeaderBox( );
    Box[ ] other_boxes; // optional
}
```

GOFHeaderBox may have the following syntax:

```
aligned(8) class GOFHeaderBox extends FullBox('gofh', version = 0, 0) {
    unsigned int(8) groupofFramesSize;
    unsigned int(16) frameWidth;
    unsigned int(16) frameHeight;
    unsigned int(8) occupancyResolution;
    unsigned int(8) radiusToSmoothing;
    unsigned int(8) neighborCountSmoothing;
    unsigned int(8) radius2BoundaryDetection;
    unsigned int(8) thresholdSmoothing;
}
``` groupOfFramesSize indicates the number of frames in the current group of frames. frameWidth indicates the geometry or texture picture width. frameHeight indicates the geometry/Texture picture height. occupancyResolution indicates the occupancy map resolution. radiusToSmoothing indicates the radius to detect neighbours for smoothing. neighborCountSmoothing indicates the maximum number of neighbours used for smoothing. radius2BoundaryDetection indicates the radius for boundary point detection. thresholdSmoothing indicates the smoothing threshold.

In some embodiments, a separate timed metadata track may be defined to store the GOF header samples. In such a scenario, such a metadata track may have a separate handler type (e.g., 'pcgh') and a track reference to the PCC metadata track (e.g., of reference type 'pcgr'). If such a track exists and track grouping is used to group texture, geometry and metadata tracks, then such a metadata track may also be listed in the track grouping.

In some embodiments, metadata samples that belong to a GOF may be grouped together in order to form sample groups and their related GOF header information may be stored in the SampleGroupDescriptionEntry in the SampleGroupDescriptionBox. One example syntax is:

```
class PCCMetadataSampleGroupEntry( ) extends
SampleGroupDescriptionEntry('pmsg') {
    GOFHeaderBox( )
}
```

In some embodiments, the 'pmsg' sample group or alike is present in the track containing the dynamic PCC metadata. In some embodiments, the 'pmsg' sample group or alike is present in any of the video tracks (e.g. the texture video track or the geometry video track).

In some cases, e.g. when encoding and streaming live feeds, it may be necessary to include new GOF headers in the bitstream after creating the initial MovieBox. In such cases, new GOF headers can be introduced in the SampleGroupDescriptionBox included in the MovieFragmentBox. It is remarked that introducing GOF headers in the SampleGroupDescriptionBox included in the MovieFragmentBox may be used in but is not limited to encoding and streaming of live feeds.

A PCCMetadata sample may contain GOF Header information, GOF Auxiliary information as well as GOF occupancy map information. In some embodiments, the GOF Header information, GOF Auxiliary information as well as GOF occupancy map information is defined as their corresponding parts in the PCC Category 2 coding Working Draft. The GOF Header information was provided above. Example GOF auxiliary information includes the following:

| | |
|---|---|
| patchCount[frame] | is the number of patches in the current geometry and texture video frame. It may or shall be larger than 0 |
| occupancyPrecision[frame] | is the horizontal and vertical resolution, in pixels, of the occupancy map. This corresponds to the sub-block size for which occupancy is signaled |
| maxCandidateCount[frame] | specifies the maximum number of candidates in the patch candidate list |
| bitCountU0[frame] | specifies the number of bits for fixed-length coding of u0 |
| bitCountV0[frame] | specifies the number of bits for fixed-length coding of v0 |
| bitCountU1 [frame] | specifies the number of bits for fixed-length coding of u1 |
| bitCountV1[frame] | specifies the number of bits for fixed-length coding of v1 |
| bitCountD1[frame] | specifies the number of bits for fixed-length coding of d1 |
| compressedBitstreamSize[frame] | is the number of bytes used for coding patch information and occupancy map. |
| [frame].[patch].patchU0 | is the x-coordinate of the top-left corner of the patch bounding box. The value of patchU0 may or shall be in the range of 0 to frameWidth-1, inclusive |
| [frame].[patch].patchV0 | is the y-coordinate of the top-left corner of the patch bounding box. The value of patchV0 may or shall be in the range of 0 to frameHeight −1, inclusive |
| [frame].[patch].patchU1 | is the x-coordinate of the bottom-right corner of the patch bounding box. The value of patchV1 may or shall be in the range of 0 to frameWidth −1, inclusive |
| [frame].[patch].patchV1 | is the y-coordinate of the bottom-right corner of the patch bounding box. The value of patchU1 may or shall be in the range of 0 to frameHeight −1, inclusive |
| [frame]. [patch].patchD1 | is the minimum depth of the patch. The value of patchD1 may or shall be in the range of 0 to < . . . >, inclusive |
| [frame].[patch].deltaSizeU0 | is the difference of patch width between the current patch and the previous one. The value of deltaSizeU0 may or shall be in the range of < . . > to < . . >, inclusive |
| [frame].[patch].deltaSizeV0 | is the difference of patch height between the current patch and the previous one. The value of deltaSizeV0 may or shall be in the range of < . . > to < . . >,inclusive |

| | -continued |
|---|---|
| [frame].[patch].normalAxis | specifies the plane projection index. The value of normalAxis may or shall be in the range of 0 to 2, inclusive of all values and ranges therebetween. normalAxis values 0, 1, and 2 correspond to the X, Y, and Z projection axis, respectively |
| [frame].[patch].samplingX | patch sampling in X direction |
| [frame].[patch].samplingY | patch sampling in Y direction |
| [frame].[patch].samplingZ | patch sampling in Z direction |
| [frame].[patch].rotation | patch rotation in 3D space |
| candidateIndex | is the index into that patch candidate list. The value of candidateIndex may or shall be in the range of 0 to maxCandidateCount, inclusive |
| patchIndex | is the actual patch index |

In some embodiments, to accommodate the situation where only one single video decoder instance is available at an instance of time, there is only one single video bitstream fed to the video decoder.

In some embodiments, a spatial frame packing approach may be utilized to put texture and geometry video frames into a single video frame. A frame packing arrangement SEI message or another SEI message with similar content as the frame packing arrangement SEI message may be utilized to signal such packing in a video bitstream level. A restricted video scheme may be utilized to signal such packing at the file format level.

An alternative may be to perform a region-wise packing and create a "packed PCC frame". Such an approach may enable different geometric transformations such as rotation, scaling, etc. to be applied on the texture and geometry frames. A new type of "region-wise packing" restricted scheme type may be defined and signaled in the SchemeInformationBox in ISOBMFF.

Another alternative may be utilizing a temporal interleaving mechanism for texture and geometry frames and making sure that the prediction dependencies of the frames are only from the same type of frames (e.g., either texture or geometry). In another embodiment, such a restriction may be relaxed. Such an encoding configuration may be signaled in the SchemeInformationBox of the media track with a new type definition. The sample composition times for such interleaved frames would be the composition time of the second frame of the {texture, geometry} pair. Moreover, an indicator field may be defined to signal the type of the first video frame.

In another embodiment, a group of video frames of the same type may be consecutive to each other. In such a case, the sample composition times may be signaled on the consecutive frames of the same type and then applied on the same number of frames adjacent to the group of frames in decoding order (e.g., sample timings of N texture frames are applied to the next N geometry frames, which are then followed by N texture frames and so on). A new temporal packing type indicator may be defined to signal such an interleaving scheme.

In some embodiments, an apparatus can include means, such as the processing circuitry 12, for accessing the texture information bitstream, the geometry information bitstream, and the auxiliary metadata bitstream. In some embodiments, the apparatus can include means, such as the processing circuitry 12, for packing the texture information bitstream and the geometry information bitstream into one video media track. In some embodiments, the apparatus can include means, such as the processing circuitry 12, for storing the auxiliary metadata information in a timed metadata track. In some embodiments, the apparatus can include means, such as the processing circuitry 12, the memory 14 or the like, for associating the video media track and the timed metadata track as one group and for storing the video media track and the time metadata track as one group.

With regard to packing the texture information bitstream and the geometry information bitstream into one video media track, in some embodiments, texture and geometry video frames in the bitstream may be spatially packed to a single video frame. A new restricted video scheme may be defined for PCC encoded packed texture and geometry video frames. Such a scheme may be identified by a scheme_type 4-character code of 'ppvs' inside the RestrictedSchemeInfoBox. A new uniform resource identifier (URI) may be defined as the scheme_uri and may be conditionally present depending on box flags. The packed PCC video frame information may be then contained in the SchemeInformationBox of the related video track. Such a box may be called a PCCPackedVideoBox with a 4-char code of 'ppvi'. An example of such a box may be as follows:

```
aligned(8) class SchemeTypeBox extends FullBox('schm', 0, flags) {
    // 4CC identifying the scheme which may be called 'ppvs'
    unsigned int(32) scheme_type;
    unsigned int(32) scheme_version; // scheme version
    if (flags & 0x000001) {
        utf8string scheme_uri; // browser uri
    }
}
```

The following box may reside inside the Scheme Information Box ('schi') and contain PCC packed video specific information:

```
aligned(8) class PCCPackedVideoBox extends FullBox('ppvi', version = 0, 0)
{
PCCSpatialPackingBox( )
    Box[ ] any_box; // optional
}
```

A box called PCCSpatialPackingBox( ) may define how texture and geometry patches could be spatially packed in a video frame, an example is:

```
aligned(8) class PCCSpatialPackingBox extends FullBox('rwpk', 0, 0) {
PCCSpatialPackingStruct( );
}
```

The PCCSpatialPackingStruct( ) may contain the data structure needed to identify each packed region's type, dimensions and spatial location. Such a box may have the following structure:

```
aligned(8) class PCCSpatialPackingStruct( ) {
        unsigned int(8) num_regions;
        unsigned int(32) proj_texture_picture_width;
        unsigned int(32) proj_texture_picture_height;
    unsigned int(32) proj_geometry_picture_width;
        unsigned int(32) proj_geometry_picture_height;
        unsigned int(16) packed_picture_width;
        unsigned int(16) packed_picture_height;
        for (i = 0; i < num_regions; i++) {
            bit(2) reserved = 0;
            unsigned int(1) region_type; // 0=texture; 1=geometry
            unsigned int(1) guard_band_flag[i];
            unsigned int(4) packing_type[i];
            if (packing_type[i] == 0) {
                RectRegionPacking(i);
                if (guard_band_flag[i])
                    GuardBand(i);
            }
        }
}
``` num_regions defines how many packed regions are defined in this data structure. proj_texture_picture_width defines the width of the input video texture frame. proj_texture_picture_height defines the height of the input video texture frame. proj_geometry_picture_width defines the width of the input geometry texture frame. proj_geometry_picture_height defines the height of the input geometry texture frame. packed_picture_width defines the width of the output packed video frame. packed_picture_height defines the height of the output packed video frame.

region_type indicates the type of the packed region. region_type=0 may indicate the source of this region to be a texture video frame. region_type=1 may indicate that the source of this region is a geometry video frame.

guard_band_flag indicates whether the reason has guard bands or not. packing_type indicates the type of region-wise packing. RectRegionPacking specifies the region-wise packing between packed region and the projected region.

In another embodiment, a new projection type such as "orthonormal projection" may be added to the ProjectionFormatBox as defined in the MPEG OMAF specification, which resides inside the Projected Omnidirectional Video ('podv') scheme's ProjectedOmnivideoBox('povd'). In such a case, a PCCPackedVideoBox may reside inside the ProjectedOmnivideoBox and its presence may be signaled by the projection_type which will indicate an orthonormal projection.

In some embodiments, texture and geometry video frames are temporally interleaved to form a single video bitstream. In such a case, a video prediction scheme may be defined so that texture frames are only dependent on the other texture frames and geometry frames are also only dependent on the other geometry frames. The frame rate may be doubled. The composition time of the latter frame may be utilized to indicate the composition time of the temporally interleaved frames. In such a case, a new box called PCCVideoBox may be defined to indicate the temporal packing information. Such a box may reside inside the SchemeInformationBox, when the schemeType may be defined as 'pcci' in order to indicate temporally interleaved PCC texture and geometry frames. An example is:

```
aligned(8) class PCCInterleavedVideoBox extends FullBox('pcci', version = 0, 0)
{
    unsigned int(8) packing_indication_type
}
``` packing_indication_type indicate the type of temporal or spatial packing. Example packing types and values associated are:
    0: spatial packing indicator. This value indicates that a spatial packing scheme is applied and the above-mentioned spatial packing mechanism is utilized on the texture and geometry PCC video frames.
    1: temporally interleaved, texture frame comes first
    2: temporally interleaved, geometry frame comes first In both temporally interleaved and spatially packed use cases, the track referencing mechanism between the auxiliary metadata track and the texture and geometry track may apply. In such a case, a single track reference type; which may be called 'pctg' may be used from/to a PCC auxiliary metadata track to/from a packed/interleaved PCC texture and geometry video track.

In some embodiments using HEVC, in order to support such a mechanism, some data structures as described herein may be defined.

A descriptive item property called PCCPackedFrameProperty may be defined. This property may contain PCCSpatialPackingBox( ) as defined above. Such a property is then linked to the image item which contains the packed texture and geometry image item. One example syntax is:

```
aligned(8) class PCCPackedFrameProperty
    extends ItemFullProperty('ppfp, 0, 0) {
        PCCSpatialPackingBox ( )
}
```

A descriptive item property called PCCAuxiliaryProperty ('pcap') may be defined to include the PCC global parameters and GOF header information. One example syntax is:

```
aligned(8) class PCCAuxiliaryProperty
    extends ItemFullProperty('pcap', 0, 0) {
        PCCInfoBox( );
        GOFHeaderBox( );
}
```

A new item type which is called PCC metadata item may be defined to contain the PCC auxiliary metadata information, which is referred to as a PCC auxiliary metadata sample in above sections. This item may be defined as type 'pcca'.

If no packing is defined or if the original PCC encoded geometry and texture images are also stored in the same media file, the following item properties may be defined:
    A descriptive item property called PCCTextureItemProperty('pcti') may be defined to indicate the PCC encoded texture image item. This property may then be linked to the relevant image item.
    A descriptive item property called PCCGeometryItemProperty('pcgi') may be defined to indicate the PCC encoded geometry image item. This property may then be linked to the relevant image item.
    The above-mentioned descriptive item property called PCCAuxiliaryProperty('pcap') may be used to store the global header and GOF header information.

The above-mentioned PCC metadata item and the two image items with respective item texture and geometry item properties may be grouped together using an Entity Grouping mechanism to indicate that they create a PCC encoded 3D representation. Such an entity grouping may have a type of 'pcce' in the EntitytoGroupBox( ) where all the relevant item_ids of texture, geometry images and PCC auxiliary metadata item may be listed to indicate a group.

In another embodiment, PCCInfoBox, GoFHeaderBox and optionally the contents of the PCC auxiliary metadata information may be listed in the EntityToGroupBox with grouping_type='pcce'. An example of such a data structure is as follows:

```
aligned(8) class EntityToGroupBox(grouping_type='pcce', version, flags)
extends FullBox(grouping_type, version, flags) {
    unsigned int(32) group_id;
    unsigned int(32) num_entities_in_group;
    for(i=0; i<num_entities_in_group; i++)
        unsigned int(32) entity_id;
PCCInfoBox( )//optional
GoFHeaderBox( )//optional
PCCMetadataSample( ) //optional
}
```

In another embodiment, PCCInfoBox or alike is included in the EntityToGroupBox with grouping_type equal to 'pcce' (or some other four-character code indicating PCC) as above. GofHeaderBox or alike may be included in the file by any means described in other embodiments, such as including it in a sample group description entry. Similarly, PCC auxiliary metadata information may be included in the file by any means described in other embodiments.

In another embodiment, all or parts of PCC metadata may be stored in and signalled as SEI messages and carried as part of the video bitstream. Such information may contain the PCC auxiliary sample fields mapped to different or single SEI message and transmitted in conjunction with the texture and geometry elementary bitstreams. In such a case, PCC auxiliary metadata SEI messages may reside in one of the texture or geometry elementary streams and not repeated in both. In this embodiment, there may be no need to store the PCC auxiliary information or metadata information as separate properties or metadata image items.

In another embodiment, new NAL units may be defined to contain the PCC auxiliary metadata information. Such NAL units may then also be stored in the ISOBMFF compliant format as part of the video samples. Again, in such a case, such NAL units may be stored as part of either texture or geometry video tracks or as part of the packed or interleaved texture and geometry track. In this embodiment, there may be no need to store the PCC auxiliary information or metadata information as separate properties or metadata image items.

In another embodiment, NAL units containing PCC auxiliary metadata information and video NAL units may be combined into a single PCC stream and stored in a PCC track where each PCC sample is comprised of one or more texture, geometry and auxiliary information NAL units. In such a case, a single media track or image item may be present in the PCC media file.

In some embodiments, a subset of the geometry, texture, occupancy-map and dynamic time-based metadata may follow the same coding structure. Additionally, the geometry, texture, occupancy-map and dynamic time-based metadata may follow the same timing structure. In such an instance, a single track architecture may be utilized. A multiplexer may be able to multiplex the bitstreams such that coded access-units of geometry, texture, occupancy-map, and dynamic metadata required for reconstructing a point-cloud at one time-instant are adjacent to each other. The order of the collection of access-units may vary between implementations. This multiplexed bitstream is then encapsulated into an mdat box. A single track can consider the consecutive access-units (geometry, texture, occupancy-map, and dynamic metadata) of the multiplexed bitstream as a single PCC media sample. Indication of the sizes of the individual access-units can be signaled using the sub-sample information box that is tailored specifically for a PCC media sample.

In some embodiments of a single track design, the video and timed metadata access-units may be interleaved. A coded geometry, texture, and timed-metadata of one frame follows another geometry, texture and timed-metadata of another frame in sequence. A sample may be a coded geometry, texture, occupancy map and timed-metadata that is required to be decoded for presentation at one time-instant. Indication of sizes of each of the coded sub-parts of an individual sample can be signaled in either the sub-sample information box or stored as sample auxiliary information and referenced by the sample auxiliary information sizes box.

In some embodiments using HEVC, in order to support such a mechanism, some data structures as described herein may be defined.

```
class PCCConfigurationBox extends Box('pccC') {
    HEVCDecoderConfigurationRecord( ) HEVCTextureConfig;
    HEVCDecoderConfigurationRecord( ) HEVCGeometryConfig;
    HEVCDecoderConfigurationRecord( ) HEVCOccupancyConfig;
        PCCInfoBox( ); //may be present optionally
        GOFHeaderBox( );    //may be present optionally
}
```

HEVCDecoderConfigurationRecord( ) may be as defined in the ISO/IEC 14496-15: Information technology—Coding of audio-visual objects—Part 15: Carriage of network abstraction layer (NAL) unit structured video in the ISO base media file format. In another embodiment, different codec configurations could be used together. For example, AVC and HEVC codecs could be utilized for different components and then listed together in the PCCConfigurationBox.

An example HEVCDecoderConfigurationRecord( ) is:

```
aligned(8) class HEVCDecoderConfigurationRecord {
    unsigned int(8) configurationVersion = 1;
    unsigned int(2) general_profile_space;
    unsigned int(1) general_tier_flag;
    unsigned int(5) general_profile_idc;
    unsigned int(32) general_profile_compatibility_flags;
    unsigned int(48) general_constraint_indicator_flags;
    unsigned int(8) general_level_idc;
    bit(4) reserved = '1111'b;
    unsigned int(12) min_spatial_segmentation_idc;
    bit(6) reserved = '111111'b;
    unsigned int(2) parallelismType;
    bit(6) reserved = '111111'b;
    unsigned int(2) chromaFormat;
    bit(5) reserved = '11111'b;
    unsigned int(3) bitDepthLumaMinus8;
    bit(5) reserved = '11111'b;
    unsigned int(3) bitDepthChromaMinus8;
    bit(16) avgFrameRate;
    bit(2) constantFrameRate;
    bit(3) numTemporalLayers;
```

```
        bit(1) temporalIdNested;
        unsigned int(2) lengthSizeMinusOne;
        unsigned int(8) numOfArrays;
        for (j=0; j < numOfArrays; j++) {
            bit(1) array_completeness;
            unsigned int(1) reserved = 0;
            unsigned int(6) NAL_unit_type;
            unsigned int(16) numNalus;
            for (i=0; i< numNalus; i++) {
                unsigned int(16) nalUnitLength;
                bit(8*nalUnitLength) nalUnit;
            }
        }
    }
```

The HEVCDecoderConfigurationRecord( ) includes the size of the length field used in each sample to indicate the length of its contained NAL units as well as the parameter sets, if stored in the sample entry. The HEVCDecoderConfigurationRecord( ) is externally framed (its size must be supplied by the structure which contains it).

The values for general_profile_space, general_tier_flag, general_profile_idc, general_profile_compatibility_flags, general_constraint_indicator_flags, general_level_idc, and min_spatial_segmentation_idc may be valid for all parameter sets that are activated when the stream described by this record is decoded (referred to as "all the parameter sets" in the following sentences in this paragraph). Specifically, the following restrictions apply:

The value of general_profile_space in all the parameter sets may be identical. The tier indication general_tier_flag indicates a tier equal to or greater than the highest tier indicated in all the parameter sets. The profile indication general_profile_idc may indicate a profile to which the stream associated with this configuration record conforms.

Explicit indication may be provided in the HEVC Decoder Configuration Record about the chroma format and bit depth as well as other important format information used by the HEVC video elementary stream. Each type of such information is identical in all parameter sets, if present, in a single HEVC configuration record. If two sequences differ in any type of such information, two different HEVC configuration records are used. If the two sequences differ in color space indications in their VUI information, then two different configuration records are also required. There may be a set of arrays to carry initialization NAL units. The NAL unit types are restricted to indicate SPS, PPS, VPS, and SEI NAL units only.

In some embodiments, different codec configurations could be used together. For example, AVC and HEVC codecs could be utilized for different components and then listed together in the PCCConfigurationBox. In an embodiment, PCCConfigurationBox may contain a subset of the above-mentioned decoder. A PCC sample may then be defined by the PCCSampleEntry, for instance as:

```
    class PCCSampleEntry( ) extends VisualSampleEntry ('pecs'){
        PCCConfigurationBoxconfig;
        MPEG4BitRateBox ( );              // optional
        MPEG4ExtensionDescriptorsBox ( ); // optional
        Box extra_boxes[ ];               // optional
    }
```

The MPEG4BitRateBox signals bitrate information. The MPEG4ExtensionDescriptorsBox includes extension descriptors.

In some embodiments, when a particular track PCC media component is stored in a separate track, the track grouping and referencing mechanisms previously described may apply.

In some embodiments, in order to cause storage of the point cloud compression coded bitstream in accordance with an example embodiment are depicted. This embodiment is applied to an instance for a fragmented ISOBMFF file. Each PCC media component is carried in a separate media track. PCC media components may be interleaved in any particular sample count and order. The smallest granularity could be interleaving of 1 PCC media component after another. In some embodiments, a graphical representation of an example interleaving samples can comprise texture (T), geometry (G), occupancy (O), and auxiliary (A) metadata samples from different tracks interleaved inside the mdat box.

In some embodiments, an apparatus includes means, such as the processing circuitry 12, for accessing the texture information bitstream, the geometry information bitstream, and the auxiliary metadata bitstream. In some embodiments, the apparatus includes means, such as the processing circuitry 12, for storing the texture information bitstream in a texture video media track. In some embodiments, the apparatus includes means, such as the processing circuitry 12, for storing the geometry information bitstream in a geometry video media track. In some embodiments, the apparatus includes means, such as the processing circuitry 12, for storing the auxiliary metadata information bitstream in a timed metadata track. In some embodiments, the apparatus includes means, such as the processing circuitry 12, the memory 14 or the like, for causing construction and storage of an interleaved indicator metadata file indicating an interleaving pattern for one or more components of the texture video media track, the geometry video media track, and the timed metadata track.

An example moof box can comprise or be indicated as:

```
InterleavedMediaIndicatorBox('imin') // this is a new box present at moof or moov level
    traf {
        trun(flag=0x001000)
        ....
    }
    traf {
        trun(flag=0x001000)
        ....
    }
    traf {
        trun(flag=0x001000)
        ...
    }
    traf {
        trun(flag=0x001000)
        ....
    }
    .....
}
```

The newly defined InterleavedMediaIndicatorBox( ) may enable signalling of the following properties:

A media interleaving pattern in the mdat box which follows the same order as the 'traf' boxes in the moof box. The indicated traf boxes belong to the listed track_IDs and may be listed consecutive to each other.

The trun boxes may be associated with example tr_flags=0x001000. This indicates that the sample_size field inside the trun boxes indicates the sample sizes of represented samples of this track based on the interleaving pattern indicated by InterleavedMediaIndicatorBox( ), rather than uninterrupted consecutive run of samples.

An example InterleavedMediaIndicatorBox( ) is:

```
aligned(8) class InterleavedMediaIndicatorBox extends FullBox('imin',
version = 0, 0) {
    unsigned int(1) use_default_interleaving;
    unsigned int(7) number_of_consecutive_samples;
    if (use_default_interleaving == 0) {
        unsigned int(8) track_id_count;
        {
            unsigned int(32) track_ID;
        }[track_id_count]
    }
}
```

InterleavedMediaIndicatorBox may be present in the "moov" or "moof". If it is present in the "moov", it defines a default interleaving strategy. use_default_interleaving, when equals to 1 indicates that the media interleaving pattern which is defined in "moov" box may be used. number_of_consecutive_samples indicates how many samples of the same track are consecutively present. If use_default_interleaving is 1, then this field takes the value 0. Otherwise a value greater than 0 may be present. track_id_count indicates the number of track_IDs listed in the array. track_ID is an integer providing the track identifier for which random access information is provided.

The 'trun' box may be as defined in the ISOBMFF standard:

```
aligned(8) class TrackRunBox
            extends FullBox('trun', version, tr_flags) {
    unsigned int(32)            sample_count;
    // the following are optional fields
    signed int(32)              data_offset;
    unsigned int(32)            first_sample_flags;
    // all fields in the following array are optional
    // as indicated by bits set in the tr_flags
    {
        unsigned int(32)  sample_duration;
        unsigned int(32)  sample_size;
        unsigned int(32)  sample_flags
        if (version == 0)
            { unsigned int(32)   sample_composition_time_offset; }
        else
            { signed int(32)     sample_composition_time_offset; }
    }[ sample_count ]
}
```

The sample_composition_time_offset of Track Run Box is presentation time of accesss unit in media processing unit. This value is offset from the start of MPU. Start presentation time of media processing unit is specified by Composition Information.

In some embodiments, the interleaving strategy may be defined using other means such as pre-defined enumerations or patterns which are signalled out of the band or in the file in a pre-defined box. In some embodiments, in case a single track is used to carry the PCC media data, SubSampleInformationBox may be used to access each of the interleaved PCC components inside the PCC media sample. A new SampleGroupDescriptionBox may be defined to indicate the order and configuration of each of the PCC components.

In some embodiments, where the example embodiments have been described with reference to an encoder, it needs to be understood that the resulting bitstream and the decoder may have corresponding elements configured to perform corresponding functions. In some embodiments, a decoder may comprise means, such as the processing circuitry 12, for receiving a point cloud compression coded bitstream, wherein the point cloud compression coded bitstream comprises a texture information bitstream, a geometry information bitstream, and an auxiliary metadata bitstream. In some embodiments, the decoder may further comprise means, such as the processing circuitry 12, for decoding the point cloud compression coded bitstream.

In some embodiments, where the example embodiments have been described with reference to syntax and semantics, certain embodiments likewise cover an encoder that outputs a bitstream portion according to the syntax and semantics. Likewise, certain embodiments correspondingly cover a decoder that decodes a bitstream portion according to the syntax and semantics.

An example embodiment describes the codec in terms of separate encoder and decoder apparatus in order to assist the understanding of the processes involved. However, it would be appreciated that the apparatus, structures and operations may be implemented as a single encoder-decoder apparatus/structure/operation. Furthermore, it is possible that the coder and decoder may share some or all common elements.

With regard to video-based point cloud compression (V-PCC), V-PCC is quite flexible and as such its encapsulation in an ISOBMFF can be done in several ways. Depending on the practical limitations, not necessarily described in the specification, the use of different structure elements in ISOBMFF may be considered. Previously the discussion around encapsulation of V-PCC content has been revolving around usage of entity grouping or track grouping, where relationships between V-PCC track and components are described in a common place, where the decoder can easily understand how the content should be decoded and rendered. The benefit of this approach has been that it requires little processing at the decoding end to find out how to play the file. However, the major drawback of such system level approach its limitations in the editing, where such relationship signalling need to be updated when tracks are changed.

Some approaches disclosed herein can include track grouping, entity grouping, and track referencing mechanisms to describe the relationships between V-PCC components (metadata and video components), to enable random accessibility of V-PCC content.

In some embodiments, an approach for encapsulation of V-PCC data (e.g., content) in ISOBMFF is described which provides increased flexibility for editing V-PCC content by minimizing the amount of cross referencing between V-PCC-tracks and V-PCC component video tracks, while maintaining the ability to reconstruct a V-PCC conformant bitstram. In some embodiments, to maintain effortless editing capabilities, the amount of duplicated information is also restricted, and more reconstruction responsibility is pushed to decoder components. In some embodiments, an approach such as described herein may make it trivial to add new tracks or remove old tracks from the file, e.g., an ISOBMFF file. In some embodiments, such as with regard to the random-access aspects of a V-PCC-track, such approaches result in random-access structures, such as file structure, data structure, track structure, information structure, and the like. In some embodiments, such random-access structure can be used for V-PCC content and can facilitate or dictate how a V-PCC-track can or should be processed to encapsulate it in an ISOBMFF file. In some embodiments, if a single track approach is taken, the approach can include an approach for how the sub-sample information can be utilized and how the V-PCC bitstream could be stored in the media data.

As described herein, V-PCC sequence parameter sets (SPSs) are structures that describe the overall configurations for V-PCC presentation. SPSs may or shall be stored in V-PCC-track SampleEntries or in SampleGroupEntries of a ISOBMFF container.

In some embodiments, the SPS-structure can comprise any or all of the components in Table 1:

TABLE 1

| sequence_parameter_set( ) { | Descriptor |
|---|---|
| profile_tier_level( ) | |
| sps_sequence_parameter_set_id | u(4) |
| sps_frame_width | u(16) |
| sps_frame_height | u(16) |
| sps_avg_frame_rate_present_flag | u(1) |
| if( sps_avg_frame_rate_present_flag ) | |
|    sps_avg_frame_rate | u(16) |
| sps_enhanced_occupancy_map_for_depth_flag | u(1) |
| sps_layer_count_minus1 | u(4) |
| if( sps_layer_count_minus1 > 0) | |
|    sps_multiple_layer_streams_present_flag | u(1) |
| sps_layer_absolute_coding_enabled_flag[ 0 ] = 1 | |
| for(i = 0, i < sps_layer_count_minus1; i++ ) { | |
|    sps_layer_absolute_coding_enabled_flag[i + 1 ] | u(1) |
|    if( | |
| sps_layer_absolute_coding_enabled_flag[i + 1 ] = = 0 ) { | |
|      if) i > 0) | |
|        sps_layer_predictor_index_diff[ i + 1 ] | ue(v) |
|      else | |
|        sps_layer_predictor_index_diff[ i + 1 ] = 0 | |
|    } | |
| } | |
| sps_pcm_patch_enabled_flag | u(1) |
| if( sps_pcm_patch_enabled_flag ) | |
|    sps_pcm_separate_video_present_flag | u(1) |

TABLE 1-continued

| occupancy_parameter_set( ) | |
|---|---|
| geometry_parameter_set( ) | |
| sps_attribute_count | u(16) |
| for(i = 0, i < sps_attribute_count; i++ ) | |
|    attribute_parameter_set( i ) | |
| sps_patch_sequence_orientation_enabled_flag | u(1) |
| sps_patch_inter_prediction_enabled_flag | u(1) |
| sps_pixel_deinterleaving_flag | u(1) |
| sps_point_local_reconstruction_enabled_flag | u(1) |
| sps_remove_duplicate_point_enabled_flag | u(1) |
| byte_alignment( ) | |
| } | |

In some embodiments, the V-PCC-track can be the metadata track of V-PCC encapsulation, which contains patch data groups (PDG) in its sample data. PDG structure examples are provided in Table 2.

SampleEntry updates tend to reset video decoders in many cases. This behavior may make it more difficult to store sequence parameter sets in V-PCC-track SampleEntries. In some embodiments, such as for streaming of V-PCC content in ISOBMFF format or the like, storing sequence parameter sets in SampleEntries may be undesired and SampleGroups may be considered instead. The use of SampleGroups however assumes that only one sequence parameter set may be active per sample.

TABLE 2

| patch_data_group( ) { | Descriptor |
|---|---|
|   do { | |
|     pdg_unit_type | ue(v) |
|     patch_data_group_unit_payload( pdg_unit_type ) | |
|     pdg_terminate_patch_data group_flag | u(1) |
|   } while( !pdg_terminate_patch_data_group_flag ) | |
|   byte_alignment( ) | |
| } | |

In some embodiments, component video tracks may contain encoded attribute, geometry, or occupancy video bitstreams, which are needed for point cloud reconstruction. In some embodiments, video component tracks may contain V-PCC unit header(s) in its sample entries or in its sample group description entries. The V-PCC unit header structure may provide sequence parameter set identification, layer identification, attribute identifications, and other relevant signalling in order to uniquely identify the purpose of the track in combination with the sequence parameter set data stored in the V-PCC-track.

In some embodiments, the V-PCC bitstream can comprise a set of V-PCC units. In some embodiments, each V-PCC unit can have a V-PCC unit header and a V-PCC unit payload. In some embodiments, the V-PCC unit header describes the V-PCC unit type. Table 3 describes at least some of the supported V-PCC unit types.

TABLE 3

| vpcc_unit_type | Identifier | V-PCC Unit Type | Description |
|---|---|---|---|
| 0 | VPCC_SPS | Sequence parameter set | Sequence level parameters |
| 1 | VPCC_PSD | Patch Sequence Data | Patch sequence information |
| 2 | VPCC_OVD | Occupancy Video Data | Occupancy information |
| 3 | VPCC_GVD | Geometry Video Data | Geometry information |
| 4 | VPCC_AVD | Attribute Video Data | Attribute information |
| 5 . . . 31 | VPCC_RSVD | Reserved | — |

In some embodiments, the Attribute Video Data V-PCC unit header can specify also the attribute type and its index, allowing multiple instances of the same attribute type to be supported. Table 4 specifies the supported V-PCC attribute types.

TABLE 4

| aps_attribute_type_id[ i ] | Identifier | Attribute type |
|---|---|---|
| 0 | ATTR_TEXTURE | Texture |
| 1 | ATTR_MATERIAL_ID | Material ID |
| 2 | ATTR_TRANSPARENCY | Transparency |
| 3 | ATTR_REFLECTANCE | Reflectance |
| 4 | ATTR_NORMAL | Normals |
| 5 . . . 14 | ATTR_RESERVED | Reserved |
| 15 | ATTR_UNSPECIFIED | Unspecified |

In some embodiments, the occupancy, geometry, and attribute Video Data unit payloads may correspond to video data units (e.g., HEVC NAL unit) that could be decoded by the video decoder specified in the corresponding occupancy, geometry, and attribute parameter set V-PCC unit.

In some embodiments, vpcc_unit_header information could be linked to the V-PCC component track samples via sample grouping mechanism. In some embodiments, a new sample group description of a particular type is defined for such a purpose. In the following example, the 4CC code of 'vpcu' is given as an example:

```
aligned(8) class VPCCUnitHeaderSampleGroupDescriptionEntry('vpcu')
    extends
SampleGroupDescriptionEntry('vpcu') {
    vpcc_unit_header( ); // as defined in V-PCC specification
}
```

In some embodiments, each V-PCC track sample, which may have the vpcc_unit_header( ) as a header, can be linked to the header data via defined sample grouping mechanism. In some embodiments, the data contents of the vpcc_unit_header( ) can be explicitly listed in the data structure, such as described hereinabove. In some embodiments, such information can comprise the SPS_id, attribute_type, attribute_id, layer_id, and/or the like.

An example of a vpcc_unit_header( ) is provided in Table 5.

TABLE 5

| vpcc_unit_header( ) { | Descriptor |
|---|---|
| vpcc_unit_type | u(5) |
| if( vpcc_unit_type = = VPCC_AVD \|\| vpcc_unit_type = = VPCC_GVD \|\| | |
| vpcc_unit_type = = VPCC_OVD \|\| vpcc_unit_type = = VPCC_PDG ) | |
| vpcc_sequence_parameter_set_id | u(4) |
| if( vpcc_unit_type = = VPCC_AVD ) { | |
| vpcc_attribute_index | u(7) |
| vpcc_attribute_dimension_index | u(7) |
| if( sps_multiple_layer_streams_present_flag ) { | |
| vpcc_layer_index | u(4) |
| pcm_separate_video_data( 4 ) | |
| } | |
| else | |
| pcm_separate_video_data( 8 ) | |
| } else if( vpcc_unit_type = = VPCC_GVD ) { | |
| if( sps_multiple_layer_streams_present_flag ) { | |
| vpcc_layer_index | u(4) |
| pcm_separate_video_data( 18 ) | |
| } | |
| else | |
| pcm_separate_video_data( 22 ) | |
| } else if( vpcc_unit_type = = VPCC_OVD \|\| vpcc_unit_type = = VPCC_PDG ) { | |
| vpcc_reserved_zero_23bits | u(23) |
| } else | |
| vpcc_reserved_zero_27bits | u(27) |
| } | |

In some embodiments, a video encoded V-PCC component track's samples may have extended VisualSampleEntry structures that contain the vpcc_unit_header( ) information. One example data structure could be as follows:

```
aligned(8) class VPCCComponentSampleEntry (unsigned int(32) format)
    extends VisualSampleEntry(format){
        vpcc_unit_header( ); // as defined in V-PCC specification
}
format could be a valid VisualSampleEnty format value for AVC, HEVC
or any other video encoder specific visual sample entry.
```

In some embodiments, the data contents of the vpcc_unit_header( ) could be explicitly listed in the data structure, such as described hereinabove. In some embodiments, such information could be the SPS_id, attribute_type, attribute_id, layer_id, and/or the like.

Referring now to signalling track references, in some embodiments, track references may be used to link one or more V-PCC component video tracks to a main vpcc-track. In some embodiments, video component tracks may contain TrackReferenceBox in TrackBox with a reference type of 'auxl' and track_ID that matches the vpcc-track. Alternatively, in some embodiments, a new reference_type like 'vpcc' for vpcc-track may be defined. In other embodiments, each V-PCC component track may have a unique track reference type.

In some embodiments, track references may be defined from vpcc-track to V-PCC component video tracks. New track reference types such as 'pcca', 'pccg' and 'pcco' may be used to reference attribute component video track(s), geometry component video track(s) and occupancy component video track. Vpcc-track may reference all alternative representations of the V-PCC component track, but preferred solution may be to signal only the main representation.

Alternative tracks may be established from alternative_group values inside the TrackHeaderBoxes of individual component video tracks.

In some embodiments, signalling alternative tracks may be done using alternate_group indicators in TrackHeaderBox for each video component track or vpcc-track. As described in the ISOBMFF specification, the tracks containing alternate representations may share the same alternate_group value. In some embodiments, only one track within an alternate group should be played or streamed at any one time, and must be distinguishable from other tracks in the group via attributes such as bitrate, codec, language, packet size, and/or the like. In some embodiments, the decoder/player may determine or be caused to determine which representation should be used. Limitations on using different combinations of tracks in alternate groups may be set, for example, in some embodiments only alternate tracks with the same resolution or framerate may or shall be used at any given time.

In some embodiments, in addition to traditional distinguishable attributes, V-PCC specific attributes may be introduced, such as single stream or multi-stream encapsulation of V-PCC layers. For example, vpcc-track may contain several sequence parameter sets with different layer layouts. In some embodiments, each video component track can be linked to the correct sequence parameter set and as such, it is again up to the player to decide which representation it should choose.

In some embodiments, at least one benefit of using such structures is that the file format is easily editable, as video component tracks only contain references to vpcc-track (or vice versa). Consequently, in some embodiments, component tracks can be easily added and removed. Additionally, the proposed approach may include reusing several V-PCC specification structures, which may reduce or minimize processing of V-PCC content while encapsulating it into ISOBMFF. According to some embodiments, a trade-off related to the reduced or minimized processing requirements of V-PCC content while encapsulating it into ISOBMFF may be or include that the parser will need to be aware of the V-PCC structures that are encapsulated in the file format.

Referring now to signalling track alternatives and recommended representation, in some embodiments, track alternatives could be signalled by utilizing the alternate_group values in TrackHeaderBox. However, in some embodiments, this mechanism cannot provide information about the nature of alternative grouping (i.e. bitrate, texture difference, resolution, quality, etc.). In some embodiments, in order to solve this shortcoming, 'altr' entity grouping in EntitytoGroupBox could be utilized. In some embodiments, in order to signal the alternation method, flags of the EntitytoGroupBox could be used. By way of example only, in some embodiments, each bit in the 24 bit flags value may indicate an alternation reason. In some embodiments, these could be bitrate, resolution, single PCM or multiple PCM tracks, different textures, encoding qualities, and/or the like.

In some embodiments, since there can be multiple different alternatives in representations, the content creator may signal the recommended V-PCC representation. In some embodiments, this can be achieved by introducing an EntitytoGroupBox of a particular type (for example 'vpcg') inside the meta box and list the V-PCC track and selected component tracks among the alternatives. In some embodiments, there may be multiple such listings for different groups of alternative representations.

With regard to the usage of VPCCGroupBox and VPCC-DecoderConfigurationRecords, in some embodiments, VPCCGroupBox may be defined, to group vpcc-content. In some embodiments, VPCCGroupBox may be present in the SampleEntry or SampleGroupDescriptionEntry or inside the VPCCDecoderConfigurationRecord. In some embodiments, such an approach for file encapsulation is relatively simple in that it is assumed that V-PCC content only uses a single sequence parameter set. In some embodiments, such a data structure could be linked to each SPS data structure and can be valid when the SPS is utilized in decoding of a V-PCC frame. In the following example file structure, an approach is outlined that uses VPCCGroupBox to contain meaningful high-level details of the V-PCC content in a single location with minimal repetition and maximum flexibility. In some embodiments, at least one of the benefits of introducing VPCCGroupBox can be to provide decoders a single place to check how the V-PCC content is structured in order to decide how to decode and render it. In some embodiments, the use of V-PCC structures such as described herein requires less updates in the file format specification itself. However, in some embodiments, it may require the parser to understand these structures, i.e., parsing the VPCCGroupBox requires awareness of V-PCC structures.

```
aligned(8) class VPCCGroupBox( ) extends FullBox('vpcg', version) {
    vpcc_profile_tier_level( ); //defined in V-PCC specification
    unsigned int(4) max_layer_count_minus1;
    unsigned int(4) max_attribute_count;
    unsigned int(1) sps_multiple_layer_streams_present;
    unsigned int(1) sps_pcm_separate_video_present_flag;
    unsigned int(6) reserved = 0;
    unsigned int(16) sps_frame_width;
    unsigned int(16) sps_frame_height;
    unsigned int(16) sps_frame_rate;
    for(i=0; i<count; i++){
        vpcc_unit_header( ); // defined in V-PCC specification
        unsigned int(32) track_reference_id;
    }
}
```

In some embodiments, track_reference_id may indicate the index of the track reference of the referenced track in the 'tref' box of the V-PCC track. In some embodiments, track_id may be directly utilized in this field. In some embodiments, sps_frame_width and _sps_frame_height may be used to signal maximum value of sps_frame_width and _sps_frame_height for the entire presentation or representation, e.g., if several sequence parameter sets are present. In some embodiments, other vpcc-related structures may be present in VPCCGroupBox.

In some embodiments, the encapsulation structure is convenient, if sequence parameter sets are not expected to change during presentation, however this is not limited by the specification and, as such, file format should allow storing multiple sequence parameter sets for a presentation. In some embodiments, because tracks can reference to different sequence parameter sets at different times, time-alignment of such references must be maintained. In some embodiments, this makes storing vpcc_unit_header( )-information for component video tracks in the VPCCGroupBox of vpcc-track less viable. In some embodiments, an approach can include storing the vpcc_unit_header( )-information in the component video tracks themselves. To maintain timing information SampleGroups may be used to store vpcc_unit_headers( ) of the component video tracks, such as:

```
aligned(8) class VPCCGroupBox( ) {
    vpcc_profile_tier_level( ); //defined in V-PCC specification
    unsigned int(4) max_layer_count_minus1;
    unsigned int(4) max_attribute_count;
    unsigned int(1) sps_multiple_layer_streams_present;
    unsigned int(1) sps_pcm_separate_video_present_flag;
    unsigned int(6) reserved = 0;
        unsigned int(16) sps_frame_width;
        unsigned int(16) sps_frame_height;
    unsigned int(16) sps_frame_rate;
    for(i=0; i<count; i++){
        unsigned int(32) track_reference_id;
    }
}
aligned(8) class VPCCComponentSampleGroupDescriptionEntry( )
extends
SampleGroupDescriptionEntry ('vpcs')
{
    vpcc_unit_header( ); // defined in V-PCC specification
}
```

In some embodiments, there could be a VPCC Track Decoder Configuration Record, similar to some conventional storage methods for NAL based video encoded data.

Such a definition is given in the current working draft of V-PCC coded data:

```
aligned(8) class VPCCDecoderConfigurationRecord {
    unsigned int(8) configurationVersion = 1;
    unsigned int(8) numOfSequenceParameterSets;
    for (i=0; i<numOfSequenceParameterSets; i++) {
        sequence_parameter_set( ); // as defined in 23090-5
    }
    // additional fields
}
    // Volumetric Sequences
class VPCCConfigurationBox extends Box('vpcC') {
    VPCCDecoderConfigurationRecord( ) VPCCConfig;
}
aligned(8) class VPCCSampleEntry( ) extends VolumetricSampleEntry
('vpc1') {
    VPCCConfigurationBox config;
}
```

In some embodiments, data entires, such as the above-mentioned data entities, can be encapsulated in the VPCC-DecoderConfigurationRecord or equivalent data structure as:

```
aligned(8) class VPCCDecoderConfigurationRecord {
    unsigned int(8) configurationVersion = 1;
    unsigned int(8) numOfSequenceParameterSets;
    for (i=0; i<numOfSequenceParameterSets; i++) {
        sequence_parameter_set( ); // as defined in 23090-5
            unsigned int(4) max_layer_count_minus1;
            unsigned int(4) max_attribute_count;
            unsigned int(1) sps_multiple_layer_streams_present;
```

```
            unsigned int(1)
                sps_pcm_separate_video_present_flag;
            unsigned int(6) reserved = 0;
            unsigned int(16) sps_frame_width;
            unsigned int(16) sps_frame_height;
            unsigned int(16) sps_frame_rate;
    }
    // additional fields
}
```

In some embodiments, the addition of the above-listed fields into the data structure may make it more convenient for the file parser to resolve and signal such information without the need to parse one or more sequence_parameter_set(s).

In some embodiments, the tracks which are referenced by the V-PCC track could be listed in the VPCCSampleEntry, such as:

```
aligned(8) class VPCCSampleEntry( ) extends VolumetricSampleEntry
('vpc1') {
    VPCCConfigurationBox config;
    for(i=0; i<count; i++){
        unsigned int(32) track_reference_id;
        vpcc_unit_header( ); // as defined in 23090-5
    }
}
```

In some embodiments, track_reference_id may indicate the index of the track reference of the referenced track in the 'tref' box of the V-PCC track. In some embodiments, track id may be directly utilized in this field.

Hence, in some embodiments, the list of referenced tracks and possible vpcc_unit_header( ) values could be signalled inside the VPCCSampleEntry. This provides a convenient way for the file parser to understand the nature of the referenced tracks by just parsing the V-PCC track.

Referring now to random access aspects of VPCC-content, each V-PCC entity may have their own random-access intervals. In some embodiments, component video tracks may utilize well-established video related random access features. Historically, random-access for vpcc-track can be quite computationally complex and time-consuming. Vpcc-tracks often contain patch data groups in its sample data. In some embodiments, each vpcc-sample may contain patch data for a single vpcc-frame. In some embodiments, patch sequence data can be defined as a list of patch_data_group_unit_payloads, where payload type may differ. Some patch data group unit payloads may contain information, which is applied to following frames in addition to the frame that it is implicitly linked with, and as such are not frame specific. Such patch sequence unit payloads may include at least types 0-5, as provided in Table 6.

TABLE 6

| pdg_unit_type | Identifier | Patch Data Group Unit Type | Description |
| --- | --- | --- | --- |
| 0 | PDG_PSPS | Patch sequence parameter set | Sequence level parameters |
| 1 | PDG_PFPS | Patch frame parameter set | Frame level parameters |
| 2 | PDG_PFGPS | Patch frame geometry parameter set | Frame level geometry type parameters |
| 3 | PDG_PFAPS | Patch frame attribute parameter set | Frame level attribute type parameters |
| 4 | PDG_GPPS | Geometry patch parameter set | Patch level geometry type parameters |
| 5 | PDG_APPS | Attribute patch parameter set | Patch level attribute type parameters |

TABLE 6-continued

| pdg_unit_type | Identifier | Patch Data Group Unit Type | Description |
|---|---|---|---|
| 6 | PDG_PTGLU | Patch tile group layer unit | Patch tile group layer unit |
| 7 | PDG_PREFIX_SEI | Prefix SEI message | Prefix SEI message |
| 8 | PDG_SUFFIX_SEI | Suffix SEI message | Suffix SEI message |
| 9 . . . 31 | PDG_RSVD | Reserved | — |

Patch data group unit payload with type PDG-PTGLU contains a single patch_tile_group_layer_unit( ) which in turn consists of a patch_tile_group_header( ) and patch_tile_group_data_unit( ) pair. patch_tile_group_header( ) contains a field ptgh_type, which specifies the coding type 1 (intra) or 0 (predicted) for the patch data in patch tile group data unit. This information may be used to define sync samples for vpcc-track.

In one embodiment non-frame specific patch data group unit payloads could be extracted from the patch data group stream and stored in vpcc-track sample group description entries.

```
aligned(8) class VPCCSampleGroupDescriptionEntry( ) extends
SampleGroupDescriptionEntry ('vpcs')
{
    patch_data_group_unit_payload( ); // as defined in 23090-5
}
```

In some embodiments, patch_data_group_unit_payload( ) may be structured as defined in ISO/IEC 23090-5, but is limited to contain only patch data group unit payloads, with types 0-5 as defined herein. In some embodiments, the extracted patch data group unit payloads in sample group description entries may or shall be time aligned with the samples, they were originally extracted from, thus maintaining random access capability using existing SampleGroupDescriptionEntry mapping. As a result of such extraction patch_data_group( ) shall only contain patch_data_group_unit_payloads with type PDG_PTGLU, which means that sync samples may be defined as samples, where patch tile group layer units ptgh_type equals 1 (intra). During the file parsing operation at decoder side, if two subsequent samples belong to different SampleGroups, the succeeding sample is modified to include patch_data_group( ) from the SampleGroupEntry it belongs to.

In another embodiment patch_data_group( ) may contain any pdg unit types and no surgery of the patch_data_group( ) is needed. With this method, patch_data_group( ), which contains pdg_unit_types between 0 and 5 inclusive, are copied as such into SampleGroupEntries of the vpcc-track.

During the file parsing operation at decoder side, if two subsequent samples belong to different SampleGroups, the succeeding sample is modified to include patch_data_group( ) from the SampleGroupEntry it belongs to.

In another embodiment all active non-frame specific patch data group unit payloads may or shall be replicated in all vpcc sync samples. Sync (or Random Access) samples in this embodiment are defined as samples which don't rely on any previous sample in the track and which contain all relevant information to reconstruct a point cloud from time aligned 2d component video samples. This definition is more simple but may require duplication of patch data group unit payloads with types 0-5 for each sync sample, thus increasing the size of bitstream slightly, yet avoid introducing sample grouping.

If a v-pcc component track contains multiple layers, it may be desirable to signal this information inside the video track itself. One such mechanism could be defining a new Box inside the SchemeInformationBox to signal the presence of multiple layers. A possible data structure could be as follows:

Box Name: VPCCMultipleLayerIndicatior Box
Box Type: 'vmli'
Container: SchemeInformationBox
Mandatory: Yes (when the SchemeType is 'pccv')
Quantity: One The VPCCMultipleLayerIndicator box is used to indicate that video track is composed of VPCC encoded multiple layers of the same attribute. This also means that sps_multiple_layer_streams_present flag in the SPS is set to 1 for this V-PCC component.

```
aligned(8) class VPCCMultipleLayerIndicator extends FullBox('vmli',
version = 0, 0)
{
    unsigned int(16) number_of_layers;
    unsigned int(8) PackedContentInterpretationType
    Box[ ] any_box; // optional
}
```

In some embodiments, number_of_layers indicates the number of layers present and temporally packed as frames in the V-PCC component track. Its value could be sps_layer_count_minus1+1.

In some embodiments, such as when there are gaps in the present number of layers, zero-sized samples could be included in the sample table box.

In some embodiments, PackedContentInterpretationType may be utilized to signal additional information about the packing structure and type. As an example, it may indicate that the temporally packed frames which are consequent to each other are in a pre-defined layer order (ascending in layer order or descending in layer order).

Referring now to clarification to composition times when layers are stored in the same track, when temporal interleaving of vpcc-layers in video component tracks is present the composition times of samples need to be clarified. Considering that samples aren't allowed to have the same composition times in ISOBMFF, the readers should implicitly set the composition time(s) for constituent picture(s) between 0 and layer_count_minus1, inclusive, to coincide with the composition time for the last constituent picture layer_count_minus1.

Referring now to single track representation of V-PCC content, in some embodiments, it may be desirable to store the V-PCC encoded bitstream as-is in a single track. Potential advantages could include at least:

Direct storage of the V-PCC encoded bitstream without any additional header processing;

Take advantage of time and byte size framing (i.e. sample timing and sample sizes) of ISOBMFF; and Enable and indicate random access locations in the V-PCC bitstream.

In some embodiments, to indicate that a V-PCC track is a "self-contained" media track, the following constraints may be applied:

Each V-PCC access unit may comprise of the bitstream data of only the relevant V-PCC components in a pre-defined or random order, including the V-PCC unit headers and SPSs. Hence, it would be easy to compartmentalize each V-PCC frame in composition time order.

A V-PCC sample could be equivalent to a V-PCC access unit which may or may not be dependent on other V-PCC samples for reconstruction of the V-PCC frame corresponding to the same composition timestamp of the V-PCC sample.

A random access or sync V-PCC sample is a V-PCC sample that is not dependent on any other V-PCC sample for decoding is contents.

SPS and Unit Header data structures are kept as-is in the encoded V-PCC bitstream.

In some embodiments, ISOBMFF files which store V-PCC content in a single track can use a VolumetricSampleEntry of a specific type, such as 'vpcs'). All possible sequence_parameter_set( ) could be listed in this sample entry so that V-PCC decoder could A possible data structure could be as follows:

```
aligned(8) class VPCCSampleEntry( ) extends VolumetricSampleEntry
('vpcs') {
    VPCCConfigurationBox config; //optionally present
}
``` where VPCCDecoderConfigurationRecord and VPCCConfigurationBox are defined as follows:

```
aligned(8) class VPCCDecoderConfigurationRecord {
    unsigned int(8) configurationVersion = 1;
    unsigned int(8) numOfSequenceParameterSets;
    for (i=0; i<numOfSequenceParameterSets; i++) {
        sequence_parameter_set( ); // as defined in 23090-5
            unsigned int(4) max_layer_count_minus1;
            unsigned int(4) max_attribute_count;
            unsigned int(1) sps_multiple_layer_streams_present;
            unsigned int(1) sps_pcm_separate_video_present_flag;
            unsigned int(6) reserved = 0;
            unsigned int(16) sps_frame_width;
            unsigned int(16) sps_frame_height;
            unsigned int(16) sps_frame_rate;
    }
    // additional fields
}
    // Volumetric Sequences
class VPCCConfigurationBox extends Box('vpcC') {
    VPCCDecoderConfigurationRecord( ) VPCCConfig;
}
```

In some embodiments, V-PCC sub-samples could be defined as the V-PCC components that are comprised of a V-PCC unit header and payload. With this definition in mind, a sub-sample information box which is defined in ISOBMFF can be updated as follows:

```
aligned(8) class SubSampleInformationBox
    extends FullBox('subs', version, flags) {
    unsigned int(32) entry_count;
    int i,j;
    for (i=0; i < entry_count; i++) {
        unsigned int(32) sample_delta;
        unsigned int(16) subsample_count;
        if (subsample_count > 0) {
```

-continued

```
            for (j=0; j < subsample_count; j++) {
                if(version == 1)
                {
                    unsigned int(32) subsample_size;
                }
                else
                {
                    unsigned int(16) subsample_size;
                }
                unsigned int(8) subsample_priority;
                unsigned int(8) discardable;
                unsigned int(32) codec_specific_parameters;
            }
        }
    }
}
``` where codec_specific_parameters may indicate the necessary parameters of the vpcc_unit which maps to the sub-sample. Two possible syntaxes for codec_specific_parameters that can be used to interpret codec specific parameter values are shown in Table 7a and Table 7b.

TABLE 7a

| codec_specific_parameters value | Description |
| --- | --- |
| 0 | reserved |
| 1 | Patch Group Data |
| 2 | Occupancy |
| 3 | Geometry |
| 4 | Attribute |
| 5, . . . | Reserved |

TABLE 7b

| codec_specific_parameters ( ) { | Descriptor |
| --- | --- |
| vpcc_unit_type | u(5) |
| if( vpcc_unit_type = = VPCC_AVD ) { | |
| vpcc_attribute_index | u(7) |
| vpcc_attribute_dimension_index | u(7) |
| if( sps_multiple_layer_streams_present_flag ) { | |
| vpcc_layer_index | u(4) |
| pcm_separate_video_data( 4 ) | |
| } | |
| else | |
| pcm_separate_video_data( 8 ) | u(8) |
| } else if( vpcc_unit_type = = VPCC_GVD ) { | |
| if( sps_multiple_layer_streams_present_flag ) { | |
| vpcc_layer_index | u(4) |
| pcm_separate_video_data( 18 ) | u(18) |
| } | |
| else | |
| pcm_separate_video_data( 22 ) | u(22) |
| } else if( vpcc_unit_type = = VPCC_OVD ) { | |
| vpcc_reserved_zero_22bits | u(22) |
| } | |
| vpcc_reserved_zero_10bits | u(10) |
| } | |

In some embodiments, declared parameter types may be syntactically the same as in vpcc_unit_header( ) and ISO/IEC 23090-5.

Where pcm_separate_video_data( ) is as defined in ISO/IEC 23090-5:

```
pcm_separate_video_data(bitCount) {
    if( sps_pcm_separate_video_present_flag &&
    !vpcc_layer_index ) {
        vpcc_pcm_video_flag
        vpcc_reserved_zero_bitcount_bits
    }
    else
        vpcc_reserved_zero_bitcountplus1_bits
}
```

In another embodiment, vpcc_unit_header( ) could be copied to the coded_specific_parameters field as-is. In another embodiment, subsample_prority field could be set to non-default value for indication of priority of vpcc data units (as subsamples). In such a case, a decoder may prefer to skip decoding of such data units if it doesn't have enough decoder instances. A similar logic may be applied to discardable parameter as well. A value of 0 may indicate that the sub-sample is required to represent the V-PCC sample.

By using sub-sample information box, file parser could extract each V-PCC component, parse its header information and then further identify second level information such as which attribute_id, layer_id, and/or the like.

In some embodiment, codec_specific_parameters( ) could be parsed by the file parser and pcc component related information could be further obtained before parsing the vpcc_header_data( ). This would give the parser enough information to push the sub-sample data to the correct decoder instance.

In some embodiments, a separate data structure could be incorporated into a new version of the sub-sample information box and each V-PCC specific information could be listed in this new data structure.

In some embodiments, patch data group unit syntax can comprise descriptors and terms such as in Table 8.

TABLE 8

| patch_data_group_unit( ) { | Descriptor |
|---|---|
| // pdguFrameCount = 0 | |
| // Since this is a patch data group and not really a sequence (basically a segment of | |
| // the sequence the pdguFrameCount value should not be initialized here but should be | |
| // set somewhere outside the patch_data_group_unit process. Basically this unit | |
| // just contains a collection of patch unit types, including parameter sets and | |
| // patch frame/tile units (similar to NAL units). | |
| pdgu_terminate_patch_data_group_information_flag = 0 | |
| while( pdgu_terminate_patch_data_group_information_signal = = 0 ) { | |
| pdgu_type | ue(v) |
| patch_data_group_unit_payload( pdgu_type, psdFrameCount ) | |
| if( pdgu_type = = PDG_PFLU ) | |
| pdguFrameCount ++ | |
| pdgu_terminate_patch_data_group_information_flag | u(1) |
| } | |
| byte_alignment( ) | |
| } | |

In some embodiments, patch data group units can comprise a payload and metadata. In some embodiments, the syntax for patch data group unit payloads can comprise descriptors and terms such as in Table 9.

TABLE 9

| patch_data_group_unit_payload( unitType, frmIdx ) { | Descriptor |
|---|---|
| if( unitType = = PDGU_PSPS ) { | |
| patch_sequence_parameter_set ( ) | |
| else if( unitType = = PDGU_GPPS ) { | |
| geometry_patch_parameter_set ( ) | |
| } else if( unitType = = PDGU_APPS ) { | |
| attribute_patch_parameter_set( ) | |
| } else if( unitType = = PDGU_PFPS ) { | |
| patch_frame_parameter_set( ) | |
| } else if( unitType = = PDGU_PFAPS ) { | |
| patch_frame_attribute_parameter_set( ) | |
| } else if( unitType = = PDGU_PFGPS ) { | |
| patch_frame_geometry_parameter_set( ) | |
| } else if( unitType = = PDGU_PFLU ) { | |
| patch_frame_layer_unit( frmIdx ) | |
| } else if( unitType = = PDGU_PREFIX_SEI ) { | |
| sei_message( ) | |
| } else if( unitType = = PDGU_SUFFIX_SEI ) { | |
| sei_message( ) | |
| } | |
| } | |

In some embodiments, patch sequence parameter set syntax can comprise descriptors and terms such as in Table 10.

TABLE 10

| patch_sequence_parameter_set( ) { | Descriptor |
|---|---|
|    psps_patch_sequence_parameter_set_id | ue(v) |
|    psps_log2_patch_packing_block_size | u(3) |
|    psps_log2_max_patch_frame_order_cnt_lsb_minus4 | ue(v) |
|    psps_max_dec_patch_frame_buffering_minus1 | ue(v) |
|    psps_long_term_ref_patch_frames_flag | u(1) |
|    psps_num_ref_patch_frame_lists_in_sps | ue(v) |
|    for( j = 0; j < psps_num_ref_patch_frame_lists_in_sps; j++) | |
|       ref_list_struct( j ) | |
|    psps_use_eight_orientations_flag | u(1) |
|    byte_alignment( ) | |
| } | |

In some embodiments, patch frame header syntax can comprise descriptors and terms such as in Table 12.

TABLE 12

| patch_frame_header( frmIdx ) { | Descriptor |
|---|---|
|   pfh_patch_frame_parameter_set_id[ frmIdx ] | ue(v) |
|   pfh_address[ frmIdx ] | u(v) |
|   pfh_type[ frmIdx ] | ue(v) |
|   pfh_patch_frame_order_cnt_lsb[ frmIdx ] | u(v) |
|   if( psps_num_ref_patch_frame_lists_in_sps > 0) | |
|     pfh_ref_patch_frame_list_sps_flag[ frmIdx ] | u(1) |
|   if( pfh_ref_patch_frame_list_sps_flag[ frmIdx ] ) | |
|     if( psps_num_ref_patch_frame_lists_in_sps > 1) | |
|       pfh_ref_patch_frame_list_idx[ frmIdx ] | u(v) |
|   Else | |
|     ref_list_struct( psps_num_ref_patch_frame_lists_in_sps ) | |
|   for( j = 0; j < NumLtrpEntries; j++ ) { | |
|     pfh_additional_pfoc_lsb_present_flag[ frmIdx ] [ j ] | u(1) |
|     if( pfh_additional_pfoc_lsb_present_flag[ frmIdx ] [ j ] ) | |
|       pfh_additional_pfoc_lsb_val[ frmIdx ] [ j ] | u(v) |
|   } | |
|   if( pfh_type[ frmIdx ] = = P && num_ref_entries[ RlsIdx ] > 1) | |
|   { | |
|     pfh_num_ref_idx_active_override_flag[ frmIdx ] | u(1) |
|     if( pfh_num_ref_idx_active_override_flag[ frmIdx ] ) | |
|       pfh_num_ref_idx_active_minus1[ frmIdx ] | ue(v) |
|   } | |
|   if( pfh_type[ frmIdx ] = = I ){ | |
|     pfh_2d_shift_u_bit_count_minus1[ frmIdx ] | u(8) |
|     pfh_2d_shift_v_bit_count_minus1[ frmIdx ] | u(8) |
|     pfh_3d_shift_tangent_axis_bit_count_minus1[ frmIdx ] | u(8) |
|   pfh_3d_shift_bitangent_axis_bit_count_minus1[ frmIdx ] | u(8) |
|     pfh_3d_shift_normal_axis_bit_count_minus1[ frmIdx ] | u(8) |
|     pfh_lod_bit_count[ frmIdx ] | u(8) |
|   } else { | |
|     pfh_inter_predict_bit_count_flag | u(1) |
|     if( pfh_inter_predict_bit_count_flag ) { | |
|       pfh_inter_predict_2d_shift_u_bit_count_flag | u(1) |
|       if( !pfh_inter_predict_2d_shift_u_bit_count_flag ) | |
|   pfh_2d_shift_u_bit_count_minus1[ frmIdx ] | u(8) |
|     pfh_inter_predict_2d_shift_v_bit_count_flag | u(1) |
|       if( !pfh_inter_predict_2d_shift_v_bit_count_flag ) | |
|   pfh_2d_shift_v_bit_count_minus1[ frmIdx ] | u(8) |
|   pfh_inter_predict_3d_shift_tangent_axis_bit_count_flag | u(1) |
|   if( !pfh_inter_predict_3d_shift_tangent_axis_bit_count_flag ) | |
|   pfh_3d_shift_tangent_axis_bit_count_minus1[ frmIdx ] | u(8) |
|   pfh_inter_predict_3d_shift_bitangent_axis_bit_count_flag | u(1) |
|   if( !pfh_inter_predict_3d_shift_bitangent_axis_bit_count_flag ) | |
|   pfh_3d_shift_bitangent_axis_bit_count_minus1[ frmIdx ] | u(8) |
|   pfh_inter_predict_3d_shift_normal_axis_bit_count_flag | u(1) |
|   if( !pfh_inter_predict_3d_shift_normal_axis_bit_count_flag ) | |
|   pfh_3d_shift_normal_axis_bit_count_minus1[ frmIdx ] | u(8) |
|     pfh_inter_predict_lod_bit_count_flag | u(1) |
|       if( !pfh_inter_predict_lod_bit_count_flag ) | |
|         pfh_lod_bit_count[ frmIdx ] | u(8) |
|     } | |
|   } | |

TABLE 12-continued

```
if( sps_pcm_patch_enabled_flag) {
    pfh_pcm_3d_shift_bit_count_flag                    u(1)
    if( pfh_pcm_3d_shift_bit_count_flag )
        pfh_pcm_3d_shift_axis_bit_count_minus1          u(v)
    byte_alignment( )
}
```

In some embodiments, the pfh_address can be added as a placeholder. In some embodiments, the header structure from Table 12 can be amended into a patch_tile)header and can define additional structures for tiles. In the tiling structure, a process can be carried out to allocate "patch tile addresses" with 2D (x, y) coordinates within the entire frame unit. In some embodiments, this header may only correspond to a patch tile. In some embodiments, multiple tiles can exist for a frame. In some embodiments, some information could also be placed in a frame header in such scenarios.

In some embodiments, aps_attribute_codec_id[i] indicates the identifier of the codec used to compress the attribute video data with index i. aps_attribute_codec_id[i] may or shall be in the range of 0 to 255, inclusive of all values and ranges therebetween. In some embodiments, such values can be predefined or can be defined by the codec or another such component.

In some embodiments, aps_pcm_attribute_codec_id[i], when present, indicates the identifier of the codec used to compress the attribute video data for PCM coded points of attribute i, when PCM coded points are encoded in a separate video stream. aps_pcm_attribute_codec_id[i] may or shall be in the range of 0 to 255, inclusive of all values and ranges therebetween.

In some embodiments, aps_attribute_dimension_minus1[i] plus 1 indicates the total number of dimensions (i.e., number of channels) of the attribute with index i. aps_attribute_dimension_minus1[i] may or shall be in the range of 0 to 255, inclusive of all values and ranges therebetween.

In some embodiments, aps_attribute_dimension_partitions_minus1[i] plus 1 indicates the number of partition groups in which the attribute channels for attribute with index i should be grouped in. aps_attribute_dimension_partitions_minus1[i] may or shall be in the range of 0 to 127, inclusive of all values and ranges therebetween.

In some embodiments, aps_attribute_partition_channels_minus1[i][j] plus 1 indicates the number of channels assigned to the dimension partition group with index j of attribute with index i. If j<aps_attribute_dimension_partitions_minus1[i], then aps_attribute_partition_channels_minus1[i][j] may or shall be in the range of 0 to remainingDimensions−2, inclusive of all values and ranges therebetween. If j=aps_attribute_dimension_partitions_minus1[i], then aps_attribute_partition_channels_minus1[i][j] is set equal to remainingDimensions−1.

In some embodiments, aps_attribute_params_enabled_flag[i] indicates whether attribute parameters may be signalled or not, e.g., for all attributes with index i. aps_attribute_params_enabled_flag[i] equal to 1 indicates that attribute parameters may be signalled for attribute with index i. aps_attribute_params_enabled_flag[i] equal to 0 indicates that attribute parameters may or shall not be signalled for attribute with index i.

In some embodiments, aps_attribute_patch_params_enabled_flag[i] indicates whether attribute patch parameters may be signalled or not for all attributes with index i. aps_attribute_patch_params_enabled_flag[i] equal to 1 indicates that attribute patch parameters may be signalled, e.g., for attribute with index i. aps_attribute_patch_params_enabled_flag[i] equal to 0 indicates that attribute patch parameters may or shall not be signalled, e.g., for attribute with index i.

In some embodiments, the V-PCC frames can be decoded according to any of the approaches described herein. In some embodiments, the output of such decoding processes can be a set of decoded video frames or video streams, corresponding to the occupancy, geometry, and attribute, if available, information of the point cloud sequence, as well as the decoded patch sequence data information, some or all of which are needed to perform the 3D reconstruction process. In some embodiments, the output of the decoding process is a sequence of decoded point cloud frames. A point cloud frame consists of a set of points with (x, y, z) coordinates. Optionally, in some embodiments, a point cloud frame may also contain one or more set of attributes associated with each point.

In some embodiments, the decoding process can be specified such that all decoders that conform to a specified profile, tier, and level will produce numerically identical outputs when invoking the decoding process associated with that profile for a bitstream conforming to that profile, tier, and level. In some embodiments, such decoding process may produce identical outputs to those produced by the processes described herein (with the correct output order or output timing, as specified). For the purpose of best-effort decoding, a decoder that conforms to a particular profile at a given tier and level may additionally decode some bitstreams conforming to a different tier, level, or profile without necessarily using a decoding process that produces numerically identical decoded outputs to those produced by the process specified herein (without claiming conformance to the other profile, tier, and level).

In some embodiments, the decoding process operates as follows:

The VPCC bitstream can be parsed and demultiplexed into several sub-streams, each one corresponding to a different set of information. In particular, the VPCC bitstream is demultiplexed into occupancy map, geometry, and attributes, if present, video sub-streams, and in a patch sequence sub-stream. These sub-streams can then be decoded as specified in the subsequent steps.

The occupancy map video decoding process can be invoked with the substream corresponding to the occupancy map information as the input and the decoded occupancy map video frames, as the output. Each decoded occupancy map video frame can be represented as oFrame[y][x], where, y and x are the row and column indices, respectively. The variable y can be in the range of 0 to sps_frame_height−1, inclusive and the variable x is in the range of 0 to sps_frame_width−1, inclusive of all values and ranges therebetween.

The geometry video decoding process can then be invoked.

For every present attribute video sub-streams in the bitstream, the attribute video decoding process can then be invoked, such as if an attribute video substream is present in the bitstream.

The patch sequence decoding process can then be invoked with the substream corresponding to the encoded patch sequence information as the input and the decoded patch sequence information as the output.

Optionally, for each point cloud frame, the reconstruction process for a point cloud frame can then be invoked with the array sps_layer_absolute_coding_enabled_flag, all of the decoded occupancy, geometry, and attribute, if present, frames and the decoded patch frame information corresponding to a time instance i as the input and a list of decoded points in the point cloud frame as the output.

In some embodiments, the geometry video decoding process is performed as follows:

If sps_layer_count_minus1 is equal to 0, a video decoding process is invoked using the geometry video bitstream and its associated codec specified by gps_geometry_codec_id as the input. Outputs of this process are the decoded and display/output ordered geometry video frames, GeoFrame [layerIdx][orderIdx][compIdx][y][x], and their associated bitdepth, GeoBitdepth[layerIdx][orderIdx], width, GeoWidth[layerIdx][orderIdx], and height, GeoHeight[layerIdx][orderIdx], where layerIdx corresponds to the layer index and is equal to 0, orderIdx is the display order index of the decoded geometry frames, compIdx corresponds to the colour component index and is equal to 0, y is in the range of 0 to GeoHeight[layerIdx][orderIdx]−1, inclusive, and x is the column index in the decoded frame and is in the range of 0 to GeoWidth[layerIdx][orderIdx]−1, inclusive of all values and ranges therebetween.

Otherwise, the Following Applies:

If sps_multiple_layer_streams_present_flag is equal to 0, a video decoding process is invoked using the geometry video bitstream and its associated codec specified by gps_geometry_codec_id as the input. Outputs of this process are the decoded and display/output ordered intermediate geometry video frames, tempGeoFrame[tempOrderIdx][compIdx][y][x], and their associated bitdepth, tempGeoBitdepth[tempOrderIdx], width, tempGeoWidth[tempOrderIdx], and height, tempGeoHeight[tempOrderIdx], where tempOrderIdx is the display order index of all the decoded geometry frames, compIdx corresponds to the colour component index and is equal to 0, y is in the range of 0 to tempGeoHeight[tempOrderIdx]−1, inclusive, and x is the column index in the decoded frame and is in the range of 0 to tempGeoWidth[tempOrderIdx]−1, inclusive of all values and ranges therebetween. The decoded geometry video frames at display/output order orderIdx for each layer are then derived as follows:

```
for (i = 0; i <= sps_layer_count_minus1; i++ ){
        mappedIdx = orderIdx * ( sps_layer_count_minus1 + 1 ) + i
    GeoBitdepth[ i ][ orderIdx ] = tempGeoBitdepth[ mappedIdx ]
    GeoWidth[ i ][ orderIdx ] = tempGeoWidth[ mappedIdx ]
    GeoHeight[ i ][ orderIdx ] = tempGeoHeight[ mappedIdx ]
        if( sps_layer_absolute_coding_enabled_flag[ i ] == 0) {
    refIdx = orderIdx * ( sps_layer_count_minus1 + 1 ) + SpsLayerPredictorIndex( i )
        for (y = 0; y < GeoHeight[ i ][ orderIdx ] ; y++ ){
            for (x = 0; x < GeoWidth[ i ][ orderIdx ] ; x++ ){
                GeoFrame[ i ][ orderIdx ][ y ][ x ] =
    Clip3(0, (1 << tempGeoBitdepth[ mappedIdx ]) − 1,
    tempGeoFrame[ mappedIdx ][ y ][xy ] +
                    tempGeoFrame[ refIdx ][ y ][ x ] )
            }
        }
    }
    else
        GeoFrame[ i ][ orderIdx ] = tempGeoFrame[ mappedIdx ]
}
```

Otherwise (if sps_multiple_layer_streams_present_flag is equal to 1), multiple video decoding processes are invoked, each using a geometry video bitstream with a different vpcc layer index associated with it and the associated codec specified by gps_geometry_codec_id, as the input. Outputs of this process are the decoded and display/output ordered intermediate geometry video frames, tempGeoFrame[layerIdx][orderIdx][compIdx][y][x], and their associated bitdepth, tempGeoBitdepth[layerIdx][orderIdx], width, tempGeoWidth[layerIdx][orderIdx], and height, tempGeoHeight[layerIdx][orderIdx], where layerIdx corresponds to the layer index of each frame and is in the range of 0 to sps_layer_count_minus1, inclusive, orderIdx is the display order index of the decoded geometry frames for each layer, compIdx corresponds to the colour component index and is equal to 0, y is in the range of 0 to tempGeoHeight[layerIdx][orderIdx]−1, inclusive, and x is the column index in the decoded frame and is in the range of 0 to tempGeoWidth[layerIdx][orderIdx]−1, inclusive of all values and ranges therebetween. The decoded geometry video frames at display/output order orderIdx for each layer are then derived as follows:

```
for (i = 0; i <= sps_layer_count_minus1; i++ ){
    GeoBitdepth[ i ][ orderIdx ] = tempGeoBitdepth[ i ][ orderIdx ]
    GeoWidth[ i ][ orderIdx ] = tempGeoWidth[ i ][ orderIdx ]
    GeoHeight[ i ][ orderIdx ] = tempGeoHeight[ i ][ orderIdx ]
        if( sps_layer_absolute_coding_enabled_flag[ i ] == 0) {
        j= SpsLayerPredictorIndex( i )
        for (y = 0; y < GeoHeight[ i ][ orderIdx ] ; y++ ){
            for (x = 0; x < GeoWidth[ i ][ orderIdx ] ; x++ ){
                GeoFrame[ i ][ orderIdx ][ y ][ x ] =
    Clip3(0, (1 << tempGeoBitdepth[ i ][ orderIdx ]) − 1,
    tempGeoFrame[ i ][ orderIdx ][ y ][ x ] +
    tempGeoFrame[ j ][ orderIdx ][ y ][ x ] )
            }
        }
    }
    else
        GeoFrame[ i ][ orderIdx ] = tempGeoFrame[ i ][ orderIdx ]
}
```

In some embodiments, the attribute decoding process can be performed as follows:

If aps_attribute_count is equal to 0, no attribute video frames are decoded and no attribute information is associated with the final, reconstructed point cloud.

Otherwise (if aps_attribute_count is not equal to 0), the following applies:

If sps_layer_count_minus1 is equal to 0, an aps_attribute_count number of video decoding processes are invoked each with a different vpcc_attribute_index associated with it and the associated codec specified by aps_attribute_codec_id[vpcc_attribute_index] as the input. Outputs of this process are the decoded and display/output ordered attribute video frames, AttrFrame[attrIdx][layerIdx][orderIdx][compIdx][y][x], and their associated bitdepth, AttrBitdepth[attrIdx][layerIdx][orderIdx], width, AttrWidth[attrIdx][layerIdx][orderIdx], and height, AttrHeight[attrIdx][layerIdx][orderIdx], information, where attrIdx corresponds to the attribute index and is in the range of 0 to aps_attribute_count−1, inclusive, layerIdx corresponds to the layer index and is equal to 0, orderIdx is the display order index of the decoded attribute frames, compIdx corresponds to the attribute component index and is in the range of 0 to aps_attribute_dimension_minus1[attrIdx−1], y is in the range of 0 to AttrHeight[attrIdx][layerIdx][orderIdx]−1, inclusive, and x is the column index in the decoded frame and is in the range of 0 to AttrWidth[attrIdx][layerIdx][orderIdx]−1, inclusive of all values and ranges therebetween.

Otherwise (sps_layer_count_minus1 is not equal to 0), the following applies:

If sps_multiple_layer_streams_present_flag is equal to 0, an aps_attribute_count number of video decoding processes are invoked, each with a different vpcc_attribute_index associated with it and the associated codec specified by aps_attribute_codec_id[vpcc_attribute_index] as the input. Outputs of this process are the decoded and display/output ordered intermediate attribute video frames, tempAttrFrame[attrIdx][tempOrderIdx][compIdx][y][x], and their associated bitdepth, tempAttrBitdepth[attrIdx][tempOrderIdx], width, tempAttrWidth[attrIdx][tempOrderIdx], and height, tempAttrHeight[attrIdx][tempOrderIdx] information, where attrIdx corresponds to the attribute index and is in the range of 0 to aps_attribute_count−1, inclusive, tempOrderIdx is the display order index of all the decoded attribute frames, compIdx corresponds to the attribute component index and is in the range of 0 to aps_attribute_dimension_minus1[attrIdx−1], y is in the range of 0 to tempAttrHeight[attrIdx][tempOrderIdx]−1, inclusive, and x is the column index in the decoded frame and is in the range of 0 to tempAttrWidth[attrIdx][tempOrderIdx]−1, inclusive of all values and ranges therebetween. The decoded attribute video frames for attribute with index attrIdx, at display/output order orderIdx for each layer are then derived as follows:

Otherwise (sps_multiple_layer_streams_present_flag is equal to 1), multiple video decoding processes are invoked, each using an attribute video bitstream with a different vpcc_attribute_index and vpcc_layer_index associated with it and the associated codec specified by aps_attribute_codec_id[vpcc_attribute_index], as the input. Outputs of this process are the decoded and display/output ordered attribute video frames, AttrFrame[attrIdx][layerIdx][orderIdx][compIdx][y][x], and their associated bitdepth, AttrBitdepth[attrIdx][layerIdx][orderIdx], width, AttrWidth[attrIdx][layerIdx][orderIdx], and height, AttrHeight[attrIdx][layerIdx][orderIdx] information, where attrIdx corresponds to the attribute index and is in the range of 0 to aps_attribute_count−1, layerIdx corresponds to the layer index of each frame and is in the range of 0 to sps layer count minus1, inclusive, orderIdx is the display order index of the decoded attribute frames for each layer, compIdx corresponds to the attribute component index and is in the range of 0 to aps_attribute_dimension_minus1[attrIdx−1], y is in the range of 0 to AttrHeight[attrIdx][layerIdx][orderIdx]−1, inclusive, and x is the column index in the decoded frame and is in the range of 0 to AttrWidth[attrIdx][layerIdx][orderIdx]−1, inclusive of all values and ranges therebetween.

Referring now to a process for patch sequence decoding, i Input to this process is the bitstream corresponding to the patch sequence data unit of the VPCC bitstream.

In some embodiments, outputs of this process are the decoded patch frames, as well any associated geometry and/or attribute parameters contained in the patch sequence data unit, ordered in increasing order according to their corresponding patch frame order count number.

In some embodiments, the decoding process operates as follows for the current patch frame, CurrPatchFrame, being decoded:

The decoding of patch sequence data units as discussed herein, which can have patch sequence data units of the current patch frame and associated parameter set units as inputs and parsed syntax structures encapsulated within these patch sequence data units as outputs. Such a decoding can be carried out by extracting the syntax structure from the patch sequence data unit and then parsing the syntax structure.

The process can further include deriving variables and functions relating to patch frame order count.

At the beginning of the decoding process for each patch frame, the reference patch frame list construction process such as described herein can be is invoked for the derivation of the reference patch frame list, RefPatchFrameList.

The reference patch frame marking process such as described herein can then be invoked, wherein reference patch frames may be marked as "unused for reference" or "used for long-term reference".

Some of the processes described herein may specify the patch decoding processes according to the patch mode, such as the following processes:

```
for (i = 0; i <= sps_layer_count_minus1; i++ ){
    mappedIdx = orderIdx * ( sps_layer_count_minus1 + 1 ) + i
    AttrBitdepth[ attrIdx ][ i ][ orderIdx ] = tempAttrBitdepth[ attrIdx ][ mappedIdx ]
    AttrWidth[ attrIdx ][ i ][ orderIdx ] = tempAttrWidth[ attrIdx ][ mappedIdx ]
    AttrHeight[ attrIdx ][ i ][ orderIdx ] = tempAttrHeight[ attrIdx ][ mappedIdx ]
    AttrFrame[ attrIdx ][ i ][ orderIdx ] = tempAttrFrame[ mappedIdx ]
}
``` the process for decoding of intra coded patches;
the process for decoding of inter coded patches; and
the process for decoding of PCM coded patches.

In some embodiments, after the current patch frame has been decoded, it can be marked as "used for short-term reference".

Referring now to processes for patch sequence data unit decoding, inputs to such processes are patch sequence data units of the current patch frame and their associated parameter set units, while outputs of this process are the parsed syntax structures encapsulated within these patch sequence data units. In some embodiments, the decoding process for each patch sequence data unit can comprise extracting the syntax structure from the patch sequence data unit and subsequently parsing the syntax structure.

Referring now to processes for patch frame header decoding can comprise processes for patch frame order count derivation. In some embodiments, a process for patch frame order count derivation can be carried out, resulting in an output of PatchFrmOrderCntVal, the patch frame order count of the current patch frame, with index patchFrmIndex. In some embodiments, patch frame order counts can be used to identify and order patch frames, as well as for decoder conformance checking. In some embodiments, each coded patch frame is associated with a patch frame order count variable, denoted as PatchFrmOrderCntVal. In some embodiments, when there is no available reference patch frame in the reference patch frame buffer, the variables prevPatchFrmOrderCntLsb and prevPatchFrmOrderCntMsb are derived as follows:

Letting prevPatchFrm be the previous patch frame in a decoding order, i.e., patch frame with index patchFrmIndex−1, The variable prevPatchFrmOrderCntLsb is set equal to the patch frame order count LSB value of prevPatchFrm, pfh_patch_frame_order_cnt_lsb[patchFrmIndex−1], The variable prevPatchFrmOrderCntMsb is set equal to PatchFrmOrderCntMsb of prevPatchFrm, and The variable PatchFrmOrderCntMsb of the current patch frame is derived as follows:

If there is no available reference patch frame in the reference patch frame buffer, PatchFrmOrderCntMsb is set equal to 0.

Otherwise, PatchFrmOrderCntMsb is derived as follows:

In some embodiments, the value of PatchFrmOrderCntVal may be in the range of $-2^{31}$ to $2^{31}-1$, inclusive of all values and ranges therebetween. In some embodiments, for one CPCS, the PatchFrmOrderCntVal values for any two coded patch frames may or shall not be the same.

In some embodiments, at any moment during the decoding process, the values of PatchFrmOrderCntVal & (MaxLtPatchFrmOrderCntLsb −1) for any two reference patch frames in the DPB may or shall not be the same.

The function PatchFrmOrderCnt(pFrmX), according to at least one embodiment, is specified as follows:

PatchFrmOrderCnt(pFrmX)=PatchFrmOrderCntVal of the patch frame pFrmX

In some embodiments, the function DiffPatchFrmOrderCnt(pFrmA, pFrmB) is specified as follows:

DiffPatchFrmOrderCnt( pFrmA, pFrmB) = PatchFrmOrderCnt( pFrmA) − PicOrderCnt( pFrmB)

In some embodiments, the bitstream may not contain data that result in values of DiffPatchFrmOrderCnt(pFrmA, pFrmB) used in the decoding process that are not in the range of −215 to 215−1, inclusive of all values and ranges therebetween.

For instance, letting X be the current patch frame and Y and Z be two other patch frames in the same CPCS, Y and Z can be considered to be in the same output order direction from X when both DiffPatchFrmOrderCnt(X, Y) and DiffPatchFrmOrderCnt(X, Z) are positive or both are negative, according to at least some embodiments.

Referring now to a process for reference patch frame list construction, such a process can be invoked at the beginning of the decoding process for each patch frame. In some embodiments, reference patch frames can be addressed through reference indices. A reference index is an index into a reference patch frame list. When decoding an I patch frame, no reference patch frame list is used in decoding of the patch frame data. When decoding a P patch frame, a

```
if( ( pfh_patch_frame_order_cnt_lsb[ patchFrmIndex ] < prevPicOrderCntLsb ) &&
        ( ( prevPicOrderCntLsb − pfh_patch_frame_order_cnt_lsb[ patchFrmIndex ])
>= ( MaxPatchFrmOrderCntLsb / 2 ) ) )
    PatchFrmOrderCntMsb = prevPatchFrmOrderCntMsb +
MaxPatchFrmOrderCntLsb
else if( ( pfh_patch_frame_order_cnt_lsb[ patchFrmIndex ] > prevPatchFrmOrderCntLsb
) &&
        ( ( pfh_patch_frame_order_cnt_lsb[ patchFrmIndex ] −
prevPatchFrmOrderCntLsb ) > ( MaxPatchFrmOrderCntLsb / 2 ) ) )
    PatchFrmOrderCntMsb = prevPatchFrmOrderCntMsb −
MaxPatchFrmOrderCntLsb
else
    PatchFrmOrderCntMsb = prevPatchFrmOrderCntMsb
```

In some embodiments, PatchFrmOrderCntVal can be derived as follows:

PatchFrmOrderCntVal = PatchFrmOrderCntMsb + pfh_patch_frame_order_cnt_lsb[ patchFrmIndex ]

single reference patch frame list, RefPatchFrmList, is used in decoding of the patch frame data.

In some embodiments, at the beginning of the decoding process for each patch frame, the reference patch frame list RefPatchFrmList is derived. The reference patch frame list can be used in marking reference patch frames or in decoding of the patch frame data.

According to some embodiments, the reference patch frame list RefPatchFrmList is constructed as follows:

```
for( j = 0, pfocBase = PatchFrmOrderCntVal; j < num_ref_entries[ RlsIdx ]; j++) {
    if( st_ref_patch_frame_flag[ RlsIdx ][ j ] ) {
        RefPatchFrmPfocList[ j ] = pfocBase – DeltaPfocSt
[ RlsIdx[ i ]][ j ]
        if( reference pfA exists in the DPFB with PatchFrmOrderCntVal
equal to RefPatchFrmPfocList[ j ] )
            RefPatchFrmList[ j ] = pfA
        else
            RefPatchFrmList[ j ] = "no reference patch frame"
        pfocBase = RefPatchFrmPfocList[ j ]
    } else {
        if(reference pfA exists in the DPFB with
PatchFrmOrderCntVal & ( MaxLtPatchFrmOrderCntLsb – 1 )
            equal to
FullPfocLsbLt[ RlsIdx ][ j ] )
            RefPatchFrmList[ j ] = pfA
        else
            RefPatchFrmList[ j ] = "no reference patch frame"
    }
}
```

The first NumRefIdxActive entries in RefPatchFrmList can be referred to as the active entries in RefPatchFrmList and the other entries in RefPatchFrmList can be referred to as the inactive entries in RefPatchFrmList.

According to some embodiments, it may be a requirement of bitstream conformance that the following constraints apply:

i) num_ref_entries[RlsIdx] is not be less than NumRefIdxActive;

ii) the patch frame referred to by each active entry in RefPatchFrmList is present in the DPFB;

iii) the patch frame referred to by each entry in RefPatchFrmList is not the current patch frame;

iv) a short term reference patch frame entry and a long term reference patch frame entry in RefPatchFrmList of a patch frame do not refer to the same patch frame; and v) there is no long term reference patch frame entry in RefPatchFrmList for which the difference between the PatchFrmOrderCntVal of the current patch frame and the PatchFrmOrderCntVal of the patch frame referred to by the entry is greater than or equal to 224.

In some embodiments, letting setOfRefPatchFrames be the set of unique patch frames referred to by all entries in RefPatchFrmList, the number of patch frames in setOfRefPatchFrames may be less than or equal to psps_max_dec_patch_frame_buffering_minus1.

Referring now to a process for reference patch frame marking, such a process can be invoked once per patch frame, after decoding of a patch frame header and the decoding process for reference patch frame list construction for the patch frame, but prior to the decoding of the patch frame data. This process may result in one or more reference patch frames in the DPFB being marked as "unused for reference" or "used for long-term reference".

A decoded patch frame in the DPFB can be marked as "unused for reference", "used for short-term reference" or "used for long-term reference", but only one among these three at any given moment during the operation of the decoding process. Assigning one of these markings to a patch frame implicitly removes another of these markings when applicable. When a patch frame is referred to as being marked as "used for reference", this collectively refers to the patch frame being marked as "used for short-term reference" or "used for long-term reference" (but not both).

Short term reference patch frames are identified by their PatchFrmOrderCntVal values. Long term reference patch frames are identified by the Log2(MaxLtPatchFrmOrderCntLsb) least significant bits of their PatchFrmOrderCntVal values.

For at least some embodiments, the following applies:

for each long term reference patch frame entry in RefPatchFrmList, when the referred patch frame is a short term reference patch frame, the patch frame is marked as "used for long-term reference"; and each reference patch frame in the DPFB that is not referred to by any entry in RefPatchFrmList is marked as "unused for reference".

Referring now to processes, such as generic processes, for decoding patch units, inputs to such processes can comprise current patch frame index, frmIdx, the current patch index, p, and the current patch mode, pfdu_patch_mode[frmIdx][p].

In some embodiments, outputs of this process are several parameters associated with the current patch, including its 2D and corresponding 3D location information, such as parameters Patch2dShiftU[frmIdx][p], Patch2dShiftV[frmIdx][p], Patch2dSizeU[frmIdx][p], Patch2dSizeV[frmIdx][p], Patch3dShiftTangentAxis[frmIdx][p], Patch3dShiftBiTangentAxis[frmIdx][p], Patch3dShiftNormalAxis[frmIdx][p], PatchNormalAxis[frmIdx][p], PatchOrientationIndex[frmIdx][p], PatchLod[frmIdx][p], and PatchProjectionMode[frmIdx][p].

In some embodiments, Patch2dShiftU[frmIdx][p] specifies the x-coordinate of the top-left corner of the patch bounding box size for the current patch. The value of Patch2dShiftU[frmIdx][p] may be in the range of 0 to $Min((2^{pfh\_2d\_shift\_u\_bit\_count\_minus1[frmIdx]+1}-1)*PatchPackingBlockSize, sps\_frame\_width-1)$, inclusive of all values and ranges therebetween.

In some embodiments, Patch2dShiftV[frmIdx][p] specifies the y-coordinate of the top-left corner of the patch bounding box size for the current patch. The value of Patch2dShiftV[frmIdx][p] may be in the range of 0 to $Min((2^{pfh\_2d\_shift\_v\_bit\_count\_minus1[frmIdx]+1}-1)*PatchPackingBlockSize, sps\_frame\_height-1)$, inclusive of all values and ranges therebetween.

In some embodiments, Patch2dSizeU[frmIdx][p] specifies the width of the bounding box of the current patch. The value of Patch2dSizeU[frmIdx][p] may be in the range of 0 to (sps_frame_width−1), inclusive of all values and ranges therebetween.

In some embodiments, Patch2dSizeV[frmIdx][p] specifies the height of the bounding box of the current patch. The value of Patch2dSizeV[frmIdx][p] may be in the range of 0 to (sps_frame_height−1), inclusive of all values and ranges therebetween.

In some embodiments, Patch3dShiftTangentAxis[frmIdx][p] specifies the shift to be applied to the reconstructed patch points in the current patch along the tangent axis. The value of Patch3dShiftTangentAxis[frmIdx][p] may be in the range of 0 to Min(($2^{pfh\_3d\_shift\_tangent\_axis\_bit\_count\_minus1[frmIdx]+1}$, $2^{sps\_geometry\_3d\_coordinates\_bitdepth\_minus1+1}-1$), inclusive of all values and ranges therebetween.

In some embodiments, Patch3dShiftBiTangentAxis[frmIdx][p] specifies the shift to be applied to the reconstructed patch points in the current patch along the bitangent axis. The value of Patch3dShiftBiTangentAxis[frmIdx][p] may be in the range of 0 to Min ($2^{pfh\_3d\_shift\_bitangent\_axis\_bit\_count\_minus1[frmIdx]+1}$, $2^{sps\_geometry\_3d\_coordinates\_bitdepth\_minus1+1}-1$), inclusive of all values and ranges therebetween.

In some embodiments, Patch3dShiftNormalAxis[frmIdx][p] specifies the shift to be applied to the reconstructed patch points in the current patch along the normal axis. The value of Patch3dShiftNormalAxis[frmIdx][p] may be in the range of 0 to Min($2^{pfh\_3d\_shift\_normal\_axis\_bit\_count\_minus1[frmIdx]+1}$, $2^{sps\_geometry\_3d\_coordinates\_bitdepth\_minus1+1}-1$), inclusive of all values and ranges therebetween.

In some embodiments, PatchNormalAxis[frmIdx][p] is the index of the normal to the projection plane for the current patch. The value of PatchNormalAxis[frmIdx][p] may be in range of 0 to 2, inclusive of all values and ranges therebetween.

In some embodiments, PatchOrientationIndex[frmIdx][p] specifies the patch orientation index for the current patch.

In some embodiments, PatchLod[frmIdx][p] specifies the LOD scaling factor to be applied to the current patch. The reconstructed point 3D positions for the current patch can be scaled by $2^{pdu\_lod[frmIdx][p]}$ after their projection from 2D and before applying any further transformations.

In some embodiments, a PatchProjectionMode[frmIdx][p] equal to 0 may specify on which plane the current patch is to be projected.

In some embodiments, if pfdu_patch_mode[frmIdx][p] is equal to I_INTRA or P_INTRA, then the process for decoding intra coded patches can be used, with frmIdx and p as the inputs to that process and the outputs of that process are used as the output.

In some embodiments, if pfdu_patch_mode[frmIdx][p] is equal to P_INTER, then the process for decoding inter coded patches is used, with frmIdx and p as the inputs to that process and the outputs of that process are used as the output.

In some embodiments, if pfdu_patch_mode[frmIdx][p] is equal to I_PCM or P_PCM, then the process for decoding PCM coded patches can be used, with frmIdx and p as the inputs to that process and the outputs of that process are used as output.

Referring now to processes for decoding patch units coded in intra mode, inputs to this process can include current patch frame index, frmIdx, and/or the current patch index, p.

In some embodiments, one or more of the following patch related variables can be first assigned given the parsed elements in the patch data unit:

```
Patch2dShiftU[ frmIdx ][ p ] = pdu_2d_shift_u[ frmIdx ][ p ]
    * PatchPackingBlockSize
Patch2dShiftV[ frmIdx ][ p ] = pdu_2d_shift_v[ frmIdx ][ p ]
    * PatchPackingBlockSize
Patch3dShiftTangentAxis[ frmIdx ][ p ] = pdu_3d_shift_tangent_axis[ frmIdx ][ p ]
Patch3dShiftBiTangentAxis[ frmIdx ][ p ]= pdu_3d_shift_bitangent_axis[ frmIdx ][ p ]
Patch3dShiftNormalAxis[ frmIdx ][ p ] = pdu_3d_shift_normal_axis[ frmIdx ][ p ]
PatchNormalAxis[ frmIdx ][ p ] = pdu_normal_axis[ frmIdx ][ p ]
PatchOrientationIndex[ frmIdx ][ p ] = pdu_orientation_index[ frmIdx ][ p ]
PatchLod[ frmIdx ][ p ] = pdu_lod[ frmIdx ][ p ]
PatchProjectionMode[ frmIdx ][ p ] = pdu_projection_mode[ frmIdx ][ p ]
Patch45degreeProjectionRotationAxis[ frmIdx ][ p ] = pdu_45degree_projection_rotation_axis[ frmIdx ][ p ]
```

In some embodiments, the variables Patch2dSizeU[frmIdx][p] and Patch2dSizeV[frmIdx][p] can then be derived, such as follows:

```
If p is equal to 0, then:
    Patch2dSizeU[ frmIdx ][ p ] = pdu_2d_delta_size_u[ frmIdx ][ p ]
        * PatchPackingBlockSize
    Patch2dSizeV[ frmIdx ][ p ] = pdu_2d_delta_size_v[ frmIdx ][ p ]
        * PatchPackingBlockSize
Otherwise, if (p > 0), then:
    Patch2dSizeU[ frmIdx ][ p ] = Patch2dSizeU[ frmIdx ][ p − 1 ] +
        pdu_2d_delta_size_u[ frmIdx ][ p ] * PatchPackingBlockSize
    Patch2dSizeV[ frmIdx ][ p ] = Patch2dSizeV[ frmIdx ][ p − 1 ] +
        pdu_2d_delta_size_v[ frmIdx ][ p ] * PatchPackingBlockSize
```

In some embodiments, the variables PatchTangentAxis[frmIdx][p] and PatchBiTangentAxis[frmIdx][p] can then be derived as follows:

```
If PatchNormalAxis[ frmIdx ][ p ] is equal to zero, PatchTangentAxis[ frmIdx ][ p ] is
assigned a value of 2 and PatchBiTangentAxis[ frmIdx ][ p ] is assigned a value of 1.
Otherwise, if PatchNormalAxis[ frmIdx ][ p ] is equal to 1,
PatchTangentAxis[ frmIdx ][ p ] is assigned a value of 2 and
PatchBiTangentAxis[ frmIdx ][ p ] is assigned a value of 0.
Otherwise (PatchNormalAxis[ frmIdx ][ p ] is equal to 2)
```

-continued

PatchTangentAxis[ frmIdx ][ p ] is assigned a value of 0 and
PatchBiTangentAxis[ frmIdx ][ p ] is assigned a value of 1.

Signaling Sub-Sample Entry Descriptions

Modern multi-stream encoders such as "Video-based point cloud codec" (V-PCC) comprise multiple independently encoded media and metadata streams such as attribute, geometry, occupancy and patch data streams. V-PCC elementary stream is comprised of many different video encoded and metadata streams with potentially different coding schemes, codecs, and/or configurations.

As described hereinabove and in U.S. Provisional Patent Application No. 62/853,903 (hereinafter "the '903 Provisional"), filed May 29, 2019, the entire contents of which is hereby incorporated herein by reference for all purposes, the whole elementary stream may be stored in a single track without de-multiplexing to multiple tracks. Described hereinabove and in the '903 Provisional is a method, apparatus, and computer program product for signaling and storing compressed point clouds in video encoding. The method, apparatus and computer program product may be utilized in conjunction with a variety of video formats. Relative to encoding of compressed point clouds, the method, apparatus and computer program product access a point cloud compression coded bitstream and cause storage of the point cloud compression coded bitstream. The point cloud compression coded bitstream comprises one or more V-PCC parameter sets, video encoded attribute bitstreams, video encoded occupancy and geometry bitstreams and non-video encoded patch data bitstream. Texture can be one of the attributes and encoded as an attribute bitstream. All bitstreams can be partitioned into smaller units which are called V-PCC units, having a specific unit header. Relative to the decoding of compressed point clouds, the method, apparatus and computer program product receive a point cloud compression coded bitstream and decode the point cloud compression coded bitstream.

Such V-PCC encoded elementary streams can be stored as multiple tracks in an ISOBMFF file or as a single track. When they are stored as a single media track, access units of many different encoders are interleaved in a V-PCC specification-defined way and they are grouped as "V-PCC access units." One or multiple V-PCC access-units correspond to a sample of the single-track representation.

It is currently not possible to signal the utilized underlying video codecs in single-track V-PCC storage, since sample entries of such single-track only declares the high-level V-PCC configuration. Underlying codec utilizations are signaled using specific SEI messages or understood by parsing the necessary video NAL units (e.g. video specific SPSs).

This means that video decoders cannot be initialized until the V-PCC client receives and parses sub-samples, which is undesirable at least because many devices would like to know if they can decode a stream before they actually "download" them (e.g. by checking the DASH MPD or initialization segment and seeing the sample entries).

In V-PCC, subsamples of a V-PCC sample may have the sub-samples in any arbitrary order. Hence, there is no pattern which can be utilized to pre-assume the order of the sub-samples.

In a more general sense, ISOBMFF lacks support for declaration of such complex and modern media encoding use cases where a "sample" of a track is composed of multiple independently encoded (and potentially different) media types.

As such, provided herein are example embodiments of an approach, system, device, computer program product, and method for declaring such information by utilizing sub-samples and introducing a mechanism to declare type and codes parameters of such sub-samples. Furthermore, methods, apparatuses and computer program products are described herein for efficient interleaving of multiple separately encoded media types into a single track (and into a single sample) of an ISOBMFF file. This approach provides many benefits, for instance in V-PCC encoding schemes in which a video-based point cloud representation typically comprises multiple independently encoded media bitstreams. In such circumstances, one of skill in the art would be motivated to create a multi-track ISOBMFF file, such as described hereinabove. However, it is oftentimes more convenient, more efficient, more cost-effective, less computationally complex, and/or the like, to store the whole elementary stream without de-multiplexing to multiple tracks. One approach for storage and signaling of compressed point clouds, in which a whole elementary stream is stored in a single track without de-multiplexing to multiple tracks is described in the '903 Provisional.

However, this single-track approach may require declaration of the types of the sub-samples in the single-track metadata level so that decoders can be properly initialized and V-PCC decoder can work properly to decode the single-track of encoded media. For media tracks, such declarations are usually done in sample entries inside the SampleTableBox and they only cover a single media type. Said another way, there is not currently a way in which to declare different media types, such as two independently encoded video streams.

Described herein are approaches, methods, systems, apparatuses, and computer program products for declaration of efficient interleaving of multiple separately encoded media types into a single track (and in a single sample) in an ISOBMFF file. Provided are sub-sample entries which can be used to declare multiple different media types of sub-samples in a single media track.

In various embodiments, a sub-sample entry is associated with a sequence of sub-samples within a sequence of samples. The semantics of a sub-sample entry may imply that if the sequence of sub-samples were encapsulated in its own track (without the other sub-samples or other additional header data (such as V-PCC unit headers) being present in the track), the sequence of samples in the track would conform to the sample entry that is identical to the sub-sample entry.

This can be done in multiple different ways:

Option (1): A track level SubSampleDescriptionBox can be defined, inside which all sub-sample entry types are declared in an indexed manner (e.g., similar to Sample entries in ISOBMFF). The SubSampleInformationBox can be extended to indicate the sub-sample entry index for each subsample. For instance, Sub SampleDescriptionBox can be defined as follows:

Sub-Sample Description Box
Definition
Box Types: 'ssdb'
Container: SampleTableBox
Mandatory: No
Quantity: Exactly One

```
aligned(8) abstract class SampleEntry (unsigned int(32)
format)
    extends Box(format){
        const unsigned int(8)[6] reserved = 0;
        unsigned int(16) data_reference_index;
} // from ISO/IEC 14496-12
aligned(8) abstract class SubSampleEntry (unsigned
int(32) format)
    extends SampleEntry(format){
}
aligned(8) class SubSampleDescriptionBox (unsigned
int(32) handler_type)
    extends FullBox('ssdb', version, 0){
    int i ;
    unsigned int(32) entry_count;
    for (i = 1 ; i <= entry_count ; i++){
        SubSampleEntry( ); // an instance of a class derived
from SubSampleEntry
    }
}
```

SubSampleEntry abstract class could be instantiated with the actual SampleEntry( ) formats of the individual decoded media bitstreams. For example, for H.265 video encoded samples, the format field could be one of the sample entry types a defined in ISO/IEC 14496-15 ('hvc1', 'hev1', 'hvcC', etc.) and SubSampleEntry can be a HEVCSampleEntry( ) as defined in ISO/IEC 14496-15.

data_reference_index can be set to 0 (zero) to indicate that it is not relevant and can be omitted.

entry_count could be set to the number of sample entries utilized in the sub-samples of the media sample. For instance, if there are three media streams which are interleaved as an access unit, there may be at least three sample entries present. There may be more than three sample entries present, for instance, if the media streams utilize multiple sample entries.

Extending SubSampleInformationBox

In some embodiments, it may be necessary to indicate which sub-sample description entry refers to a sub-sample. This can be done by extending the SubSampleInformationBox as follows:

```
aligned(8) class SubSampleInformationBox
    extends FullBox('subs', version, flags) {
    unsigned int(32) entry_count;
    int i,j;
    for (i=0; i < entry_count; i++) {
        unsigned int(32) sample_delta;
        unsigned int(16) subsample_count;
        if (subsample_count > 0) {
            for (j=0; j < subsample_count; j++) {
                if(version == 1)
                {
                    unsigned int(32) subsample_size;
                }
                else
                {
                    unsigned int(16) subsample_size;
                }
                unsigned int(8) subsample_priority;
                unsigned int(8) discardable;
                unsigned int(32) codec_specific_parameters;
            }
        }
    }
}
```

-continued

```
        if (version == 2)
        {
            for (i=0; i < entry_count; i++) {
                unsigned int(16) subsample_count;
                for (j=0; j < subsample_count; j++)
                    unsigned int(8)
subsample_description_entry_index;
            }
        }
    }
``` where the same subsample_count value is used in two different loops. This guarantees that there are the same number of entries for sub-samples and the sub-sample descriptions and they match one-to-one.

subsample_description_entry_index indicates the index of the sub-sample description entry as listed in the SubSampleDescriptionBox.

In other embodiments, flags can be used to signal the presence of the sub-sample description entry indexes. In such embodiments, version might not be used, and a certain flag value can instead be used to signal the presence of the sub-sample description entry indexes. In some embodiments, such as the syntax examples provided hereinabove, the line "if(version==2)" could be replaced, for instance, with "if (flags & 1)".

In other embodiments, version or flag usage could be omitted and the data structure

```
{
    for (i=0; i < entry_count; i++) {
        unsigned int(16) subsample_count;
        for (j=0; j < subsample_count; j++)
            unsigned int(8)
subsample_description_entry_index;
    }
}
``` can be inserted directly.

In another embodiment, which may be applied together with or independent of the other embodiments described hereinabove, a single set of subsample_description_entry_index values is provided and that set applies to each sample that is in the scope of the container box. This embodiment may be useful at least when the container box is TrackFragmentBox. For instance, the following syntax may be used:

```
aligned(8) class SubSampleInformationBox
    extends FullBox('subs', version, flags) {
    unsigned int(32) entry_count;
    ... // at the end of the box
    if (flags & 2) {
        unsigned int(16) subsample_count;
        for (j=0; j < subsample_count; j++)
            unsigned int(32)
common_subsample_description_entry_index;
    }
}
```

In some embodiments, the above-described structure are backwards compatible since a legacy parser can safely ignore the new data structure.

In another embodiment, the data structure could be non-backwards compatible, such as follows:

```
aligned(8) class SubSampleInformationBox
    extends FullBox('subs', version, flags) {
    unsigned int (32) entry_count;
    int i,j;
    for (i=0; i < entry_count; i++) {
        unsigned int(32) sample_delta;
        unsigned int(16) subsample_count;
        if (subsample_count > 0) {
            for (j=0; j < subsample_count; j++) {
                if(version == 1)
                {
                    unsigned int(32) subsample_size;
                }
                else
                {
                    unsigned int(16) subsample_size;
                }
                unsigned int(8) subsample_priority;
                unsigned int(8) discardable;
                unsigned int(32)
codec_specific_parameters;
                if (version == 2)
                    unsigned int(8)
subsample_description_entry_index;
            }
        }
    }
}
```

In some embodiments, flags could also be utilized instead of version, however a possible downside of this approach would be that it is not backwards compatible and may break the existing legacy parsers.

In another embodiment, the codec_specific_parameters field of SubSampleInformationBox could be used to signal the sub-sample description index directly.

Option (2): A new box (SubSampleDescriptionIndexBox) can be defined which contains the sub-sample description entry indexes inside the same container as the SubSampleInformationBox. In some embodiments, this approach may require that there is one and only one SubSampleInformationBox in the same container box. In some embodiments, if there were multiple SubSampleInformationBoxes present in the same container box, further means operable to associate SubSampleDescriptionIndexBoxes to respective SubSampleInformationBoxes may be needed, e.g., by adding an identifier field in both Sub SampleInformationBox and Sub SampleDescriptionIndexBox and associating them together when the value of the identifier is equal.

```
SubSampleDescriptionIndexBox:
    Box Type: 'ssdi'
    Container: SampleTableBox or TrackFragmentBox
    Mandatory: No
    Quantity: Zero or more
aligned(8) class SubSampleDescriptionIndexBox
    extends FullBox('ssdi', version, flags) {
    unsigned int(32) entry_count;
    int i,j;
    for (i=0; i < entry_count; i++) {
        unsigned int(16) subsample_count;
        if (subsample_count > 0) {
            for (j=0; j < subsample_count; j++) {
                unsigned int(8)subsample_description_entry_index;
            }
        }
    }
}
``` where entry_count and subsample_count have the same values as in the Sub SampleInformationBox.

In an alternative syntax, runs of samples are associated to a given sub-sample description entry index at a time. For example, the following syntax may be used:

```
aligned(8) class SubSampleDescriptionIndexBox
    extends FullBox('ssdi', version, flags) {
    unsigned int(32) entry_count;
    int i,j;
    for (i=0; i < entry_count; i++) {
    unsigned int(16) sample_run;
        unsigned int(16) subsample_count;
        if (subsample_count > 0) {
            for (j=0; j < subsample_count; j++) {
                unsigned int(8)subsample_description_entry_index;
            }
        }
    }
}
``` where sample_run specifies the number of samples to which the immediately following set of sub-sample description entry indices applies.

In another embodiment having alternative syntax, a single set of subsample_description_entry_index values is provided and applies to each sample that is in the scope of the container box. For instance, in some embodiments, this approach may be relatively more useful when the container box is TrackFragmentBox.

Option (3): In some embodiments, Option 3 may be applied for movie fragments whereas Option 2 may be applied when the container is SampleTableBox. In some embodiments, according to Option 3, the TrackFragmentHeaderBox may be extended to contain a set of sub-sample description entry indices that applies to each sample of the track fragment. For instance, in some embodiments, the following syntax may be used.

```
aligned(8) class TrackFragmentHeaderBox
            extends FullBox('tfhd', 0, tf_flags){
    unsigned int(32) track_ID;
    // all the following are optional fields
    // their presence is indicated by bits in the tf_flags
    unsigned int(64) base_data_offset;
    unsigned int(32) sample_description_index;
    unsigned int(32) default_sample_duration;
    unsigned int(32) default_sample_size;
    unsigned int(32) default_sample_flags;
    if (tf_flags & 0x040000) {
        unsigned int(16) subsample_count;
        for (j=0; j < subsample count; j++)
            unsigned int(32)
common_subsample_description_entry_index;
    }
}
```

Option (4): The usage of sample entries at the track level can be extended so that they can also index the subsamples. For instance, as many sample entries may be declared as are required by the file as SampleEntry( )s inside the SampleDescriptionBox. The SubSampleInformationBox may be enabled to refer to indexes of SampleEntry( )s at a track's SampleDescriptionBox.

Option (5): In fragmented MP4 files, sub-samples of a movie fragment may be grouped into sub-sample group descriptions. These descriptions may reside in a new box structure at SampleTableBox or TrackFragmentBox level. Such sub-sample group descriptions may be further assigned to sub-samples via a sub-sample-to-group mapping box.

In various embodiments of Options 1-5, a sub-sample entry is associated with a sequence of sub-samples within a sequence of samples. The semantics of a sub-sample entry may imply that if the sequence of sub-samples were encapsulated in its own track, without the other sub-samples or other additional header data (such as V-PCC unit headers) being present in the track, the sequence of samples in the track would conform to the sample entry that is identical to the sub-sample entry. Sub-sample entry types can be indexed at a track-level sub-sample description box, and the sub-sample information box can be extended to indicate the sub-sample entry index for each sub-sample. The sub-sample information box can be extended to include a version or flag identifying the presence of sub-sample description entry indexes. A sub-sample description index box can be formed for containing sub-sample description entry indexes in the same container as the sub-sample information box. A track fragment header box for a movie fragment track can be extended to include a set of sub-sample description entry indices that applies to each sample of the track fragment. The sample entries at track level may alternatively be extended to index the sub-samples in the sample description boxes and the sub-sample information box may refer to indexes of sample entries at the track-level sample description box.

Referring now to FIG. 4, a method 30 is provided that comprises accessing a point cloud compression coded bitstream, said point cloud compression coded bitstream configured to be stored as one or more media tracks, at block 31. The illustrated method 30 further comprises forming a track level sub-sample description box comprising a plurality of sub-sample entry types for a respective plurality of sub-samples, at block 32. The illustrated method 30 further comprises indicating one or more types of point cloud compression coded bitstream components by including respective point cloud unit header information in a codec-specific parameters-related field of the track level sub-sample description box, at block 33. In some embodiments, the method 30 can, optionally, further comprise: extending a sub-sample information box to indicate the sub-sample entry index by indicating the order of presence of a sub-sample entry in the related sub-sample description box and further indicating its presence via a version value or setting a flag within said sub-sample information box, at block 34. In some embodiments, at least one of said at least one media track of a first packing type and at least one other media track of a second packing type, said first packing type and said second packing type being signaled via said sub-sample entry index. In some embodiments, the method can further comprise accessing the attribute information bitstreams, the geometry information bitstreams, the occupancy information bitstream and the patch information bitstream; detecting that the attribute information bitstreams, the geometry information bitstreams, the occupancy information bitstream and the patch information bitstream follow a compatible coding and timing structure; and causing construction and storage of a video media track based at least upon the compatible coding and timing structure. In some embodiments, said point cloud compression coded bitstream comprises at least one attribute information bitstream, at least one geometry information bitstream, at least one occupancy information bitstream, and at least one patch information bitstream. In some embodiments, the method can further comprise accessing the attribute information bitstreams, the geometry information bitstreams, the occupancy information bitstream and the patch information bitstream; storing the attribute information bitstreams in an attribute video media track; storing the geometry information bitstream in a geometry video media track; storing the occupancy information bitstream in an occupancy video media track; storing the patch information bitstream in another coded media or metadata track; and causing construction and storage of an interleaved indicator metadata in the file indicating an interleaving pattern for one or more components of the attribute video media track, the geometry video media track, the occupancy video media track, and the separate coded media or metadata track. In some embodiments, each of said one or more components for which the pattern is indicated are accessible using the sub-sample information box, said sub-sample-information box defining said presentation order and configuration information for said one or more components, said sub-sample information box configured to indicate said pattern. In some embodiments, storing comprises storing of different video-based point cloud compression-structures in an International Standards Organization base media file format (ISOBMFF) or any other object-structured media file format.

In some embodiments, an apparatus can be provided for carrying out any of the method described herein, such as the method 30. In some embodiments, the apparatus can comprise means, such as at least one processor and at least one memory including computer program code for one or more programs, the means configured to cause the apparatus at least to: access a point cloud compression coded bitstream, said point cloud compression coded bitstream configured to be stored as one or more media tracks; form a track level sub-sample description box comprising a sub-sample entry index comprising a plurality of sub-sample entry types for a respective plurality of sub-samples; and extend a sub-sample information box to indicate the sub-sample entry index by indicating a version value or setting a flag within said sub-sample information box.

In some embodiments, a computer program product comprises at least one non-transitory computer-readable storage medium having computer executable program code instructions stored therein, the computer executable program code instructions comprising program code instructions configured, upon execution, to: access a point cloud compression coded bitstream, said point cloud compression coded bitstream configured to be stored as one or more media tracks; form a track level sub-sample description box comprising a sub-sample entry index comprising a plurality of sub-sample entry types for a respective plurality of sub-samples; and extend a sub-sample information box to indicate the sub-sample entry index by indicating a version value or setting a flag within said sub-sample information box.

Referring now to FIG. 5, a method 40 can comprise accessing a point cloud compression coded bitstream, said point cloud compression coded bitstream configured to be stored as one or more media tracks, at block 41. In some embodiments, the method 40 can further comprise defining a plurality of sub-sample description index boxes, sub-sample description index boxes comprising sub-sample description entry indexes, said sub-sample description index boxes being stored in a same container as a respective plurality of sub-sample information boxes associated with said plurality of sub-sample description index boxes, at block 42. In some embodiments, the method 40 further comprises adding unique identifiers to respective sub-sample description index boxes of said plurality of sub-sample description index boxes and respective sub-sample information boxes of said plurality of sub-sample information boxes, said unique identifiers operable to identify a first sub-sample description index box associated with a first sub-sample information box, at block 43.

Referring now to FIG. 6, a method 50 can comprise accessing a point cloud compression coded bitstream, said point cloud compression coded bitstream configured to be stored as one or more media tracks associated with samples of a movie fragment, at block 51. In some embodiments, a method 50 further comprises defining a plurality of sub-sample description index boxes, sub-sample description index boxes comprising sub-sample description entry indexes, said sub-sample description index boxes being stored in a same container as a respective plurality of sub-sample information boxes associated with said plurality of sub-sample description index boxes, at block 52. The method 50 as illustrates further comprises extending a track fragment header box to include a set of said sub-sample description entry indices that applies to sample of the movie fragment, at block 53.

Referring now to FIG. 7, a method 60 can comprise accessing a point cloud compression coded bitstream, said point cloud compression coded bitstream configured to be stored as one or more media tracks associated with samples of a movie fragment, at 61. The method 60 as illustrated further comprises indexing a plurality of sample entities within a sample description box of said one or more media tracks, at 62.

According to other embodiments, a method, apparatus, and/or computer program product are provided for decoding any of the point cloud video encoded according to any of the embodiments described herein.

As described hereinabove, FIGS. 4-7 include flowcharts of an apparatus 10, method, and computer program product according to certain example embodiments. It will be understood that each block of the flowcharts, and combinations of blocks in the flowcharts, may be implemented by various means, such as hardware, firmware, processor, circuitry, and/or other devices associated with execution of software including one or more computer program instructions. For example, one or more of the procedures described herein may be embodied by computer program instructions. In this regard, the computer program instructions which embody the procedures described herein may be stored by a memory device 14 of an apparatus employing an embodiment of the present invention and executed by processing circuitry 12 of the apparatus. As will be appreciated, any such computer program instructions may be loaded onto a computer or other programmable apparatus (e.g., hardware) to produce a machine, such that the resulting computer or other programmable apparatus implements the functions specified in the flowchart blocks. These computer program instructions may also be stored in a computer-readable memory that may direct a computer or other programmable apparatus to function in a particular manner, such that the instructions stored in the computer-readable memory produce an article of manufacture, the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowchart blocks.

A computer program product is therefore defined in those instances in which the computer program instructions, such as computer-readable program code portions, are stored by at least one non-transitory computer-readable storage medium with the computer program instructions, such as the computer-readable program code portions, being configured, upon execution, to perform the functions described herein, such as in conjunction with the flowcharts of FIGS. 4-7. In other embodiments, the computer program instructions, such as the computer-readable program code portions, need not be stored or otherwise embodied by a non-transitory computer-readable storage medium, but may, instead, be embodied by a transitory medium with the computer program instructions, such as the computer-readable program code portions, still being configured, upon execution, to perform the functions described herein.

Accordingly, blocks of the flowcharts support combinations of means for performing the specified functions and combinations of operations for performing the specified functions for performing the specified functions. It will also be understood that one or more blocks of the flowcharts, and combinations of blocks in the flowcharts, may be implemented by special purpose hardware-based computer systems which perform the specified functions, or combinations of special purpose hardware and computer instructions.

In some embodiments, any or all of the terms, variables, values, constructs, frameworks or the like, as described herein, can be set as the output of this process.

In some embodiments, certain ones of the operations herein may be modified or further amplified. Furthermore, in some embodiments, additional optional operations may be included, such as represented by the blocks outlined in dashed lines in FIGS. 4-7. Modifications, additions, or amplifications to the operations herein may be performed in any order and in any combination.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described herein are also contemplated as may be set forth in some of the appended claims. Although specific terms are employed herein, they are used in a generic and descriptive sense only and not for purposes of limitation.

That which is claimed is:

1. A method comprising:
    accessing a point cloud compression coded bitstream, said point cloud compression coded bitstream configured to be stored as one or more media tracks;
    forming a track level sample table box comprising a plurality of sub-sample entry types for a respective plurality of sub-samples;
    extending a sub-sample information box to indicate the sub-sample entry index for each of the respective sub-sample entries within the track level sample table box; and
    indicating one or more types of point cloud compression coded bitstream components by including respective point cloud unit header information in a codec-specific parameters-related field of the sub-sample information box.

2. The method of claim 1, further comprising:
indicating that the sub-sample entry index is present in the sub-sample information box using a version value or by setting a flag within said sub-sample information box.

3. The method of claim 1, further comprising:
accessing the attribute information bitstreams, the geometry information bitstreams, the occupancy information bitstream and the patch information bitstream;
detecting that the attribute information bitstreams, the geometry information bitstreams, the occupancy information bitstream and the patch information bitstream follow a compatible coding and timing structure; and
causing construction and storage of a video media track based at least upon the compatible coding and timing structure.

4. The method of claim 1, wherein said at least one media track has a packing type that is signaled via said sub-sample entry index.

5. The method of claim 1, wherein said point cloud compression coded bitstream comprises at least one attribute information bitstream, at least one geometry information bitstream, at least one occupancy information bitstream, and at least one patch information bitstream.

6. The method of claim 5, further comprising:
accessing the attribute information bitstreams, the geometry information bitstreams, the occupancy information bitstream and the patch information bitstream;
storing the attribute information bitstreams in an attribute video media track;
storing the geometry information bitstream in a geometry video media track;
storing the occupancy information bitstream in an occupancy video media track;
storing the patch information bitstream in another coded media or metadata track; and
causing construction and storage of metadata in the file indicating a pattern for one or more components of the attribute video media track, the geometry video media track, the occupancy video media track, and the separate coded media or metadata track.

7. The method of claim 6, wherein the metadata is interleaved indicator metadata indicating an interleaving pattern for said one or more components of the attribute video media track, the geometry video media track, the occupancy video media track, and the separate coded media or metadata track.

8. The method of claim 6, wherein each of said one or more components for which the pattern is indicated are accessible using the sub-sample information box, said sub-sample-information box defining said presentation order and configuration information for said one or more components, said sub-sample information box configured to indicate said pattern.

9. An apparatus comprising:
at least one processor, and
at least one memory including computer program code for one or more programs, the at least one memory and the computer program code configured to, with the at least one processor, cause the apparatus at least to:
access a point cloud compression coded bitstream, said point cloud compression coded bitstream configured to be stored as one or more media tracks;
form a track level sample table box comprising a plurality of sub-sample entry types for a respective plurality of sub-samples;
extend a sub-sample information box to indicate the sub-sample entry index for each of the respective sub-sample entries within the sample table box; and
indicate one or more types of point cloud compression coded bitstream components by including respective point cloud unit header information in a codec-specific parameters-related field of the sub-sample information box.

10. The apparatus of claim 9, wherein the at least one memory and the computer program code are further configured to, with the at least one processor, cause the apparatus at least to:
indicating that the sub-sample entry index is present in the sub-sample information box using a version value or by setting a flag within said sub-sample information box.

11. The apparatus of claim 9, wherein the at least one memory and the computer program code are further configured to, with the at least one processor, cause the apparatus at least to:
access the attribute information bitstreams, the geometry information bitstreams, the occupancy information bitstream and the patch information bitstream;
detect that the attribute information bitstreams, the geometry information bitstreams, the occupancy information bitstream and the patch information bitstream follow a compatible coding and timing structure; and
cause construction and storage of a video media track based at least upon the compatible coding and timing structure.

12. The apparatus of claim 9, wherein said at least one media track has a packing type that is signaled via said sub-sample entry index.

13. The apparatus of claim 9, wherein said point cloud compression coded bitstream comprises at least one attribute information bitstream, at least one geometry information bitstream, at least one occupancy information bitstream, and at least one patch information bitstream.

14. The apparatus of claim 13, wherein the at least one memory and the computer program code are further configured to, with the at least one processor, cause the apparatus at least to:
access the attribute information bitstreams, the geometry information bitstreams, the occupancy information bitstream and the patch information bitstream;
store the attribute information bitstreams in an attribute video media track;
store the geometry information bitstream in a geometry video media track;
store the occupancy information bitstream in an occupancy video media track;
store the patch information bitstream in another coded media or metadata track; and
cause construction and storage of metadata in the file indicating a pattern for one or more components of the attribute video media track, the geometry video media track, the occupancy video media track, and the separate coded media or metadata track.

15. The apparatus of claim 14, wherein the metadata is interleaved indicator metadata indicating an interleaving pattern for said one or more components of the attribute video media track, the geometry video media track, the occupancy video media track, and the separate coded media or metadata track.

16. The apparatus of claim 14, wherein each of said one or more components for which the pattern is indicated are accessible using the sub-sample information box, said sub-sample-information box defining said presentation order and configuration information for said one or more components, said sub-sample information box configured to indicate said pattern.

17. A computer program product comprises at least one non-transitory computer-readable storage medium having computer executable program code instructions stored therein, the computer executable program code instructions comprising program code instructions configured, upon execution, to:

access a point cloud compression coded bitstream, said point cloud compression coded bitstream configured to be stored as one or more media tracks;

form a track level sample table box comprising a plurality of sub-sample entry types for a respective plurality of sub-samples;

extend a sub-sample information box to indicate the sub-sample entry index for each of the respective sub-sample entries within the track level sample table box; and indicate one or more types of point cloud compression coded bitstream components by including respective point cloud unit header information in a codec-specific parameters-related field of the sub-sample information box.

18. The computer program product of claim 17, wherein the program code instructions are further configured, upon execution, to:

indicate that the sub-sample entry index is present in the sub-sample information box using a version value or by setting a flag within said sub-sample information box.

19. The computer program product of claim 17, wherein the program code instructions are further configured, upon execution, to:

access the attribute information bitstreams, the geometry information bitstreams, the occupancy information bitstream and the patch information bitstream;

detect that the attribute information bitstreams, the geometry information bitstreams, the occupancy information bitstream and the patch information bitstream follow a compatible coding and timing structure; and cause construction and storage of a video media track based at least upon the compatible coding and timing structure.

20. The computer program product of claim 17, wherein said at least one media track has a packing type that is signaled via said sub-sample entry index.

\* \* \* \* \*

UNITED STATES PATENT AND TRADEMARK OFFICE
CERTIFICATE OF CORRECTION

PATENT NO. : 11,595,670 B2  
APPLICATION NO. : 17/061610  
DATED : February 28, 2023  
INVENTOR(S) : Emre Baris Aksu et al.

Page 1 of 1

It is certified that error appears in the above-identified patent and that said Letters Patent is hereby corrected as shown below:

In the Claims

In Column 79, Line 55, Claim 8, delete "sub-sample-information box" and insert -- sub-sample information box --, therefor.

Signed and Sealed this  
Twenty-sixth Day of September, 2023

Katherine Kelly Vidal  
*Director of the United States Patent and Trademark Office*